United States Patent [19]

Brightman et al.

[11] 3,920,916

[45] Nov. 18, 1975

[54] DIGITAL SWITCHING NETWORK

[75] Inventors: Barrie Brightman, Webster; George Datsko, Rochester, both of N.Y.; Edward W. Moll, King of Prussia, Pa.; William H. Stewart, Scio, N.Y.

[73] Assignee: Stromberg-Carlson Corporation, Rochester, N.Y.

[22] Filed: Sept. 27, 1973

[21] Appl. No.: 401,534

[52] U.S. Cl. .......................... 179/15 AL; 179/15 AQ
[51] Int. Cl.$^2$ .......................................... H04Q 11/04
[58] Field of Search. 340/172.5; 179/15 AL, 15 AQ

[56] References Cited

UNITED STATES PATENTS

| | | | |
|---|---|---|---|
| 3,458,659 | 7/1969 | Sternung | 179/15 AQ |
| 3,639,693 | 2/1972 | Bartlett et al. | 179/15 AT |
| 3,718,769 | 2/1973 | Jacob | 179/18 J |
| 3,727,006 | 4/1973 | Jacob | 179/18 J |
| 3,743,789 | 7/1973 | Krupp | 179/18 J |
| 3,760,116 | 9/1973 | O'Toole et al. | 179/18 J |

*Primary Examiner*—Gareth D. Shaw
*Assistant Examiner*—Michael C. Sachs
*Attorney, Agent, or Firm*—William F. Porter, Jr.

[57] ABSTRACT

A digital switching network including send memory circuits and receive memory circuits interconnected by highways. The send memory circuit receives and stores said time divided multiplex signals and transmits the same on a time divided multiplex basis to the interconnect highways at any of a plurality of recurring time slots including those assigned to the send time divided multiplex signals. The receive memory receives and stores the time divided multiplex signals from the interconnect highways and transmits the same to the receive circuits at appropriate receive time slots. Control circuits provide for the interconnection of any send and receive lines. Data for establishing interconnection is received by register circuits in binary form. A free time slot is selected by the control circuits for the transmission of the send time divided multiplex signals over any of the interconnecting highway. The send and receive memory circuits are controlled by recirculating memories supplied by data from the register means. Single or duplex connections can be established. A trace circuit is provided for identifying a selected connection or identifying a series of busy connections.

28 Claims, 39 Drawing Figures

TABLE A (NORMAL OPERATION)

| BINARY BITS | | | | | | COMMANDS | | BINARY BITS | | | | | | | RESPONSES | |
|---|---|---|---|---|---|---|---|---|---|---|---|---|---|---|---|---|
| 32 | 16 | 8 | 4 | 2 | 1 | DEC | (NORMAL) | 64 | 32 | 16 | 8 | 4 | 2 | 1 | DEC | (NORMAL) |
| | | | 0 | 0 | 0 | 0 | DUPLEX CONNECT | | | | | 0 | 0 | 0 | 0 | NORMAL COMPLETION |
| | | | 0 | 0 | 1 | 1 | DUPLEX DISCONNECT | | | | | 0 | 0 | 1 | 1 | FREE + BUSY TS FOUND + NON-VALID COMMAND + OUT OF LIMITS DPG |
| | | | 0 | 1 | 0 | 2 | RESERVED - SYN | | | | | 0 | 1 | 0 | 2 | TRACE IN PROGRESS |
| | | | 0 | 1 | 1 | 3 | DUPLEX CONNECT OVERRIDE | | | | | 0 | 1 | 1 | 3 | COMMAND VERIFIED |
| | | | 1 | 0 | 0 | 4 | SINGLE TRACE | | | | | 1 | 0 | 0 | 4 | PARITY ERROR DETECTED |
| | | | 1 | 0 | 1 | 5 | FULL TRACE | | | | | 1 | 0 | 1 | 5 | DOUBLE CONN-BUSY |
| | | | 1 | 1 | 0 | 6 | UNDEFINED | | | | | 1 | 1 | 0 | 6 | RESERVED |
| | | | 1 | 1 | 1 | 7 | SUSPEND OPERATION | | | | | 1 | 1 | 1 | 7 | LINE + SW T.S. NOT WRITTEN + ERASED |

TABLE B (TEST OR DIAGNOSTIC OPER)

| | | | | | | | (TEST) | | | | | | | | | (TEST) |
|---|---|---|---|---|---|---|---|---|---|---|---|---|---|---|---|---|
| 0 | 0 | 0 | 0 | 0 | 0 | 0 | DUPLEX CONNECT | 0 | 0 | 0 | 0 | 0 | 0 | 0 | 0 | NORMAL COMPLETION |
| 0 | 0 | 0 | 0 | 0 | 1 | 1 | DUPLEX DISCONNECT | 0 | 0 | 0 | 0 | 0 | 0 | 1 | 1 | SEND T.S. NOT FOUND |
| 0 | 0 | 0 | 0 | 1 | 0 | 2 | UNDEFINED | 0 | 0 | 0 | 0 | 0 | 1 | 0 | 2 | RECEIVE T.S. NOT FOUND |
| 0 | 0 | 0 | 0 | 1 | 1 | 3 | DUPLEX CONNECT OVERRIDE | 0 | 0 | 0 | 0 | 0 | 1 | 1 | 3 | SEND RECEIVE TS FOUND |
| 0 | 0 | 0 | 1 | 0 | 0 | 4 | SINGLE TRACE | 0 | 0 | 0 | 0 | 1 | 0 | 0 | 4 | T.S. NOT AVAILABLE |
| 0 | 0 | 0 | 1 | 0 | 1 | 5 | FULL TRACE | 0 | 0 | 0 | 0 | 1 | 0 | 1 | 5 | SEND LINE BUSY (SW TS) |
| 0 | 0 | 0 | 1 | 0 | 0 | 6 | UNDEFINED | 0 | 0 | 0 | 0 | 1 | 1 | 0 | 6 | RECEIVE LINE BUSY (SW TS) |
| 0 | 0 | 0 | 1 | 1 | 1 | 7 | SUSPEND OPERATION | 0 | 0 | 0 | 0 | 1 | 1 | 1 | 7 | SEND RECEIVE LINE BUSY |
| 0 | 0 | 1 | 0 | 0 | 0 | 8 | REGISTER THRU CHECK | 0 | 0 | 0 | 1 | 0 | 0 | 0 | 8 | T.S. (SW) NOT WRITTEN/ERASED |
| | | | | | | | | 0 | 0 | 0 | 1 | 0 | 0 | 1 | 9 | SEND LINE BUSY (LTS) LAY |
| | | | | | | | | 0 | 0 | 0 | 1 | 0 | 1 | 0 | 10 | RECEIVE LINE BUSY (LTS) LAY |
| | | | | | | | | 0 | 0 | 0 | 1 | 0 | 1 | 1 | 11 | SEND REC LINE BUSY (LTS) LAY |
| | | | | | | | | 0 | 0 | 0 | 1 | 1 | 0 | 0 | 12 | LINE T.S. NOT WRITTEN ERASED |
| | | | | | | | | 0 | 0 | 0 | 1 | 1 | 0 | 1 | 13 | SEND LINE BUSY OVERLAY |
| | | | | | | | | 0 | 0 | 0 | 1 | 1 | 1 | 0 | 14 | RECEIVE LINE BUSY OVERLAY |
| | | | | | | | | 0 | 0 | 0 | 1 | 1 | 1 | 1 | 15 | SEND RECEIVE LINE BUSY OVERLAY |
| | | | | | | | | 0 | 0 | 1 | 0 | 0 | 0 | 0 | 16 | T.S. CONTROL VERIFIED |
| | | | | | | | | 0 | 0 | 1 | 0 | 0 | 0 | 1 | 17 | SEND LINE STORE CHECK |
| | | | | | | | | 0 | 0 | 1 | 0 | 0 | 1 | 0 | 18 | RECEIVE LINE STORE CHECK |
| | | | | | | | | 0 | 0 | 1 | 0 | 0 | 1 | 1 | 19 | SEND RECEIVE LINE STORE CHECK |
| | | | | | | | | 0 | 0 | 1 | 0 | 1 | 0 | 0 | 20 | PARITY ERROR DETECTED |
| | | | | | | | | 0 | 0 | 1 | 0 | 1 | 0 | 1 | 21 | DUPLEX CONT. OPER 1 |
| | | | | | | | | 0 | 0 | 1 | 0 | 1 | 1 | 0 | 22 | |
| | | | | | | | | 0 | 0 | 1 | 0 | 1 | 1 | 1 | 23 | DUPLEX CONT OPER 2 |
| | | | | | | | | 0 | 0 | 1 | 1 | 0 | 0 | 0 | 24 | DUPLEX RS OPER |
| | | | | | | | | 0 | 0 | 1 | 1 | 0 | 0 | 1 | 25 | SEND DPG OUT OF LIMITS |
| | | | | | | | | 0 | 0 | 1 | 1 | 0 | 1 | 0 | 26 | RECEIVE DPG OUT OF LIMITS |
| | | | | | | | | 0 | 0 | 1 | 1 | 0 | 1 | 1 | 27 | SEND RECEIVE DPG O/L |
| | | | | | | | | 0 | 0 | 1 | 1 | 1 | 0 | 0 | 28 | LINE TS STORE VERIFIED |
| | | | | | | | | 0 | 0 | 1 | 1 | 1 | 0 | 1 | 29 | CALL RS CONT. FAULTY |
| | | | | | | | | 0 | 0 | 1 | 1 | 1 | 1 | 0 | 30 | TRACE IN PROGRESS |
| | | | | | | | | 0 | 0 | 1 | 1 | 1 | 1 | 1 | 31 | NON-VALID COMMAND |

Fig. 17

DIGITAL SWITCHING NETWORK

BACKGROUND OF THE INVENTION

This invention pertains to communication systems in general and more particularly to digital switching networks for interconnecting digital systems on a time division multiplex basis.

Over the years, as the digital computer and related fields have become a more important tool, there has been an ever increasing need for the exchange of information on a digital basis, particularly so between commonly owned equipment. It is expected that in the near future arrangements will be provided for the interconnection of computers throughout the nation and the world to at least the same extent that voice telephone interconnection between subscribers can be established.

At the present time such digital systems are interconnected via the telephone system or via store and forward switching offices. The telephone system is designed to handle the traffic expected for voice communication, which is in the order of 0.2 to 0.3 erlangs per channel. In contrast, the traffic handling capability needed to handle machine generated data such as computer type intercommunication is expected to be much, for example in the order of 0.8 erlangs per channel. Therefore, the present day telephone switching systems will not be capable of handling this expected degree of traffic, thereby causing delays, and requiring greater storage capacity in order to store the information to be transmitted until the connection can be established.

In order to achieve the required traffic handling capabilities and high speed information transmission needed for handling such digital communications, time division multiplex principles are employed which permit the simultaneous exchange of information between each of a plurality of sources and a corresponding ones of a plurality of destinations via common linking circuits. This practice requires that, in short time intervals, the source and destination terminals must be assigned a frequently recurring discrete time slot during which information may be sampled and received.

In addition to being able to handle the high degree of traffic, the digital network must have full availability and be non-blocking. Full availability means that any station or subscriber can be connected through the network to any other station or subscriber. Non-blocking means that there always is a free path for interconnecting any two free stations. Further information concerning the capabilities of networks is described in an article entitled, "A Study of Non-Blocking Switching Network" by C. Clos, which appeared in the "Bell System Technical Journal", Volume 32, March 1953, pages 406–424. The effect of non-blocking is to aasure that a path is available between free parties and the effect of full availability is that there is no need to share equipment among stations, so that a connection will be able to be completed when requested. Such an arrangement reduces the requirements on the usual type of store and forward system wherein the information is stored in massive memories and sent out when a connection is available.

Digital processors provide a means for indicating to the time divided multiplex network, in digital form, the stations to be interconnected. The switching network selects the appropriate interconnection and notifies the processor of the same. In the event that a connection or disconnection fails, reason for failure shsould be readily diagnosed and the information pertaining to the same should be provided to the processor so that appropriate corrections can be made to the interconnect information supplied by the processor. In addition to the foregoing, means should be provided for reviewing or tracing the connections established through the network so that the information in the processor can be periodically updated, or updated at the request of the processor.

It is therefore, an object of this invention to provide a new and improved digital switching network.

It is also an object of this invention to provide a new and improved digital switching network that employs time division multiplex principals.

It is also an object of this invention to provide a new and improved digital switching network that has the high traffic handling capabilities needed for interconnecting on a real time basis machine generated digital data.

It is also an object of this invention to provide a new and improved digital switching network providing full availability between digital stations connected thereto.

It is still a further object of this invention to provide a new and improved digital switching network providing a non-blocking arrangement between digital stations connected thereto.

It is also an object of this invention to provide a new and improved digital switching network including means for detecting a failed connection or disconnection.

It is also an object of this invention to provide a new and improved digital switching network including means for tracing connections through the network to identify the connections established therethrough.

BRIEF DESCRIPTION OF THE INVENTION

A switching network, for transmitting send time divided multiplex signals from a plurality of send circuits, sampled in accordance with recurring send line time slots assigned thereto, to any of a plurality of receive circuits on a time divided multiplex basis in accordance with recurring time slots assigned thereto. Send memory circuit means receives and stores the send time divided multiplex signals from the send circuits and transmits the send time divided time signals over any of a plurality of interconnection highways on a time divided multiplex basis at any of a plurality of recurring time slots including the assigned send time slots. Receive memory circuit means receives and stores send time divided multiplex signals transmitted over any of the plurality of interconnected highways and transmits the send time divided multiplex signals to the receive circuits at appropriate receive time slots. Control circuit means are provided for the send and receive memory means so that time divided multiplex signals can be transmitted between any two designated send and receive circuits.

The switching network can be provided with the appropriate number of highways and time slots to provide a full availability, non-blocking, arrangement. Alternately, if duplication is desired for reliability purposes, two switching networks having less than non-blocking capabilities can be connected in parallel to provide a non-blocking arrangement. In such case, circuit means are provided between the duplicate switching networks providing the busy-free conditions of various send and receive circuits for avoiding double connections through both switching networks.

The send and receive memory circuit means include random access memories. Send and receive recirculating memories control the translation of the send time divided multiplex signals by the send and receive random access memory circuits respectively. The random access memory circuits can, for example, include two memory circuits that are controlled so that in one frame one memory circuit receives the send time divided multiplex signals while the other transmits the send time divided multiplex signals, and vice versa in the next frame.

The random access memory circuits can receive and store the send time divided multiplex signals in accordance with the sequence received and can transmit the send time divided multiplex signals in a different sequence, or alternately, the send time divided multiplex signals can be stored in a sequence different than that received and transmitted in accordance with the sequence stored.

The send memory circuit means can be connected via an expander circuit to all the interconnecting highways under the control of a recirculating memory selecting the interconnect highways and time slots. The receive memory circuit means can be connected via a concentrator circuit to all the interconnected highways under the control of a recirculating memory selecting the interconnected highways and time slots, or through a concentrator functioning as an OR gate circuit.

The control system for the translation of the time divided multiplex system by the random access memories includes a plurality of recirculating memories, each having a separate storage location therein for each storage location in a random access memory circuit. Means are provided for receiving parallel binary numbers and loading the same in the recirculating memories. The recirculating memories are connected to the random access memory to control either the storing of the information therein, or translation therefrom. An additional recirculating memory can be provided for providing an indication of the busy-free conditions of the various storage spaces in the plurality of recirculating memory. A second additional recirculating memory can be provided for providing information pertaining to the busy-free condition of the send or receive circuits.

The control circuit for the switching network can include register means for receiving and storing in binary form the identity of the send and receive circuits to be interconnected. Circuit means are also provided for locating free time slots and controlling the transmission of the send time divided multiplex signals over the interconnected highways. Duplex circuit means can be provided for reversing the send and receive circuits after the initial connection has been established. The binary data in the register means can be modified to compensate for the time delay experienced in the transmission of the send time divided multiplex signals over the interconnected highways.

A single and a full trace circuit means can be provided for identifying the busy connection through the switching network. A single trace can identify any certain connection, or a full trace can be provided for tracing a series of busy circuits.

BRIEF DESCRIPTION OF THE FIGURES

FIG. 17 is a table illustrating the coding of the commands and responses transmitted between the processor and the common control for the normal and test mode of operation.

DETAILED DESCRIPTION OF THE PREFERRED EMBODIMENT

Figure 1:
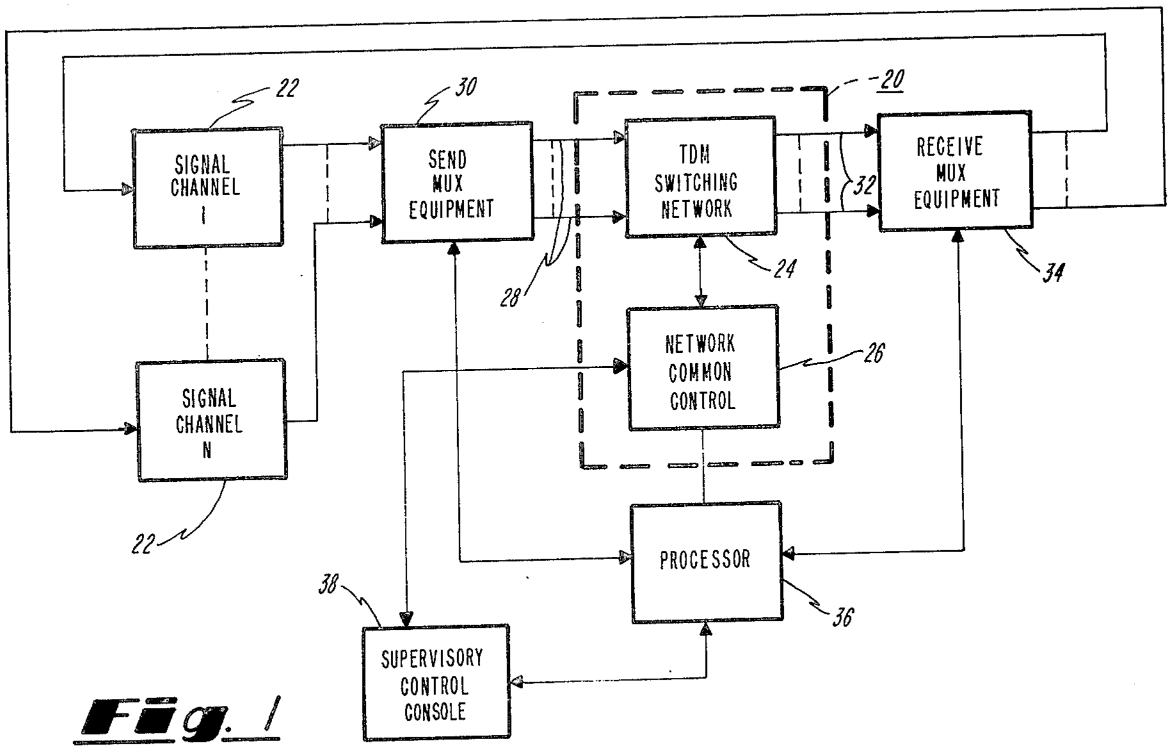
FIG. 1 is a block diagram of a first embodiment of the digital switching network of the invention.

The switching system 20 of the invention is adapted to be used in conjunction with a digital signalling system, as illustrated in FIG. 1, to provide a plurality of paths for the transmission of digital signals between various signal channels 22, such as for example, digital computers, pulse code modulated telephone systems, and the like. The switching system 20 of the invention includes a time division multiplex (TDM) switching network 24 that is controlled by a network common control circuit 26 to provide unidirectional digital signal flow between any one of a plurality of incoming TDM highways 28 from send multiplex (send MUX) equipment 30, and translates the digital signals via one of a plurality of outgoing TDM highways 32 to the receive multiplex (rec MUX) equipment 34. Each signal channel 22 has a connection to the send MUX equipment 30 and another connection to the receive MUX equipment 34 to allow duplex (bidirectional) signal transmission between signal channels. If unidirectional signalling is desired, the signal channels 22 can be connected to either the send MUX equipment 30, or to receive MUX equipment 34, depending upon whether the signal channels are to send, or receive signals.

The switching system 20, the send MUX equipment 30, and the receive MUX equipment 34 are controlled by a stored program processor or computer 36. The signal channels 22 to be interconnected, or disconnected, are selected by a supervisory control console 38. In response to the selection of signal channels, the computer 36 provides digital information to the network common control 26 for identifying the connections or disconnections to be made, and the network common control equipment 26 in turn selects the network path for the connection or disconnection. Alternatively the processor 36 can, in addition to identifying the connections to be made, designate the network path. If a connection or disconnection can not be made, the network control system signals the processor 36 of the same. Further commands from the processor 36 can, in turn, request additional information as to why the connection or disconnection failed.

Figure 16:
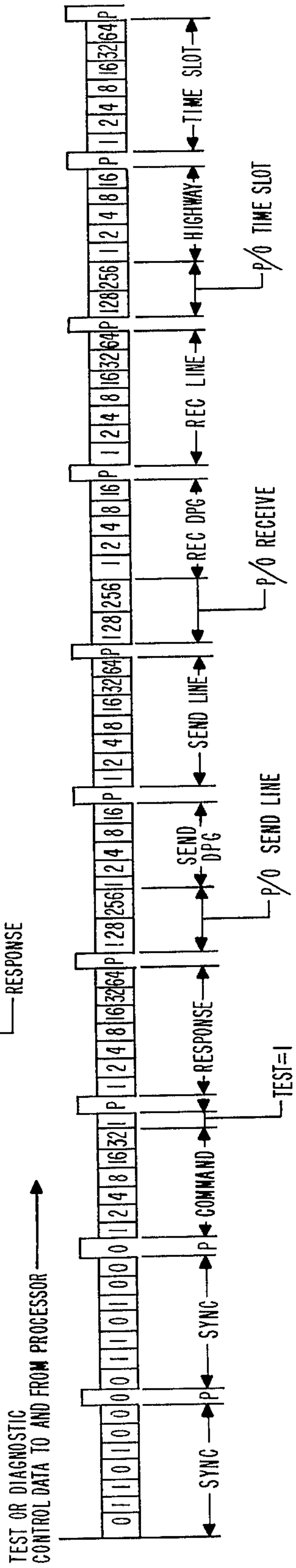
FIG. 16 is the test or diagnostic data format sent by the common control to the processor.

The computer 36 transmits to the network common control 26 the identity of the signal channels to be connected or disconnected by means of using the control data format in the test or diagnostic mode of operation (FIG. 16). Furthermore, the processor can provide instructions for tracing certain (single) or all (full) connections through the TDM switching network for identifying the busy signal channels, and TDM network switching time slots and interconnecting network highways, involved in a selected one, or all, completed connections through the network.

Figure 2:
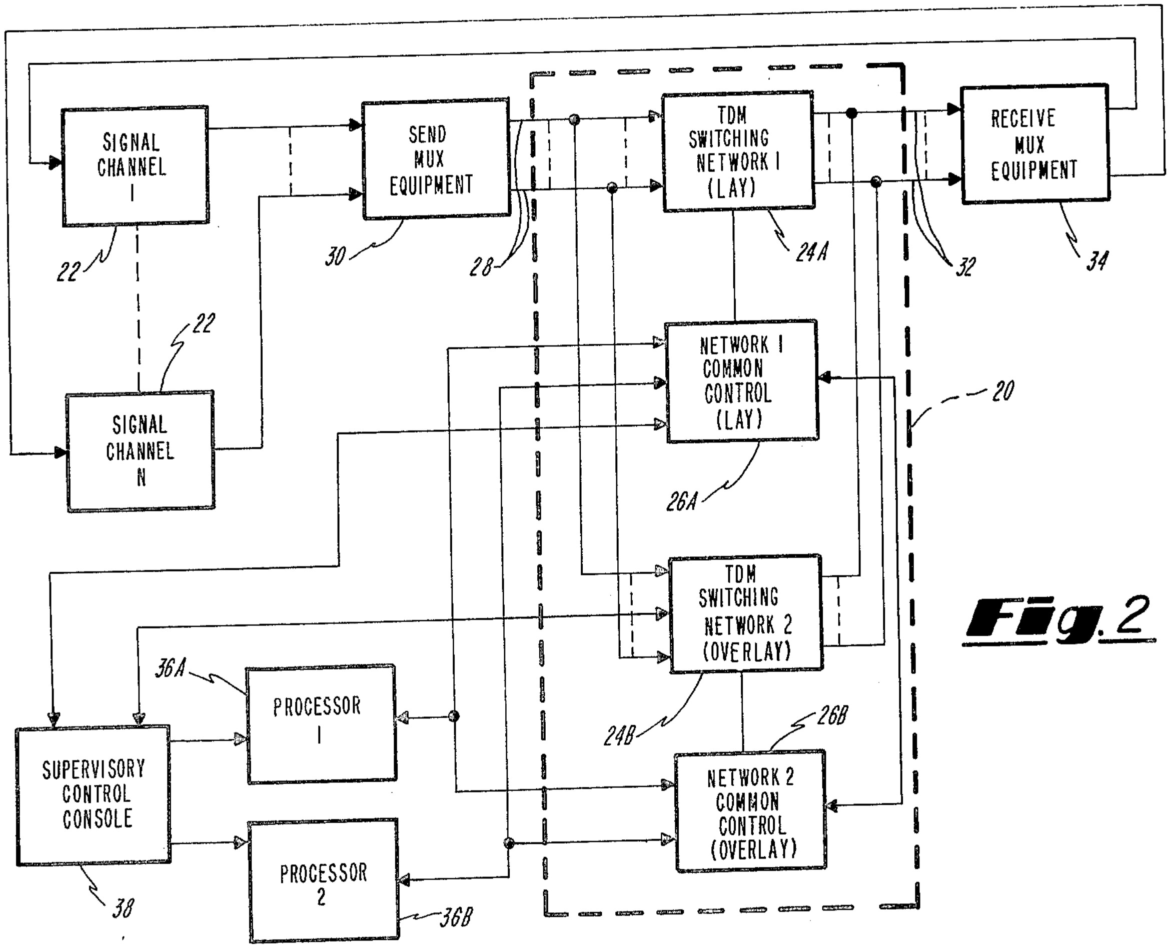
FIG. 2 is a block diagram of the digital switching network of the invention including a lay and overlay arrangement to provide non-blocking arrangement.

FIG. 2 includes a switching system 20 which provides two TDM switching networks 24A and 24B connected to form an overlay arrangement, each controlled by a separate common control 26A and 26B respectively. Each of the highways 28 and 32 are connected to both networks 24A and 24B. The common control circuits 26A and 26B are connected to a pair of processors 36A and 36B, and are also connected to the supervisory control console 38. The arrangement including two TDM switching networks, two common control systems and two processors provides duplication of equipment for reliability purposes, and, in addition, provides a non-blocking switching arrangement. By non-blocking we mean that a path is always available through at least one of the networks 24A and 24B between any two free (not busy) signal channels 22. Further information concerning non-blocking systems is available in an article entitled, "A Study of Non-Blocking Switching Networks", by C. Clos, which appeared in the "Bell System Technical Journal", Volume 32, March 1953, pages 406–424.

NETWORK BLOCK DIAGRAMS

Figure 3:
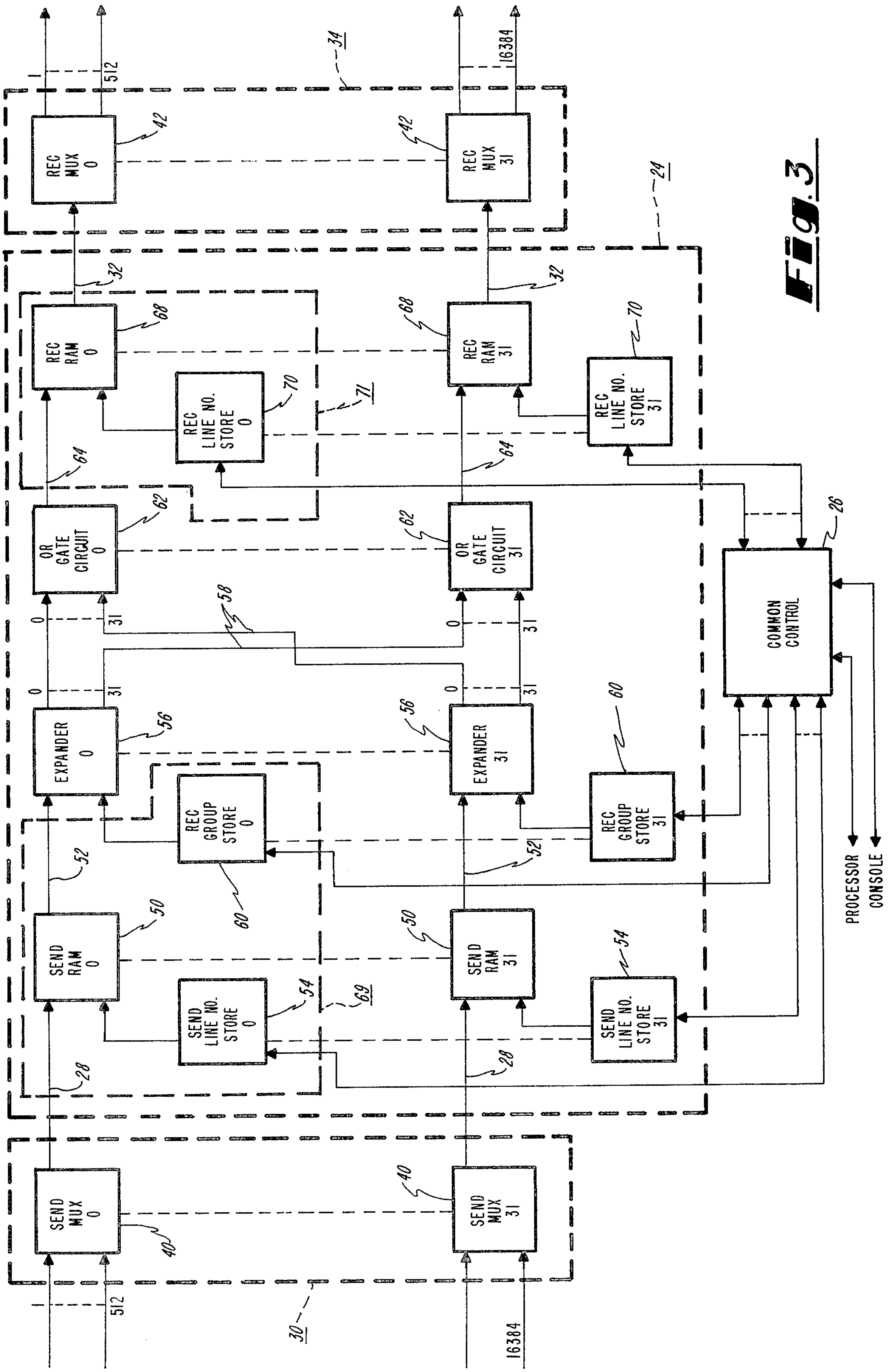
FIG. 3 is an expanded block diagram of a first embodiment of a type digital switching network of the invention.

FIG. 3 includes an expanded block diagram of a first embodiment of the TDM network 24 and the send and receive MUX equipment 30 and 34. The send and receive MUX circuits 30 and 34 include a plurality of separate send and receive MUX circuits 40 and 42, respectively. For purposes of illustration, both the send and receive MUX equipment 30 and 34 include 32 separate MUX circuits. Each send MUX circuit 40 has 512 input circuits or channels that can be connected to various separate sources of digital signals. Each receive MUX circuit 42 has 512 output circuits or channels that can be connected to separate input circuits of the various digital signal users. With the arrangement illustrated, there are 16,384 (32 × 512) input channels and the same number of output channels. A separate incoming line highway 28 (32 in total) is provided for each send MUX circuit wherein the 512 input channels are sampled in a consecutive sequence and are transmitted as a time divided series of signals over the corresponding outgoing line highway 32. In the same manner, a separate line highway 32 (32 in total) is provided for each receive MUX circuit 42 wherein the time divided outgoing signals on the outgoing line highway are sequentially applied to its 512 output channels in a consecutive sequence.

The input to the TDM switching network 20 includes a plurality of send random access memories 50 (send RAM), a separate RAM for each of the send MUX circuits 40. The send RAM circuit 50 accepts TDM data from its connected line highway 28. The incoming data on the highway 28 is in a preset consecutive sequence in accordance with the manner in which the 512 input channels are sampled by the send MUX circuits. The sampling sequence from the send MUX 40 is called "send line time slots". The send RAM circuit 50 stores the digital signals and retransmits the digital signals on a connected send highway 52 in a rearranged time divided sequence determined by the time slots selected for the connection. The time slot used in connection through the network is called the "switching time slot". Each send RAM circuit 50 is controlled by a separate send line number store circuit 54. Each send line number store 54 receives digital signals from the common control 26 for: (1) controlling the sequence in which the data is retransmitted by the send RAM circuit in accordance with preassigned network switching time slots, (2) storing in binary form the send line number identity in accordance with its switching time slot, (3) storing a busy signal for each busy switching time slot, and (4) storing a busy condition for each busy send line time slot. It is to be understood that the digital signals referred to above are high or low signal conditions, or the presence or the absence of signals, and are correspondingly transmitted through the network.

Each of the send RAM circuits 50 are connected via a separate send highway 52 to an expander or decoder circuit 56. The expander 56 provides a gating arrangement wherein any digital signal having any given switching time slot on a send highway 52 can be applied to any one of a plurality of interconnect highways 58. In the particular system illustrated, 32 interconnect highways 58 are provided. Each expander circuit 56 is controlled by a receive (rec) group store circuit 60. The receive group store circuit 60 functions, in response to digital signals from the common control circuit 26, to: (1) store in binary form the receive group number identities in accordance with their switching time slots, and (2) transmit, at the selected switching time slots, digital signals on the send highway 52 to any of the preselected interconnect highways 58.

Each of the interconnect highways 58 (the outputs of the expander circuits 56) are connected to separate inputs of each of a plurality of OR gate circuits 62 (32 of which are illustrated). The OR gate circuits 62 apply TDM signals from the interconnect highways 58 to its connected send highway 64 (a separate highway 64 is provided for each of the OR gate circuits 62). A separate receive random access memory (rec RAM) circuit 68 is provided for each OR gate circuit 62. Each separate receive RAM 68 is controlled by a separate receive (rec) line store circuit 70, that responds to signals from the common control 26 for: (1) storing in binary form the receive line number identities in accordance with their assigned switching time slots, (2) storing a busy signal for each busy switching time slot, and (3) controlling the sequence in which the data signals are retransmitted by the receive RAM 68. A separate receive MUX circuit 42 is connected to a receive RAM 68 via a separate receive line highway 32. The receive RAM circuits 68 function to receive data from its connected OR gate circuit 62 and to rearrange the data transmitted on the highways 32 so that the TDM signals appearing on the line highways 32 are synchronized with the sequential scanning arrangement of the receive MUX circuit 42.

Each send RAM 50, its send line number store 54, and a corresponding receive group store 60 is called a "send group" and is designated by the dashed lines 69. There are 32 send groups, a separate one for each associated expander 56 and a send MUX 40. In a similar manner, each receive RAM 68 and its receive line number store 70 is called a "receive group" and is designated by the dashed lines 71. There are 32 receive groups, a separate one for each associated OR gate circuit 62 and receive MUX 42. Each send group is interconnected via its expander 56 and an OR gate circuit 62 to each receive group via a separate one of the highways 58. The connections are made through the network 20 by identifying the send line (one out of 512 lines), the send group (one out of 32 groups), the receive group (one out of 32 groups) and the receive line (one out of 512 lines) as explained in a later portion of the specification. In the case of the overlay configuration of FIG. 2, both networks 24A and 24B include the apparatus of the block diagram of FIG. 3.

The arrangement is such that any of the 16,384 input channels connected to the send MUX circuits 40 can be connected on a time divided basis through the TDM switching network 20 to any of the 16,384 output channels of the receive MUX circuits 42 via the single network 24 of FIG. 1, or either one of the networks 24A or 24B of FIG. 2. The send RAM circuits 50 function to receive data from the send MUX circuits 40 on a time divided basis in accordance with the channel sampling sequence (send line time slots) of the send MUX 40. The TDM digital signals are stored in the send RAM circuits 50 and are retransmitted in a different sequence determined by the network switching time slots allotted to the connections through the network. The data appearing at the send highways 52 is switched via the expander 56 at the various allotted switching time slots to selected ones of the 32 available interconnect highways 58. The TDM digital signals on the interconnect highways 58 are accepted by OR gate circuits 62 and are applied via corresponding receive highways 64 and receive RAM circuits 68 to the appropriate receive MUX circuits 42. The receive RAM circuits 68 store the data and apply the stored data to the line highways 32 in synchronism with the operation of the connected receive MUX circuit 42, (receive line time slots) wherein the data appearing on the line highways 32 is at the proper sequence for application to the appropriate output channels.

Each of the send and receive RAM circuits include 512 bits of storage. A separate storage position is available for each of the 512 input or output channels of the respective send and receive MUX circuits. The switching system of the invention can function with the line time slots synchronized with the switching time slots, or with a non-synchronous arrangement provided the switching time slots have a higher repetition rate than the line time slots. With a synchronous arrangement, the binary signals can be stored in the send and receive RAM circuits in the sequence it is received and read out in accordance with the switching and line time slots, respectively. Alternately, the data can be stored in the send and receive RAM circuits in accordance with the switching time slots as designated by the send line store and receive line store, respectively, and automatically read out in sequence. With an asynchronous arrangement, the send RAM receives digital signals at the line time slot rate and the digital signals are read out at the switching time slot rate, while the receives RAM receive digital signals at the switching time slot rate and the digital signals are read out at the line time slot rate.

The digital signals in any one of the 512 storage positions in the send RAM circuits 50 can be applied to any one of the interconnect highways 58. In the same manner, any one of the 512 storage positions of the receive RAMs can be connected to receive data from any one of the interconnect highways 58. Hence, a single TDM time frame includes 512 time slots wherein 512 messages in each time frame can be transmitted on any combination of the 32 interconnect highways 58 providing for 16,384 TDM connections through the network 24.

Figure 4:
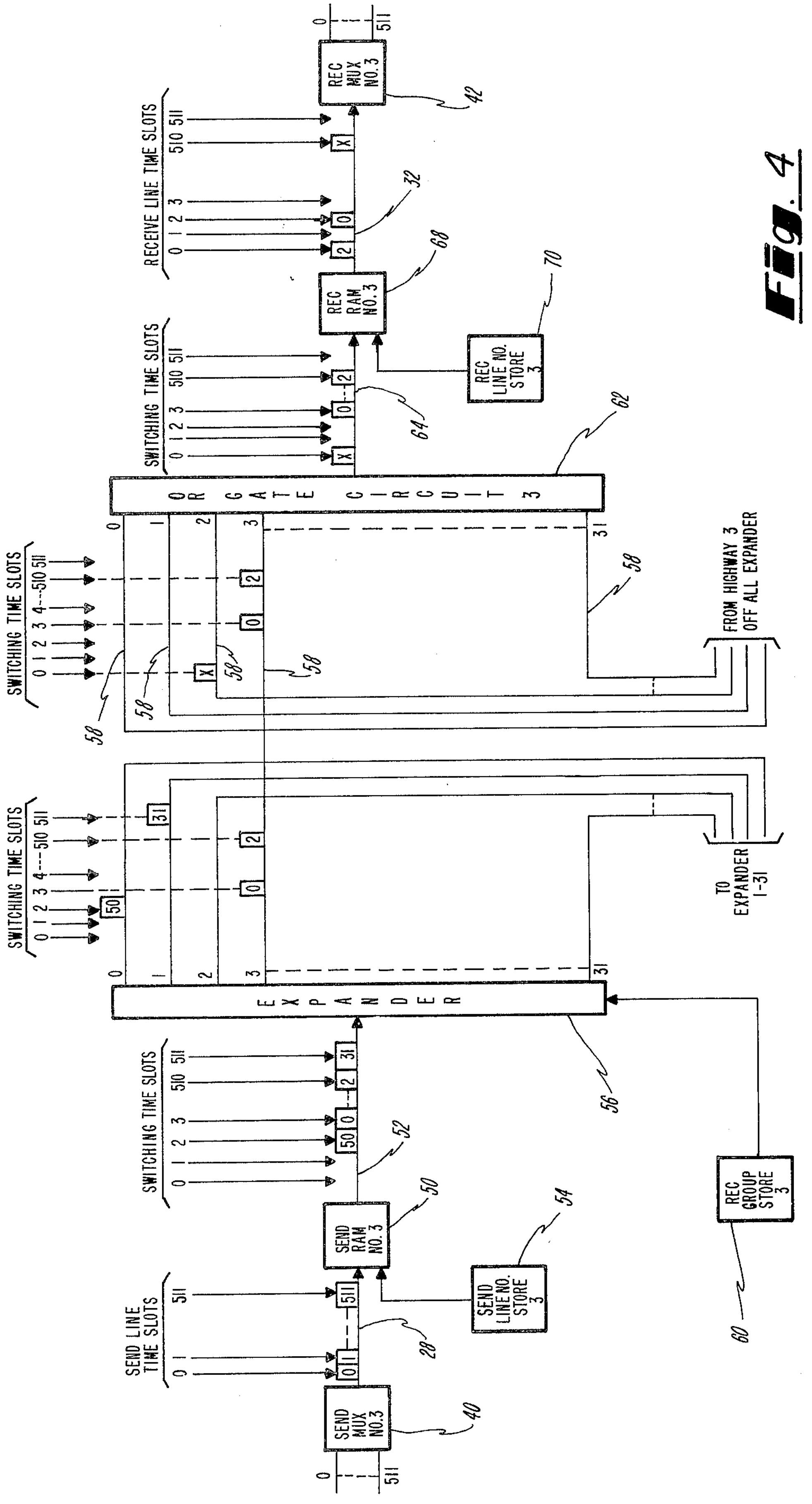
FIG. 4 is a flow diagram illustrating the operation of the block diagram of FIG. 3.

The operation of the TDM switching network of FIG. 3 can be further explained with reference to the simplified block diagram of FIG. 4 which discloses a duplex connection between channel 0 (line time slot 0) of send group 3 and channel 2 (line time slot 2) of receive group 3. For purposes of simplifying the explanation of the block diagram of FIG. 4, the same elements in FIGS. 3 and 4 are designated by the same reference numbers. The send and receive channels, the switching time slots, and the interconnect highways involved in the duplex connection are set forth in the following Chart:

| Conn. | Send Channel | Send Group | Rec Channel | Rec Group | Sw. Time Slot | Interconn. Highway |
|---|---|---|---|---|---|---|
| No. 1 | 0 | 3 | 2 | 3 | 3 | 3 |
| No. 2 | 2 | 3 | 0 | 3 | 510 | 3 |

Other connections between the illustrated send MUX and receive MUX circuit and other send MUX and receive MUX circuits (not shown) are partially illustrated as channels 50, 31 and X. The digital signals from the 512 input channels from the send MUX circuit 40 are transmitted in the form of sequential pulses on the send line highway 28 at send line time slots corresponding to the send channel numbers. The send RAM 50 of group No. 3 stores the input digital signals in a memory circuit in accordance with their line time slot identity in a binary number form. Digital signals from the send RAM 50 are retransmitted to the highway 52 under the control of the send line store circuit 54, which continues the same binary number at the switching time slot assigned to each connection.

The receive group store 60 enables the gate circuits of the expander circuit 56 (at the assigned switching time slots) to transmit digital signals from the various input channels on preselected interconnect highways 58. For example, the gate to highway No. 0 is enabled at switching slot 2 to transmit channel 50 signals, the gate to highway No. 3 is enabled at switching time slots 3 and 510 to transmit signals from channels 0 and 2, respectively, and the gate to highway No. 1 is enabled at switching time slot 511 to transmit channel 31 signal, etc.

Highway No. 3 from all the expanders 56 is connected to the OR gate 62 group 3 so that the signals on highway No. 3 are transmitted to the receive highway 64, group 3. As can be seen, the digital signals from the various channels are received by the receive RAM 68 of group 3 in accordance with the switching time slot allotted to each connection. The receive RAM 68, in response to signals from the receive line store 70, stores the digital signals in a memory in accordance with the assigned switching time slots and retransmits the digital signals at the receive line time slot rate so that the output from the receive RAM 68 is synchronized with the operation of receive MUX circuit 42, wherein the digital signals from the various send channels are retransmitted to the proper receive channels 22.

Hence, as can be seen from FIG. 4, the digital signals from the send channels are sequentially sampled in consecutive order appearing as a series of pulses on the send line highway 28. For any particular connection, the send line number store 54, the receive group store 60 and the receive line number store 70 are all assigned the same preset switching time slot. The send RAM 50, acting as a buffer store, accepts the send channel data and changes its timing sequence from that of its send line time slots to that of the assigned switching time slots. The receive group store 60 selects the interconnect highways 58 of the receive group over which the digital signals are to be transmitted during the allotted switching time slots. The receive RAM 68 receives the various digital signals in the order of their allotted switching time slot, and under the control of the receive line number store 70 and rearranges the time slots of the data to correspond with the receive line time slots of the receive channels. As can be seen, send channel 0 of send group 3 (having a send line time slot 0) is assigned the switching time slot 3, is gated on the interconnect highway 3 to receive group 3, and retimed by receive RAM 3 to appear during receive line time slot 2. In the other portion of the duplex connection, the send channel 2 of send group 3 (having a send line time slot 2) is assigned a switching time slot 510 and an interconnect highway 3 and then a receive line time slot 0 for transmission to receive channel 0 of receive group 3.

Figure 5:
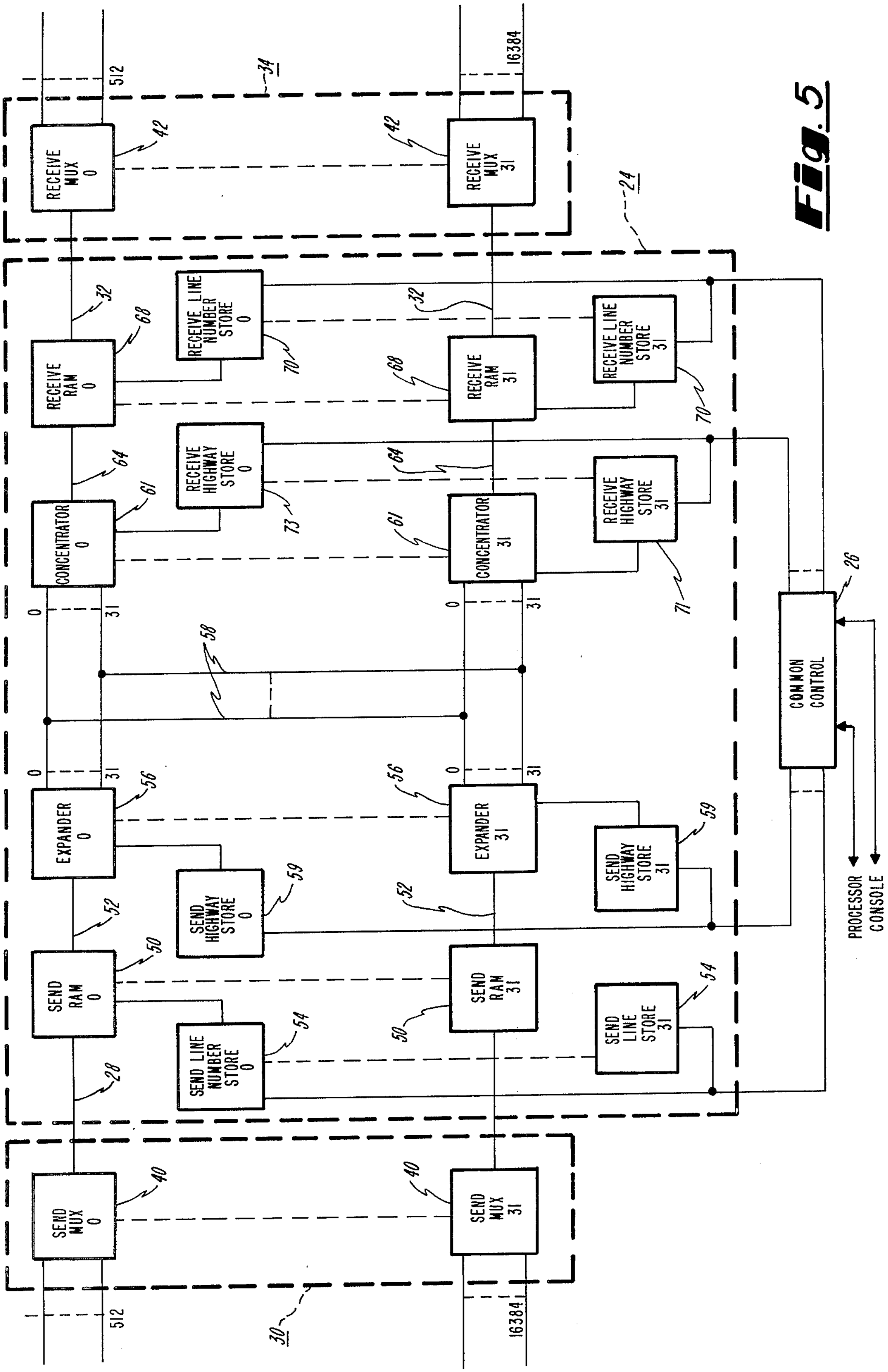
FIG. 5 is an expanded block diagram of a second embodiment of the digital switching network of the invention.

FIG. 5 includes an expanded block diagram of a second embodiment of the TDM network 24. For purposes of simplifying the explanation, the components of FIG. 5 that correspond to the components of FIG. 3 are designated by the same reference numbers. As in the case of the network of FIG. 3, the send MUX circuits 40 are connected by the line highways 28 to separate send RAM circuits and via the send highways 52 to the expander circuits 56. The outputs of the expander circuits 56 are connected via the interconnect highways 58 to separate concentrator circuits 61, the outputs of which are connected to receive RAM circuits 68 via receive highways 64. The output of the receive RAM circuits 68 are connected via receive line highways 32 to receive MUX circuits 42. As in the case of FIG. 3, the send RAM circuits 50 and receive RAM circuits 68 are controlled by the send line stores 54 and the receive line stores 70, respectively. The expanders 56 are controlled by separate send highway stores 59 while the concentrators 61 are controlled by separate receive highway stores 73.

As in the case of FIG. 3, the send RAMs 50 function to receive data from the send MUX circuits 40 on a time divided basis in accordance with the channel sampling sequence of the send MUX circuits. The TDM digital signals are stored in the send RAM circuits 50 and are retransmitted in a different sequence under the control of the send line stores 54 and determined by the network switching time slots allotted. The data appearing at the send highways 52 is switched by the expanders 56 under the control of the send highway stores 59 at the various switching time slots to selected one of the 32 available interconnect highways 58. The TDM digital signals on the interconnect highways 58 are accepted by selected ones of the concentrator circuits 61 under the control of the receive highway stores 73 and are applied via the corresponding receive highways 64 and the receive RAM circuits 68 to the appropriate receive MUX circuit 42.

Figure 6:
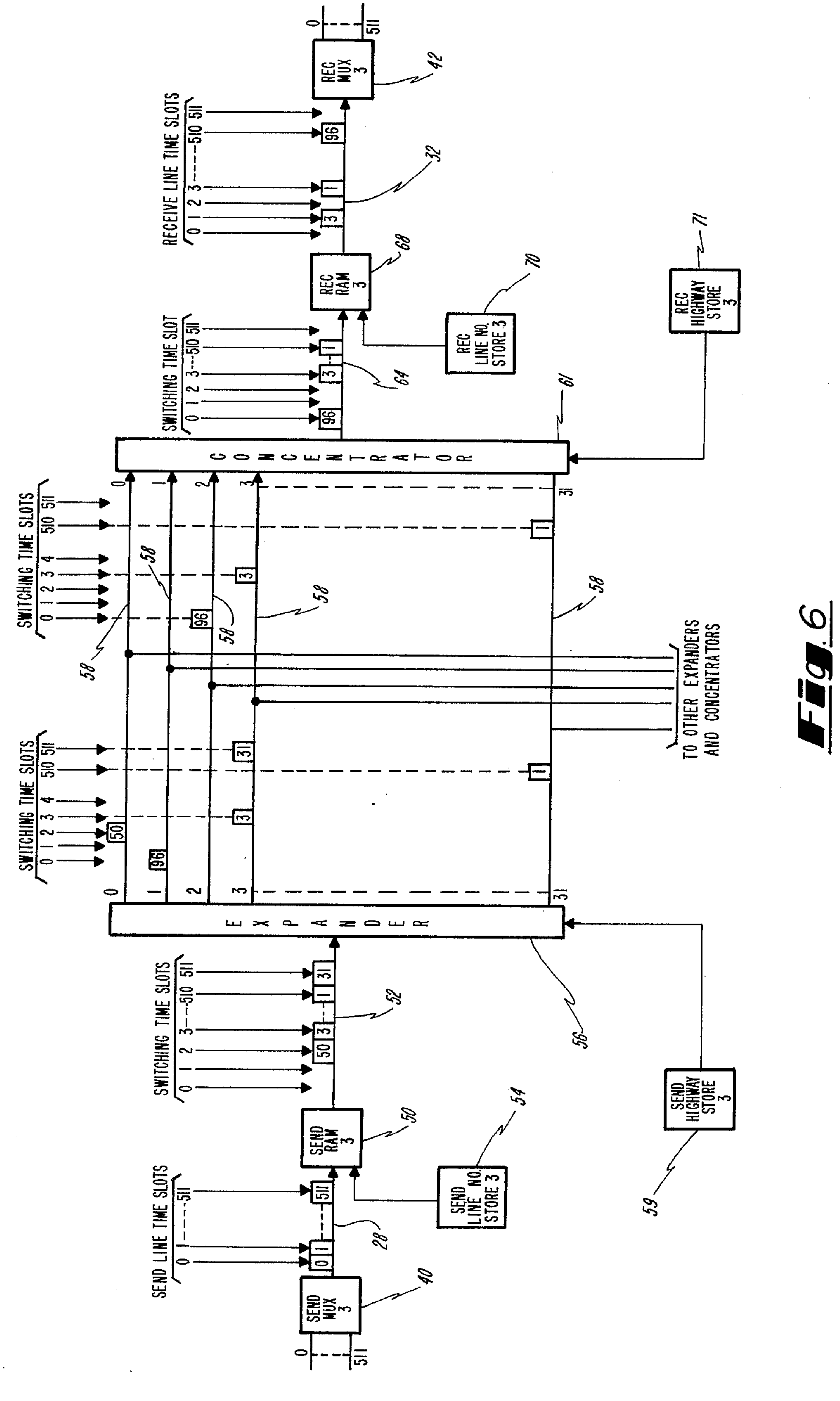
FIG. 6 is a flow diagram used in the explanation of the block diagram of FIG. 5.

The operation of the TDM switching network of FIG. 5 can best be explained with reference to the simplified block diagram of FIG. 6 disclosing a duplex connection between any send group and any receive group including a channel 3 (line time slot 3) and a channel 1 (line time slot 1). For purposes of simplifying the block diagram of FIG. 6, the same elements of FIGS. 5 and 6 are designated by the same reference numerals. The send and receive channels, the switching time slots, and the interconnect highway involved in the duplex connection are set forth in the following chart:

| Conn. | Send Channel | Send Group | Receive Channel | Rec Group | Sw. Time Slot | Interconn. Highway |
|---|---|---|---|---|---|---|
| No. 1 | 3 | 3 | 1 | 3 | 3 | 3 |
| No. 2 | 1 | 3 | 3 | 3 | 510 | 3 |

Other connections between the illustrated send MUX and receive MUX circuit and other send MUX and receive MUX circuits (not shown) are partially illustrated as channels 31, 50 and 96. The data from the 512 input channels from the send MUX circuit 40 is transmitted in the form of sequential pulses on the send line highway 28 wherein the send line time slots correspond to the send channel numbers. The send RAM 50, under the control of the send line store 54, transmits the digital signals in accordance with the switching time slot allotted to the connection. For example, send channel 3 is allotted the switching time slot 3, the send channel 50 is allotted the switching time slot 2, the send channel 1 is allotted the switching time slot 510 and the send channel 31 is allotted the switching time slot 511. The send channels 50 and 31 are involved in a connection other than the particular duplex connection specified above.

The send highway store 59 enables the gate circuits of the expander circuit 56 (at predetermined switching time slots) to transmit signals from the various input channels on preselected interconnect highways. For example, the expander is enabled at switching time slot 2 to transmit channel 50 data on interconnect highway No. 0, at switching time slot 3 to transmit channel 3 data on interconnect highway No. 3, at switching time slot 510 to transmit channel 1 data on interconnect highway No. 31, and at switching time slot 511 to transmit channel 31 data on highway No. 3.

The receive highway store 71 enables the concentrator circuit 61 at predetermined time slots to select those signals intended to be received. For example, the concentrator is enabled at switching time slot 0 to accept channel 96 signals from highway No. 1, at switching time slot 3 to accept channel 3 signals from highway 3 and at time slot 510 to accept channel 1 from highway No. 31. As can be seen, the digital signals from the various channels are received by the receive RAM 68 in accordance with the switching time slot allotted to each connection. The receive RAM 68, in response to signals from the receive line store 70, stores the data in a memory and retransmits the data so that the output from the receive RAM 68 is synchronized with the operation of receive MUX circuit 42 wherein the data from the various send channels is retransmitted to the proper receive channels.

Hence, as can be seen from FIG. 6, the data from the send channels is sequentially sampled in consecutive order appearing as a series of pulses on the send line highway 28. For any particular connection the send line store 54, the send highway store 59 and the receive highway store 71 are all assigned a preset switching time slot. The send RAM 50 accepts the send channel data and changes its timing sequence from that of the line time slot to that of the assigned switching time slot. The send highway store 59 and receive highway store 71 select the interconnect highway 58 over which the data is to be transmitted during the allotted switching time slot. The receive RAM 68 receives the various data channels in the order of their allotted switching time slot, and under the control of the receive line store 70, rearranges the time slots of the data to correspond with the line slots of the receive channels connected to the receive MUX 42. As can be seen, send channel 3 (having a send line time slot 3) is first assigned a switching time slot 3 and an interconnect highway 3, and then a receive line time slot 1. In the other portion of the duplex connection, the send channel 1, (having a send line time slot 1) was assigned a switching time slot 510 and an interconnect highway 31, and then a receive line time slot 3 for transmission to receive channel 3.

SEND AND RECEIVE RAMS

Figure 7:
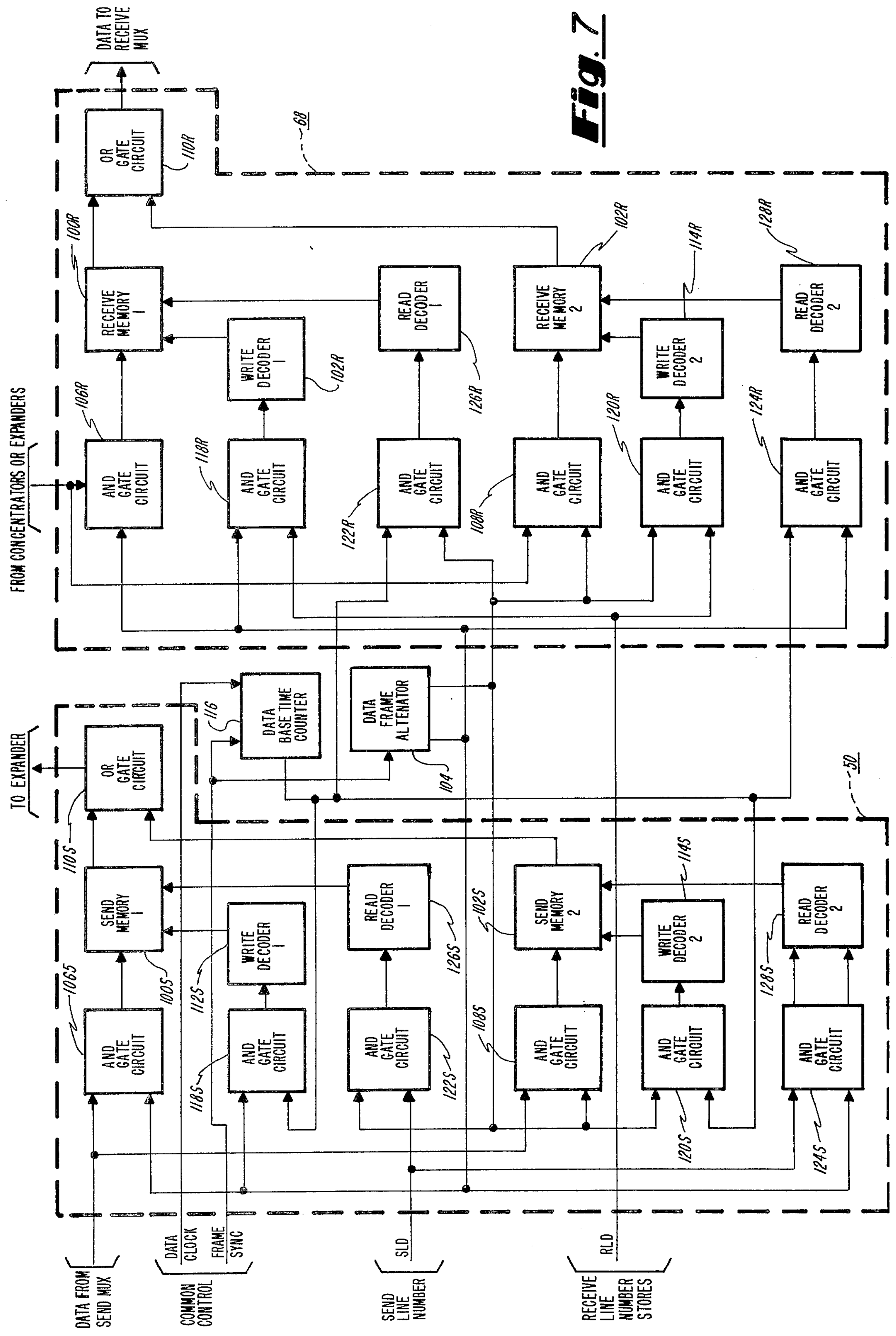
FIG. 7 is a block diagram of the send and receive random access memories in FIGS. 3 and 5.

FIG. 7 includes an expanded block diagram of the send RAM circuits 50 and the receive RAM circuits 68. The send and receive RAM circuits are essentially identical except for the source of the control signals for controlling the reception and transmission of digital signals. For purposes of simplifying the explanation, the same blocks in the send and receive RAMs will be designated by the same reference numerals followed by the letter (S) in case of the send RAM circuit and followed by the letter (R) in the case of the receive RAM circuit. Each send RAM and each receive RAM includes two memory circuits 100 to 102. The memory circuits 100 and 102 are alternately switched between write and read modes of operation for each frame of data (each 512 times slots) under the control of a data frame alternator 104. The data frame alternator 104 is essentially a flip-flop circuit which switches from one condition to another under the control of a frame sync signal which may be supplied by the common control circuit 26, or by the send MUX equipment.

Digital signals are applied to the memory circuits 100 and 102 via the AND gates 106 and 108, respectively. The input signals to the send AND gates 106S and 108S are received from the send MUX while the input signals to the receive AND gates 106R and 108R are received from the expander circuits or concentrator circuits via highways 58. Output signals from the memory circuits 100 and 102 are applied via an OR gate circuit 110S to the expander (in the case of the send RAM) and via the OR gate 110R (in the case of the receive RAM) to the receive MUX. The AND gate circuits 106 and 108 are alternately enabled by the data frame alternator 104, so that during one frame the gates 106 are enabled and during the subsequent frame the gates 108 are enabled.

The digital signals are written into the send memories 100S and 102S by the write decoder circuits 112S and 114S, respectively, under the control of a data base time counter 116 which receives data clock pulses from the common control 26 or MUX equipment. The counter output is applied to the write decoder 112S and 114S via the AND gate circuits 118S and 120S, respectively. The AND gates 118S and 120S are connected to be enabled by opposite outputs of the data frame alternator 104. The transmission of digital signals from the send memories 100S and 102S is under the control of the send line number store 54 in accordance with assigned switching time slots. The send line number store 54 is connected to the send memories 100S and 102S via the AND gate circuits 122S and 124S and the read decoders 126S and 128S respectively. The AND gates 122S and 124S are also connected to opposite outputs of the data frame alternator 104.

Hence, it can be seen that during one data frame the AND gate circuits 106S, 118S and 124S are enabled so that digital signals from the send MUX are written into the memory 100S under the control of the data base time counter 116, and digital signals are read out of the memory 102S under the control of the send line number store 54. During the next frame AND gates 108S, 120S and 122S are enabled so that digital signals from the send MUX are written into the send memory 102S under the control of the data base time counter 116, and read out from the memory 100S under the control of the send line store.

The received AND gates 106R, 108R, 118R, 120R, 122R and 124R are connected in the same manner as in the send RAM circuit except that the AND gates 106R and 108R receive digital signals from the expanders, the AND gate circuits 118R and 120R are connected to receive time slot switching signals from the receive line number store 70, and the AND gate circuits 122R and 124R receive line switching time slots from the data base time counter 116. Hence, it can be seen that during one frame period digital signals from the expanders are written into the receive memory 100R (synchronized with the switching time slots) under the control of the receive line number store 70, and digital signals are read out of the receive memory 102R (synchronized to the line time slots) under the control of the data base time counter 116. During the subsequent frame, the operation reverses wherein digital signals are written into the receive memory 102R and read out of the receive memory 100R.

EXPANDER BLOCK DIAGRAM

Figure 8:
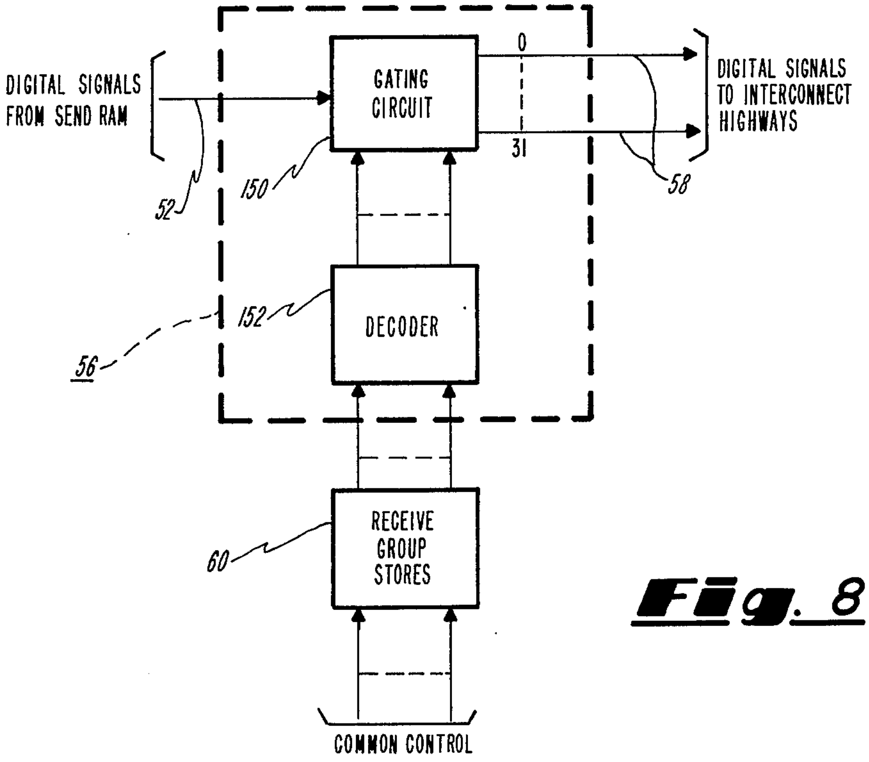
FIG. 8 is a block diagram of the expandor circuits of FIGS. 3 and 5.

FIG. 8 includes a block diagram of the expander circuit 56. The expander circuit includes a gating circuit 150 having a single input for connection to a send highway 52 and 32 outputs for connection to individual ones of the interconnect highways 58. Time sequenced signals for controlling the gating circuit 150 are generated by the receive group store circuit 60 in the case of the network of FIG. 3 (and the send highway store 59 in the case of the network of FIG. 5) which provide the binary signals (synchronized to the switching time slots) that are decoded by a decoder circuit 152 for enabling any one of the gating circuits at a preassigned switching time slot to complete a connection between a highway 58 and the send highway 58 during the switching time slot. Binary numbers are generated by the receive group store 60 at the various switching time slots to select the highway 58 extending to the designated receive group.

CONCENTRATOR BLOCK DIAGRAM

Figure 9:
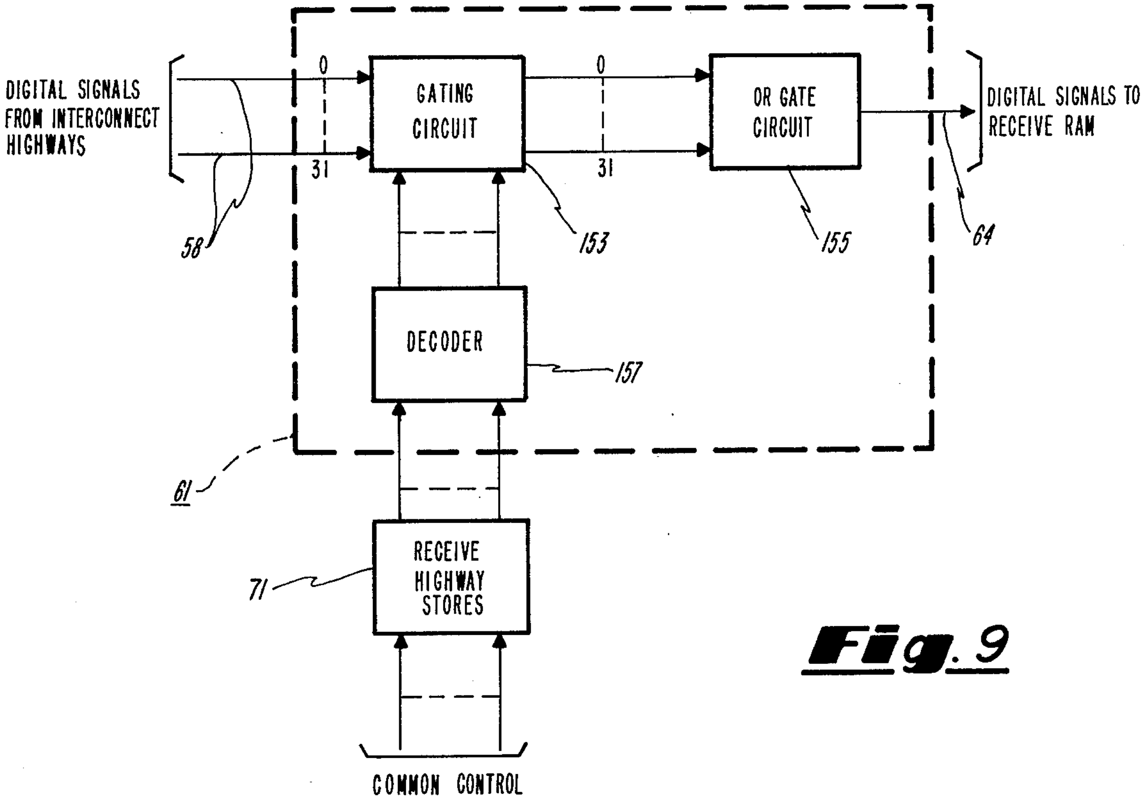
FIG. 9 is a block diagram of the concentrator circuits of FIG. 5.

FIG. 9 includes a block diagram of the concentrator circuit 56 of FIG. 5 including a gating circuit 153 having 32 input circuits connected to separate ones of the interconnect highways 58, and 32 output circuits connected to an OR gate circuit 155 for applying data from any one of the interconnect highways 58 to receive highway 64 at predetermined switching time slots in accordance with the assigned TDM connections through the network. The receive highway store circuit 71 produces time sequenced binary output signals which are decoded by a decoder circuit 157 to enable the gating circuit 153 at preassigned switching time slots to complete connections between any one of the interconnect highways 58 and the OR gate circuit 155 for transmitting the information from the interconnect highways into a receive highway 64.

LINE NUMBER GROUP AND HIGHWAY STORES

Figure 10:
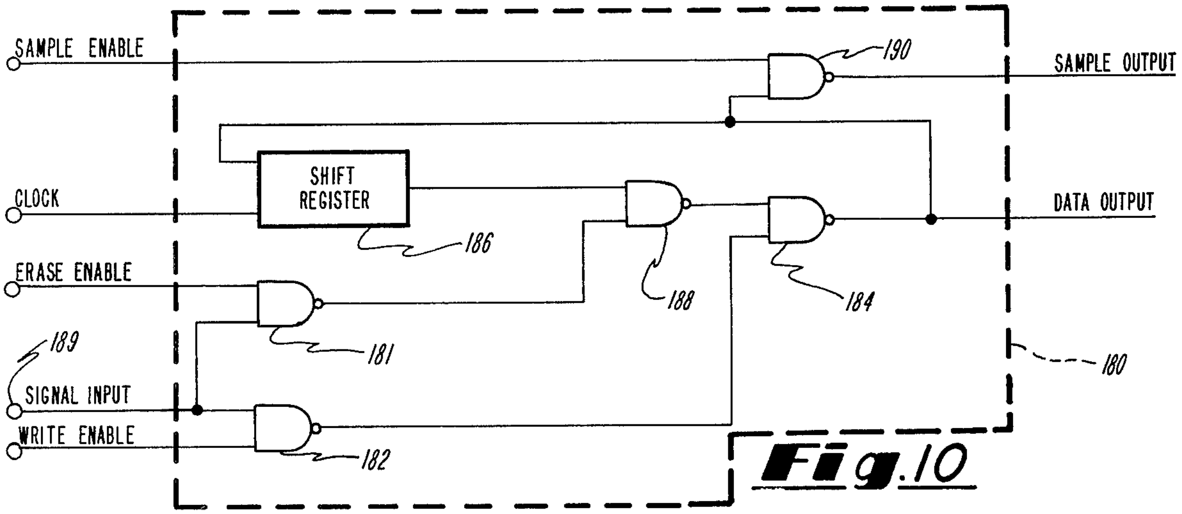
FIG. 10 is a schematic diagram of a recirculating memory used in the time slot stores of FIGS. 11, 12 and 13.

Each of the send line number stores 54, send highway stores 59, receive group stores 60, receive line number stores 70 and receive highway stores 73 are composed of a plurality of time slot store (TSS) circuits 180 illustrated in FIG. 10. The time slot store circuit 180 (FIG. 10) includes a shift register 186 having 512 storage positions. The shift register 186 receives clock pulses for recirculating the information stored in the register 186 via an erase NAND gate 188 and a write NAND gate 184 providing a continuous type recirculating memory arrangement. A NAND gate 190 has one input circuit connected to the output of the NAND gate 184 and another input connected to a sample enable terminal. The NAND gate 190 produces an output signal when the gate is enabled for indicating the presence or absence of a bit, or time slot, stored in the shift register 186. Control gates to write or erase bits into and out of the shift register 186 consist of a NAND gate 182 and a NAND gate 181, the outputs of which are connected to the write gate 184 and the erase gate 188, respectively. With a signal present on the signal input terminal 189 and a write enable signal, a bit is written into the shift register 186 by NAND gates 182 and 184. With an input signal on terminal 189 and an erase enable present, the NAND gate 181 disables the NAND gate 188 from recirculating the bit in the time slot to be erased.

Figure 11:
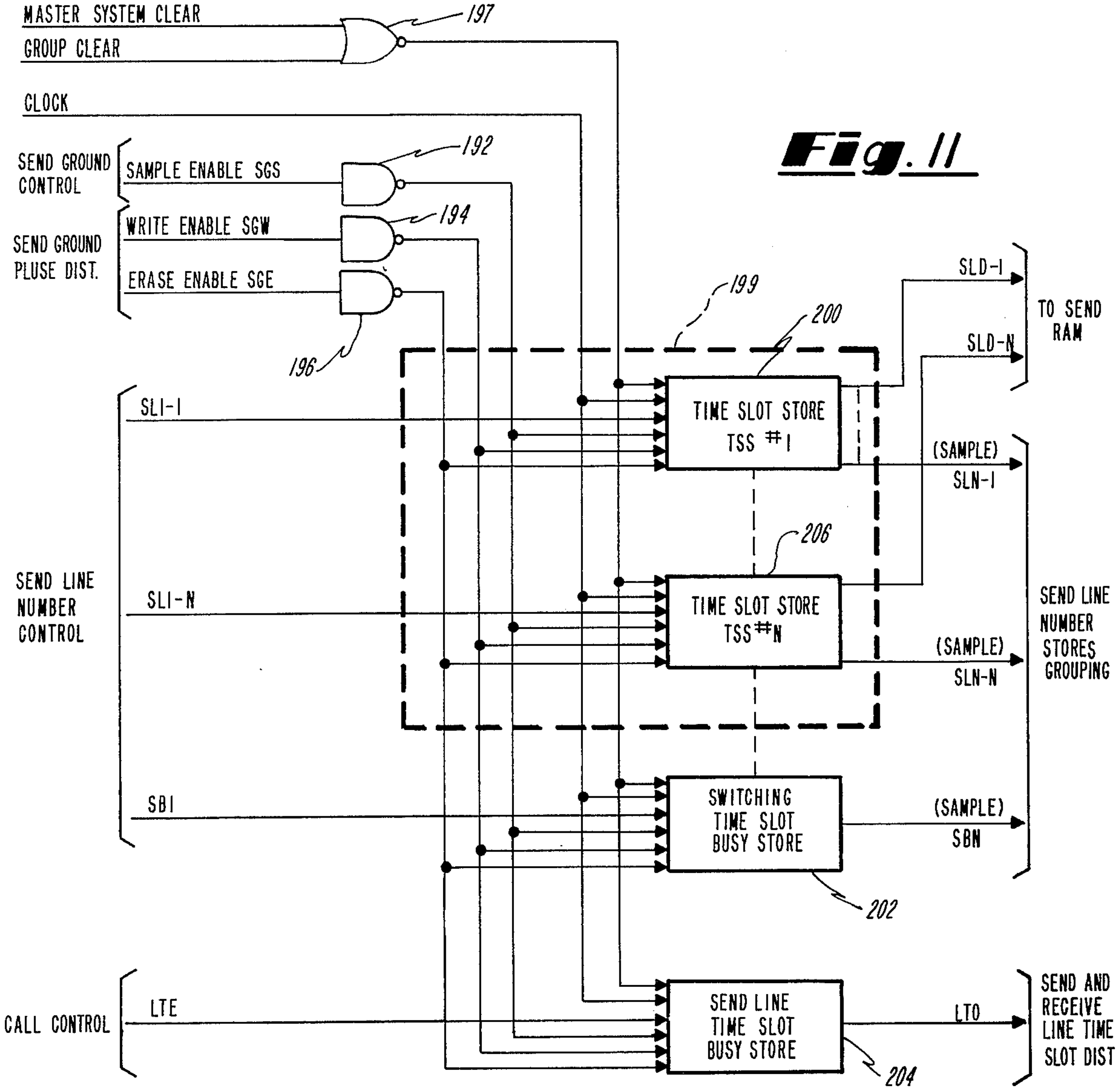
FIG. 11 is a schematic diagram of the send line number stores.
Figure 12:
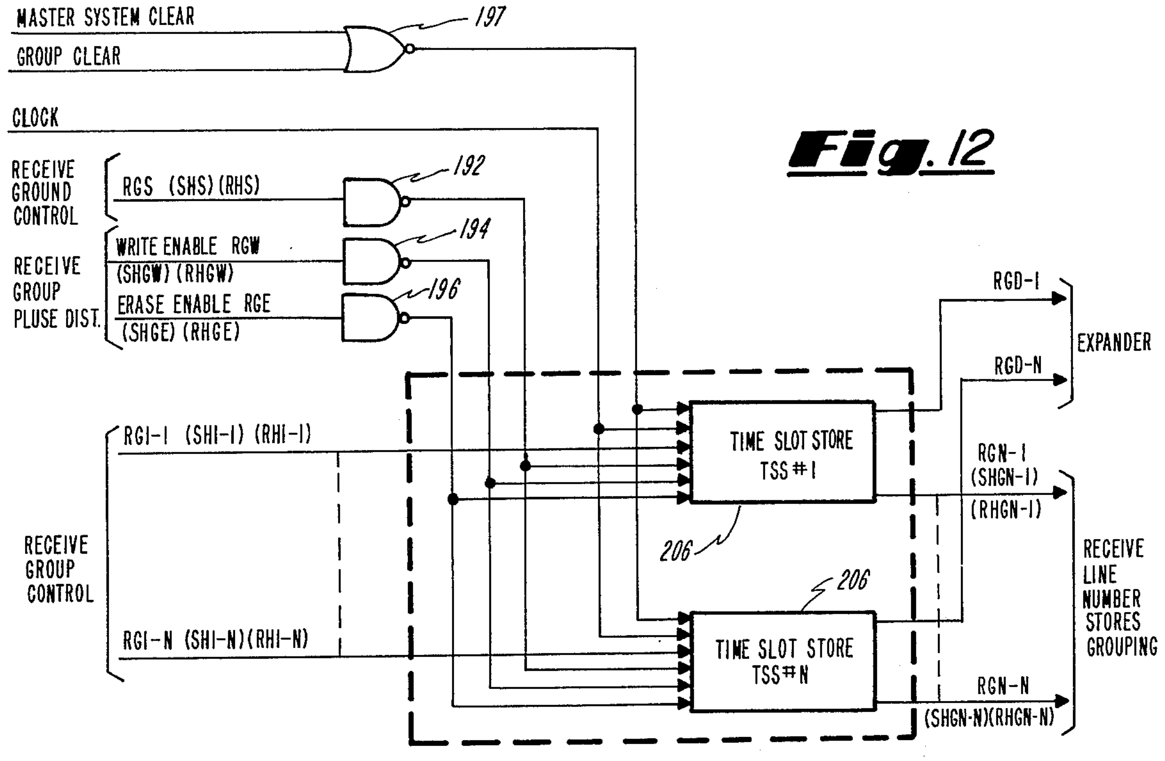
FIG. 12 is a schematic diagram of the receive group stores, send group stores and highway stores.
Figure 13:
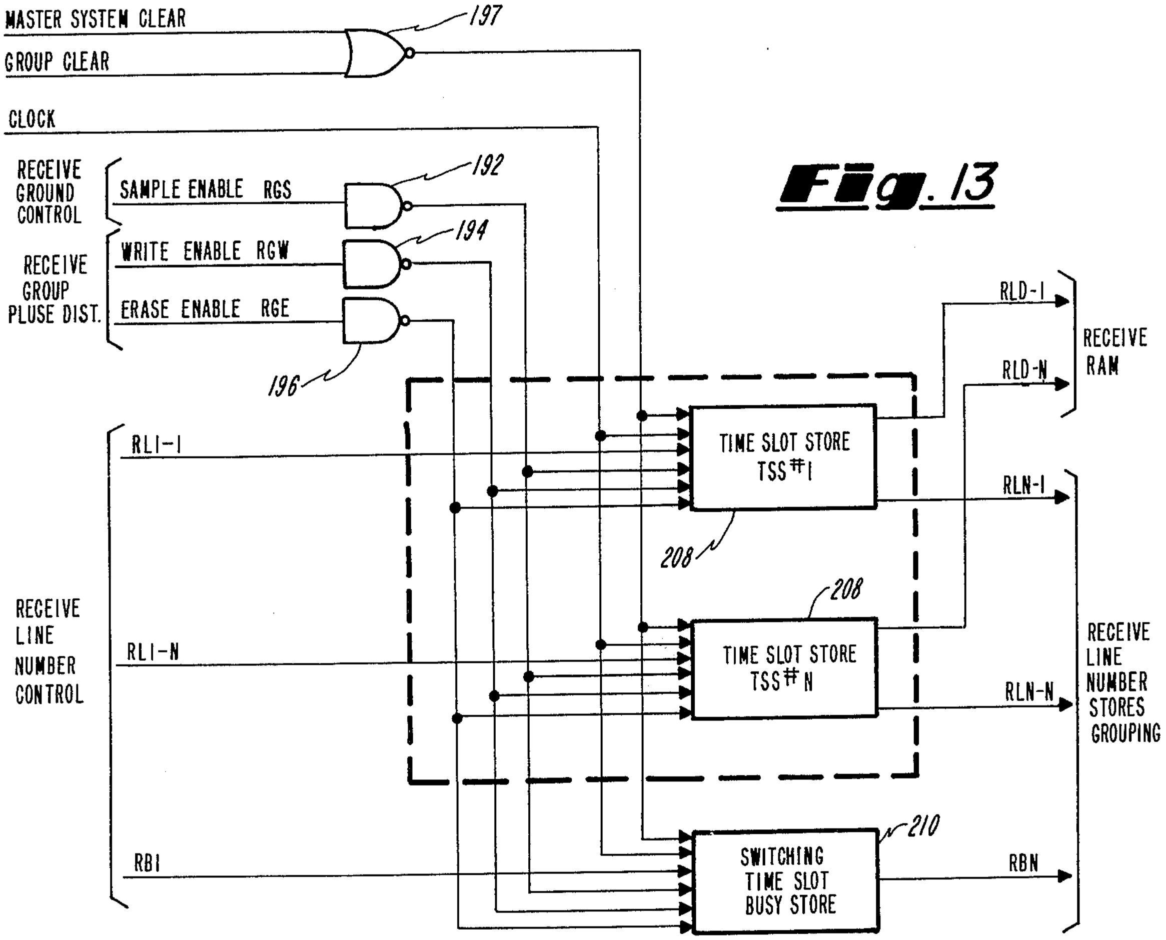
FIG. 13 is a schematic diagram of the receive line number stores.

The send line number stores 54, the send highway stores 59, the receive group stores 60, the receive highway store 73, and the receive line number stores 70 are all composed of a plurality of time slot stores TSS (each corresponding to the time slot store 180 of FIG. 10) arranged in a binary parallel fashion as illustrated in FIGS. 11, 12 and 13. Each of the time slot stores are connected to receive clock signals, a sample enable signal via an inverter 192, a write enable signal via an inverter 194, an erase enable signal via an inverter 196, and clear or reset signals via an OR gate 197. In addition, each of the time slot store circuits TSS have an input circuit for receiving data, and two output circuits, one to provide binary or digital control signals from the transfer of data and the other for providing binary or digital sampling or status information to the common control.

In the case of the send line number store 54 (FIG. 11). each send line store includes nine time slot stores 200 for providing nine bit binary control signals of the send line numbers in accordance with their assigned switching time slot, a time slot store 202 for providing a single bit indication of the busy-free condition of each switching time slot, and a time slot store 204 for providing a single bit indication of the busy-free condition of each line time slot (corresponding to each channel input). The circuit of FIG. 11 provides time sequenced binary control signals at the output circuits of each of the 512 storage positions in the registers in the time slot stores 200. The time sequenced binary control signals are applied to the AND gate circuits 122S and 124S (FIG. 7) of the send RAM 50 and also to the common control 26. At least 512 different binary numbers can be sequentially produced at the output circuits of the send line store circuit at each of the 512 switching time slots for controlling the digital signal inputs to the send RAM circuit. The switching time slot busy store 202 provides a bit for each of the 512 switching time slots in the particular send line store that have been assigned for completing a connection. The line time slot busy store 204 provides a bit for each of the 512 line time slots of the input channels connected to the particular send line store indicating the busy-free status of each input channel.

In the case of the receive group store 60, send highway stores 59 and the receive highway stores 73, there are five time slot store circuits 206 (FIG. 12) connected in parallel. The receive highway signals (in parentheses) are designated by the prefix RH, the send highway signals (in parentheses) are designated by the prefix SH and the receive group signals are designated by the prefix R. The arrangement is such that a five bit binary control number for switching through the expander 56 (or concentrator) to any of the 32 interconnect highways can be generated in sequence in any of the 512 storage positions. In the case of the receive group stores outputs of the time slot stores 206 are connected to the decoder 152 as illustrated in FIG. 8, and also to the common control. In the case of the receive highway store, the output of the time slot store 206 are connected to the decoder 157 as illustrated in FIG. 9, and also to the common control. Hence, it can be seen, at any of the 512 sequential switching time slots a binary control signal can be generated for enabling the expander via the decoder 152 for transmitting digital signals on the appropriate highway 58 to the selected receive group, and for enabling the concentrator via decoder 157 for receiving digital signals.

The receive line number store 70, (FIG. 13) like the send line number store 54, has nine time slot stores 208 connected in parallel to provide time sequenced nine bit binary signals of the receive line numbers in their assigned switching time slots, and an additional switching time slot busy store 210 providing a busy-free indication of the switching time slots assigned to connections in the particular receive group.

COMMON CONTROL BLOCK DIAGRAM

Figure 14:
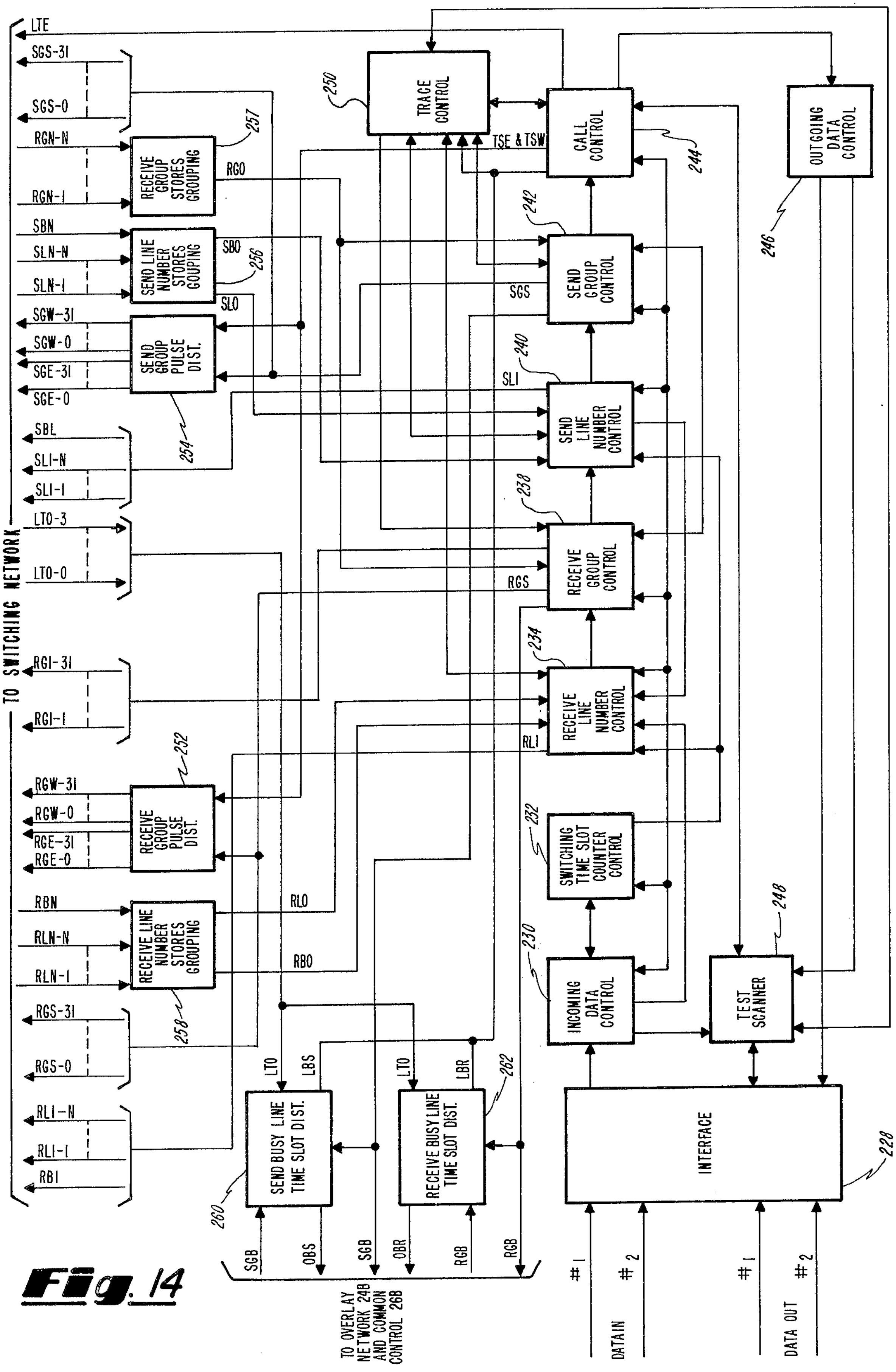
FIG. 14 is a block diagram of a common control circuit for use with the switching network of FIG. 3.

A block diagram of the common control circuit 26 for the switching network 24 of FIG. 3 is illustrated in FIG. 14. The common control circuit 26 includes seven "control register" circuits series connected to a computer interface circuit 228 for receiving data for making connections, making disconnections, and for tracing connections. The control register circuits include an incoming data control register circuit 230, a time slot counter control register circuit 232, a receive line number control register circuit 234, a receive group control register circuit 238, a send line number control register circuit 240, a send group control register circuit 242, and an outgoing data control register circuit 246. The call control circuit 244 sequences the operation of the common control. A test scanner circuit 248 is connected between the interface circuit 228, the incoming data control 230, outgoing data control 246, call control 244 and a trace control circuit 250.

Figure 15:
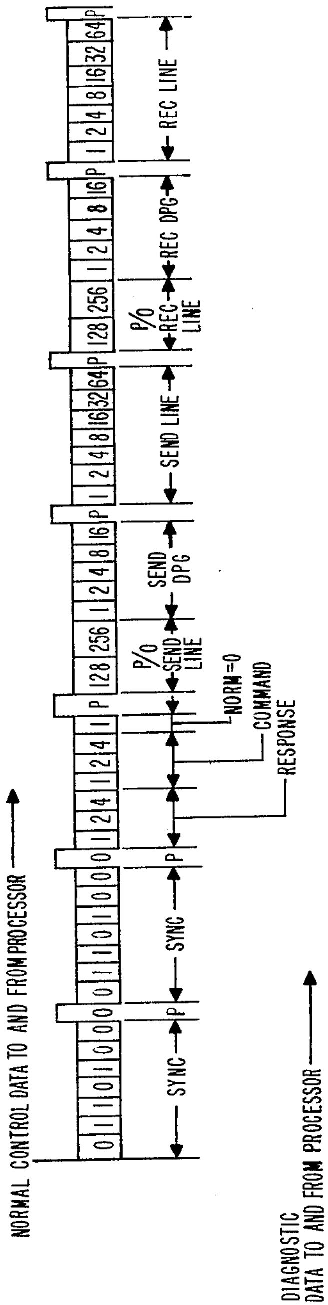
FIG. 15 is an illustration of the normal data format received and sent by the common control from the processor.

The incoming data control 230 is responsive to signals from the computer interface 228 for controlling the flow of data between the computer and the common control. The common control has two basic operations: i.e., (1) normal command and response, and (2) test command and response. The normal commands and responses are listed in the Table A of FIG. 17 while the test commands and responses are listed in Table B. Data is received from the computer in serial form, and in the case of a normal command includes sync information, party information, command type, send group data, send line number data, receive group data, and receive line number data as illustrated by the data format of FIG. 15. During a normal command, data is serially shifted from the incoming data control 230 to the receive line control 234 (bypassing the time slot counter control 232). In the case of a test command, the commands are received in the same manner, however, the responses are returned to the computer in greater detail including diagnostic determinations and switching time slots used. Under the control of the call control circuit 244, the connection specified by the computer data, is attempted. If a normal command is completed, or if the connection fails to complete, the call control circuit 244 signals the outgoing data control circuit 246 to transmit the corresponding response to the computer via the interface 228. In response to a failed connection, the computer activates the same command in the test mode, wherein the common control functions to determine the diagnostic reason a connection failed and the call control 244 provides the corresponding response via the outgoing data control 246. The data for the test mode is illustrated in the data format of FIG. 16.

The common control circuit also includes a trace control circuit 250 that is responsive to a trace command from the computer to trace any particular connection, or to provide a full trace indicating information for identifying all connections through the network.

Assume a normal duplex connection is to be established through the network. The command from the processor includes send and receive line number information, send and receive group information, a duplex connection command, and a normal mode indication. When all the information has been received and serially shifted into the appropriate control register circuit, a connection process is initiated that covers thereto four switching time slot frame periods for the initial simplex connection and six to eight for the duplex connection. The call control circuit 244 enables the receive group control circuit 238 and the send group control circuit 242 to send sample enable signals on one of the lines RGS-0 through RGS-31 and SGS-0 through SGS-31, respectively, to receive group pulse distribution circuit 252 and the send group pulse distribution circuit 254, respectively, and also to the receive line number store 70 in the selected receive group, and the send line number store 54 and receive group store 60 in the selected send group. Hence, only one send group 69, receive group 71 is enabled for sampling and writing or erasing information as determined by the send and receive group control circuits 242 and 238.

A free switching time slot is located by monitoring the lead SBN from the selected send number line store (FIG. 11) and the lead RBN from the selected receive line number store (FIG. 13). The leads SBN and RBN from the selected send line number store and the selected receive line number store extend to the send line number and receive group grouping circuit 256 and the receive line number grouping circuit 258 respectively. The grouping circuits 254 and 258 extend SB0 and RB0 signals to the receive and send line number controls 234 and 240 respectively. The signals SB0 and RB0 and the switching time slots are being used by the send and receive group controls 238 and 240 so that when common free switching time slot is detected in both the send and receive line number stores, call control 244 writes the switching time slot into the time slot counter control 232.

During the next frame, the common control makes a busy number test by comparing the binary outputs at the lines RLN-1 through RLN-N (FIG. 13) with the binary number in the receive line number control 234 via the receive line number grouping circuit 258. A send line busy check is made simultaneously by comparing the binary outputs at the lines SLN-1 through SLN-N (FIG. 11), with the binary number in the send line control 240 via the send line number grouping circuit 256.

In the case of an overlay arrangement (as illustrated in FIG. 2), the LTO outputs from the send line number stores (FIG. 11) are applied to a send busy line time slot distribution circuit 260 and a receive busy line distribution circuit 262 to determine if the send and receive lines are busy in the particular network (lay) controlled by the common control circuit. In addition, corresponding input signals are received from the other switching network (overlay) to determine if the send and receive lines are busy in the overlay network.

Assuming that the receive and send lines are free, the call control 244, at the selected switching time slot, applies a write enable signal to the receive group pulse distribution circuit 252 and the send group pulse distribution circuit 254 to apply a write signal RGW and SGW, respectively, to only the send line number store and the receive group number store in the selected send group 69 (FIG. 3), and to only the receive line number store in the selected receive group 71. The binary signals corresponding to the send line, receive line and receive group stored in the send line number control 240, receive line number control 234 and receive group control 238, respectively, are written into the selected send line store (via lines SLI-1 through SLI-N, FIG. 11), into the selected receive line store (via lines RLI-1 through RLI-N, FIG. 13), and into the selected receive group store (via lines RGI-0 through RGI-31, FIG. 12), respectively, at the first subsequent occurrence of the selected switching time slot, under the control of the time slot counter control 232. At the same time, a busy bit is written into the switching time slot busy stores 202 and 210 in the send line number store (FIG. 11) and the receive line number store (FIG. 13), respectively. In addition, when the line time slot corresponding to the selected send line number occurs, a bit is written into the line time slot busy store 204 (FIG. 11) in the selected send line store. The line time slot is derived by comparing the number in the send line number control 240 with the number being generated by the time slot counter control 232, which provides the timing base for the common control.

At this time, one half of the duplex connection is complete. Now a busy verify check is made during the next frame to verify that the first half of the connection is complete. When the selected switching time slot occurs in the following frame, the binary signals on the leads SLN-1 through SLN-N (FIG. 11) from the selected send line number store 54 are compared with the binary number in the send line number control 240, (via the grouping circuit 256) and the binary signals on the leads RLN-1 through RLN-N (FIG. 13) from the selected receive line number store 70 are compared with the binary number in the receive line control 234, (via the grouping circuit 257). If a proper comparison is made, a verification that the switching time slot is properly stored is completed. A line time slot check is also made to verify the proper storage of the send line time slot. If these checks verify properly, one half of the duplex connection is verified.

The call control circuit 244 now reverses the send and receive line information by placing the information previously stored in the receive line number control 234 and the receive group control 238 into the send line number control 240 and send group control 242, and vice versa. With the data so reversed, the procedure described above is repeated except for the busy check. The busy check initially made covers a duplex connection since the send line number store 54 contains both send and receive busy bits. When a free switching time slot is found, the send and receive line numbers are written into the send line number store 54 and the receive line number store 70, respectively, and the group number is written into the receive group store 60, all at the selected switching time slot. A busy verify check is made to assure the other half of the duplex connection is complete. When the duplex connection is complete, the call control 244 enables the outgoing data control 246 to send the data stored in the control registers to the processor in acknowledgment.

The process for disconnecting a prior connection is similar to the connection process mentioned above. The computer identifies the receive and send lines to be disconnected. The common control will first make a busy test to determine that the send and receive lines are actually busy, and if found busy, identifies the switching time slot by which they are connected and store the same in the switching time slot counter control 232. At the next occurrence of the switching time slot, the common control enables the receive group pulse distribution circuit 252 and the send group pulse distribution circuit 254 to erase during the selected switching time slot the receive and send line numbers group numbers stored in the receive and send line number stores and the receive group store. At the same time, the bit in the switching time slot busy stores in both the send and receive line stores are erased, while the bit corresponding to the send line time slot is erased from the line time slot busy store in the send line number store. A busy verify test is then made to assure that one half of the duplex connection has been disconnected. If the disconnect is verified, the data in the receive line number control 234, and the receive group control 238 is shifted into the send line number control 240 and the send group control 242, respectively, and vice versa. The common control now identifies the switching time slot for the other one half of the duplex connection and stores the same in the time slot counter control 232. When the next switching time slot appears the receive and send group distribution circuits 252 and 254 are enabled so that the line and group numbers are erased from the send line number store 54, the receive group store 60 and the receive line number store 70. A comparison is now made of the send line number store with the time slot in the switch time slot control 232. When a comparison is present, the bit in the send line time slot store is erased. A verify test on the switching time slot and send line number is made to be sure that the disconnection has been made. If the disconnection has been properly made, and verified, the call control 244 enables the outgoing data control 246 to signal the computer that the disconnection is completed.

Should a connection command fail to be completed or should a disconnect command fail anywhere during the connect or disconnect procedure, the procedure is stopped and the outgoing data control 246 signals the computer that the command cannot be completed with reference to the normal response in Table A (FIG. 17). Should the operator desire further diagnostic information as to why the command could not be completed, the computer again inserts the data for the command, however inserting the test mode command of Table B (FIG. 17) wherein the outgoing data control 246 after a second attempt at the command provides a detailed diagnostic indication of why the command cannot be completed.

The trace control 250 provides a feature wherein upon a trace command from the computer, the data corresponding to any particular connection can be identified and transmitted to the computer, or the data concerning all existing connections through the network can be provided to the computer. In the case of the latter arrangement, the trace control will systematically scan the entire switching network so that the common control can monitor, in sequence, the status of all of the send lines and their connections.

The test scanner 248 includes a test call generator which continually generates connect, disconnect commands for all possible connections starting with a dedicated send test channel. The test scanner generates test calls only during idle times, i.e., if the incoming data control 230, outgoing data control 246, trace control 250 and call control 244 are not busy. When a test call is present, then a scanner is enabled to follow a sequence of events, and in case a test call fails, to signify the cause of the failure.

Figure 18:
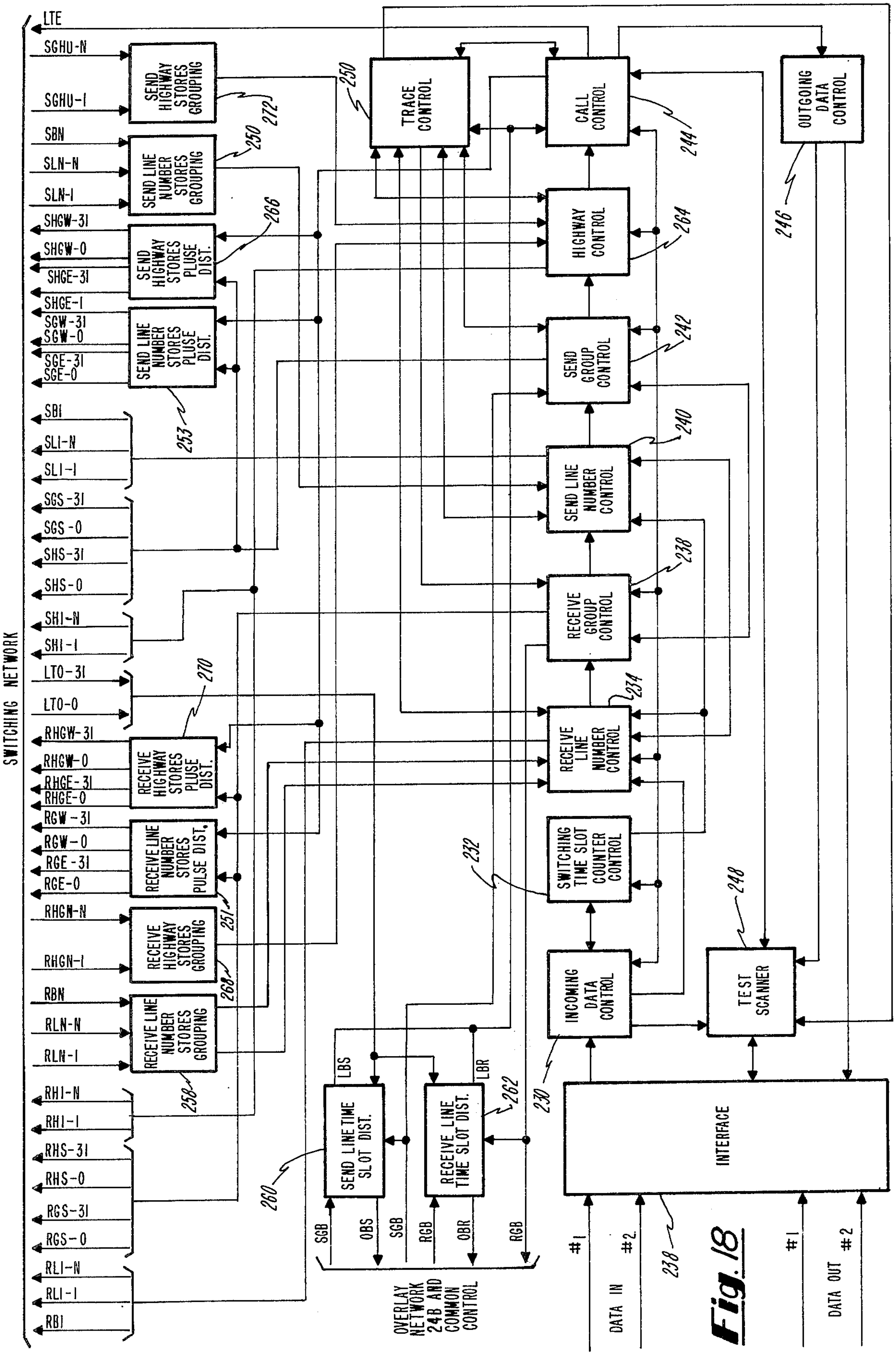
FIG. 18 is a block diagram of a common control circuit for controlling the switching network of FIG. 5.

FIG. 18 includes a block diagram of the common control system for the switching network 24 of FIG. 5. The common control system of FIG. 18 is similar to that of FIG. 14 except for the addition of a highway control circuit 264, a receive highway stores grouping circuit 268, receive highway stores pulse distribution circuit 270, send highway stores pulse distribution circuit 266, send highway stores grouping circuit 272 (instead of the receive group stores grouping circuit 257) send line number pulse distribution 253 (instead of the send group pulse distribution 254) and the receive number line pulse distribution 251 (instead of the receive group pulse distribution 252). In addition, the block diagram of FIG. 18 includes the leads RHS, RHGN, RHGE, RHGW, RHI, SHS, SHI, SHGN, SHGE and SHGW for applying and/or receiving signals from the receive highway stores 73 and the send highway stores 59.

Assume a normal duplex connection is to be established through the network. The command from the processor includes send and receive line number information, send and receive group information, a duplex connection command, and a normal mode indication. When all the information has been received and serially shifted into the appropriate control register circuit, a connection process is initiated that covers four switching time slot frame periods. The call control circuit 244 enables the send group control circuit 242 to send sample enable signals on one of the lines SHS-0 through SHS-31 and SGS-0 through SGS-31 to the send highway pulse distribution circuit 266 and the send line pulse distribution circuit 253, respectively, and also to the send line number store 54 and the send highway store 59, respectively, in the selected send group. The call control circuit 244 also enables the receive group control circuit 238 to send sample enable signals on one of the lines RGS-0 through RGS-31 and RHS-0 through RHS-31 to the receive highway pulse distribution circuit 270 and the receive line pulse distribution circuit 251 and also to the receive line number store 70 and the receive highway store 71 in the selected receive group. Hence, only the send line number store, the send highway store in the selected send group, the receive line number store and the receive highway store in the selected receiver group are enabled for sampling and for writing and erasing information.

A free switching time slot is located by monitoring the lead SBN from the selected send number line store (FIG. 11) and the lead RBN from the selected receive line number store (FIG. 13). The leads SBN and RBN from the send line number store and the receive line number store extend to the send line number grouping circuit 256 and the receive line number grouping circuit 258, respectively. The grouping circuits 256 and 258 extend SBO and RBO signals to the send and receive line number controls 240 and 234, respectively. The signals SBO and RBO and the switching time slots are used by the send and receive line number control 240 and 234 so that the time slot counter control 232 can detect when coincidence of a common free time slot occurs.

The highway control circuit 264 includes a highway busy table that provides an indication of the busy-free status of each of the highways 58 at each of the switching time slots. The highway control 264 also includes a priority chain circuit that selects a free highway for the selected switching time slot. If no highway is free for the selected switching time slot, another switching time slot will be selected. With the switching time slot selected and the highway selected, the call control 244 writes the switching time slot in the time slot counter control 232 and the highway in the highway control 264.

During the next frame, the common control makes a busy number test by comparing the binary outputs at the lines RLN-1 through RLN-N (FIG. 13) with the binary number in the receive line number control 234 via the receive line number grouping circuit 258. A send line busy check is made by comparing the binary outputs at the lines SLN-1 through SLN-N (FIG. 11), with the binary number in the send line control 240 via the send line number grouping circuit 256. A busy check is also made in the overlay.

Assuming that the receive and send lines are free, at the selected switching time slot, the call control 244 applies a write enable signal to the receive line number pulse distribution circuit 251, the receive highway pulse distribution circuit 270, the send line number pulse distribution circuit 253 and the send highway pulse distribution circuit 266 to apply a write signal to the receive line number store 70 and the receive highway store 71 in the selected receive group, and to the send line number store 54 and the send highway store 59 in the selected receive group, respectively. At this time the selected highway and the switching time slot is written into the highway busy table. The binary signals corresponding to the send line number receive line number and highway number stored in the send line number control 240, receive line number control 234, are written into the selected send line store (via lines SLI-0 through SLI-N, FIG. 11), into the selected receive line number store (via lines RLI-0 through RLI-N, FIG. 13), into the selected send highway store (via lines SHI-1 through SHI-N, FIG. 12) and into the receive highway store (via lines RHI-1 through RHI-N) at the first subsequent occurrence of the selected switching time slot (under the control of the time slot counter control 232). At the same time a busy bit is written into the switching time slot busy stores 202 and 206 in both the send line number store (FIG. 11) and the receive line number store (FIG. 13). In addition, when the line time slot corresponding to the selected send line number occurs, a bit is written into the line time slot busy store 204 (FIG. 11) in the selected send line number store.

At this time, one half of the duplex connection is complete. Now a busy verify check is made during the next frame to verify that the first half of the connection is complete. When the selected switching time slot occurs in the following frame, the binary signals on the leads SLN-1 through SLN-N (FIG. 11) from the selected send line number store 54 are compared with the binary number in the send line number control 240, (via the grouping circuit 256), the binary signals on the leads RLN-1 through RLN-N (FIG. 13) from the selected receive line number store 70 are compared with the binary number in the receive line number control 234 (via the grouping circuit 258), the binary signals on the leads SHGN-1 through SHGN-N and RHGN-1 through RHGN-N are compared with the highway number stored in the register in the highway control 264. If a proper comparison is made, a verification is made that the transfer of data corresponding to the send line, the receive line switching time slot and highway is properly completed. A line time slot check is also made to verify the proper storage of the send line time slot. If these checks verify properly one half of the duplex connection is verified.

The call control circuit 244 now reverses the send and receive line number information by placing the information previously stored in the receive line number control 234 and the receive group control 238 into the send line number control 240 and send group control 242, and vice versa. With the data so reversed, the procedure described above is repeated except for the busy check. The busy check initially made covers a duplex connection since the send line number store 54 contains both send and receive busy bits. When a free switching time slot and highway is found the send and receive line numbers are written into the send line number store 54 and the receive line number store 70, respectively, and the highway number is written into the send highway store 59, and the receive highway store 71, all at the selected switching time slot. A busy verify check is made to assure the other half of the duplex connection is complete. When the duplex connection is complete, the call control 244 enables the outgoing data control 246 to signal that the duplex connection is complete.

The process for disconnecting a prior connection is similar to the connection process mentioned above. The computer identifies the receive and send lines to be disconnected. The common control will first make a busy test to determine that the send and receive lines are busy, and if found busy, identifies the switching time slot and highway by which they are connected and stores the same in the switching time slot counter control 232 and in the register of the highway control 264. At the next occurrence of the switching time slot, the call control 244 enables the receive line pulse distribution circuit 251 and the send line pulse distribution circuit 253, the receive highway pulse distribution circuit 270 and the send highway pulse distribution circuit 26 to erase (during the designated switching time slot) the receive and send line numbers and the highway number in the receive and send line number stores and the receive and send highways. At the same time, the bit in the switching time slot busy stores in both the send and receive line number stores, while the bit corresponding to the send line number time slot is erased from the line time slot busy store in the send line number stores. A busy verify test is then made to assure that one half of the duplex connection has been disconnected. The highway and the switching time slot information is erased from the highway busy table in the highway control 264. The data in the receive line number control 234, and the receive group control 238 is shifted into the send line number control 240 and the send group control 242, respectively, and visa versa. The common control now identifies the switching time slot and highway for the other one half of the duplex connection and stores the same in the time slot counter control 232 and the register in the highway control 264. When the switching time slot appears again, the receive line, send line, receive highway and send highway distribution circuits 251, 253, 270 and 266 are enabled so that the line and highway numbers are erased from the send line number store 54, the receive line number store 70, the receive highway store 71 and the send highway store 59. The busy bits in the switching time slot busy store 202 and 210 (FIGS. 11 and 13) are erased. A comparison is now made of the send line number store 54 with the time slot in the switching time slot control 232. When a comparison is present, the bit in the send line time slot busy store 204 (FIG. 11) is erased. A verify test on the switching time slot and the send and receive line numbers is made to be sure that the disconnection has been made. If the disconnection has been properly made, and verified, the highway and the switching time is erased from the highway busy table. The call control 244 enables the outgoing data control 246 to signal the computer that the disconnection is completed.

GROUPING CIRCUITS

Figure 19:
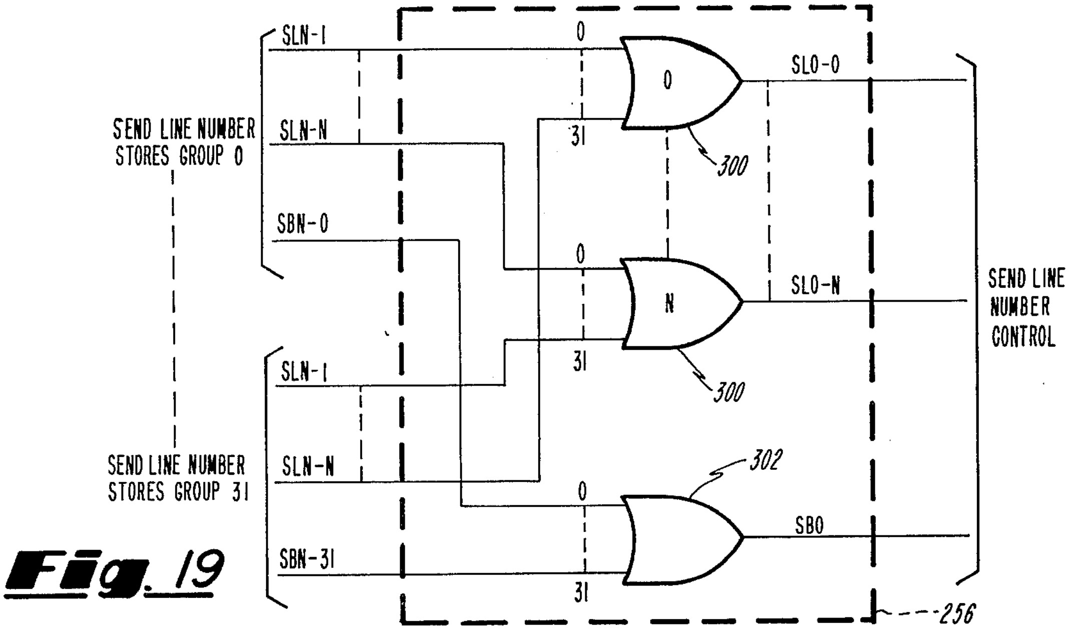
FIG. 19 is a schematic diagram of the send line number grouping circuits.
Figure 20:
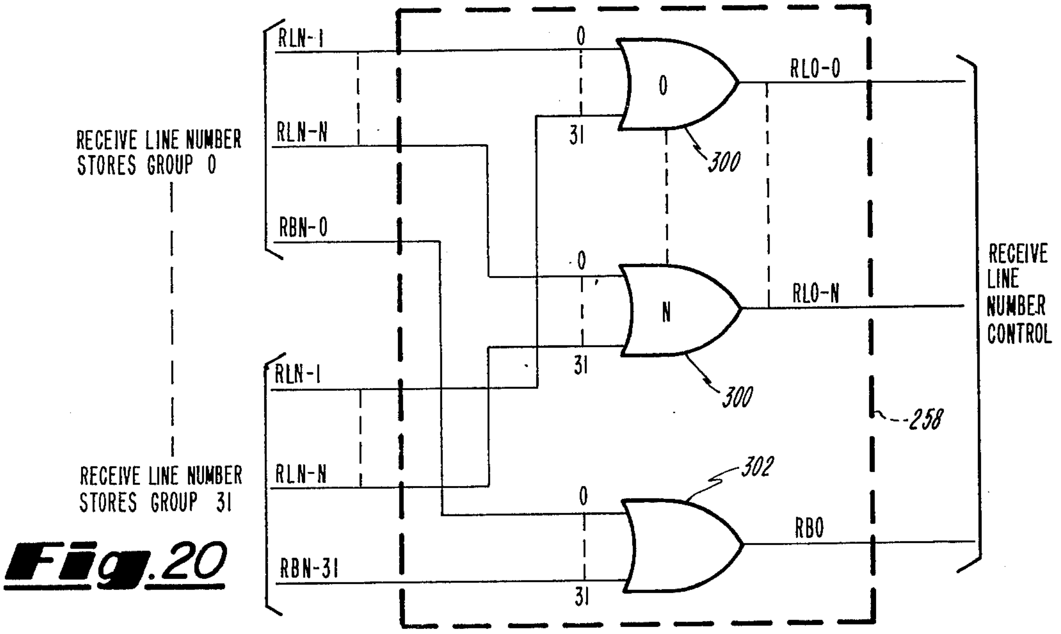
FIG. 20 is a schematic diagram of the receive line number grouping circuits.
Figure 21:
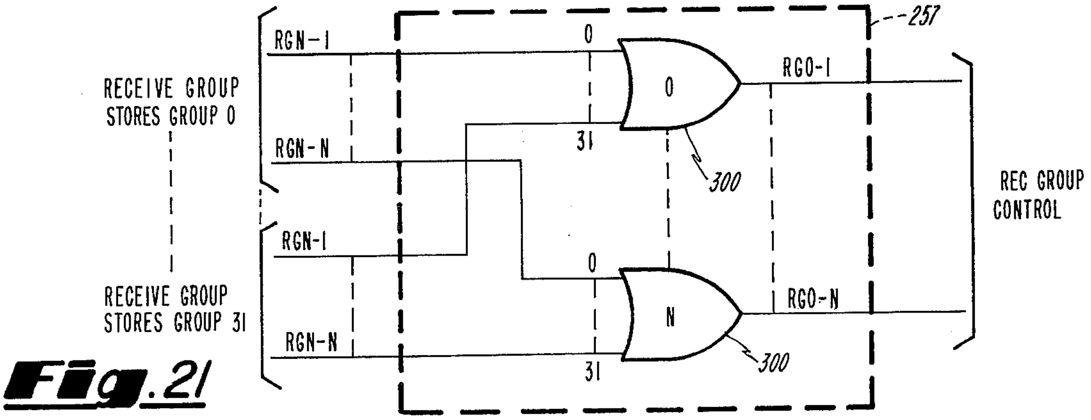
FIG. 21 is a schematic diagram of the receive group stores grouping circuits.

FIGS. 19, 20 and 21 include schematic diagrams of the send line number grouping circuit 256, the receive line number grouping circuit 258, and the receive group stores grouping circuit 257, respectively. The inputs to the circuits are from the send line number stores 54, the receive line number stores 70, and the receive group stores 60, from all 32 (0–31) send and receive groups. Each of the circuits includes a plurality of 32 input OR gate circuits 300, a separate gate circuit for each of the time slot store circuits TSS (as illustrated in FIGS. 11, 12 and 13) corresponding to the number of bits in the binary word storage. All the time slot stores TSS in each group corresponding to the same binary bit are connected to a separate input circuit of the same OR gate circuit. The send line number grouping circuit 256 and the receive line number grouping circuit 258 include an additional 32 input OR gate circuit 302 connected to the SBN and RBN output terminals of each of the send line number store 54 and the receive line number stores 70, respectively.

Hence, when a selected one of the send line number stores, the receive line number stores and the receive group stores are enabled, the binary numbers stored in the circulating memories (time slot stores TSS) are sequentially transmitted through the OR gates 300 to the respective send line number control 240, the receive line number control 234, and the send group control 242, as designated.

In the case of the line number 0 (zero) there is no binary number on the leads RLN or SLN and the signals on leads RBN or SBN will designate the switching time slot being used by line 0.

PULSE DISTRIBUTION CIRCUITS

Figure 22:
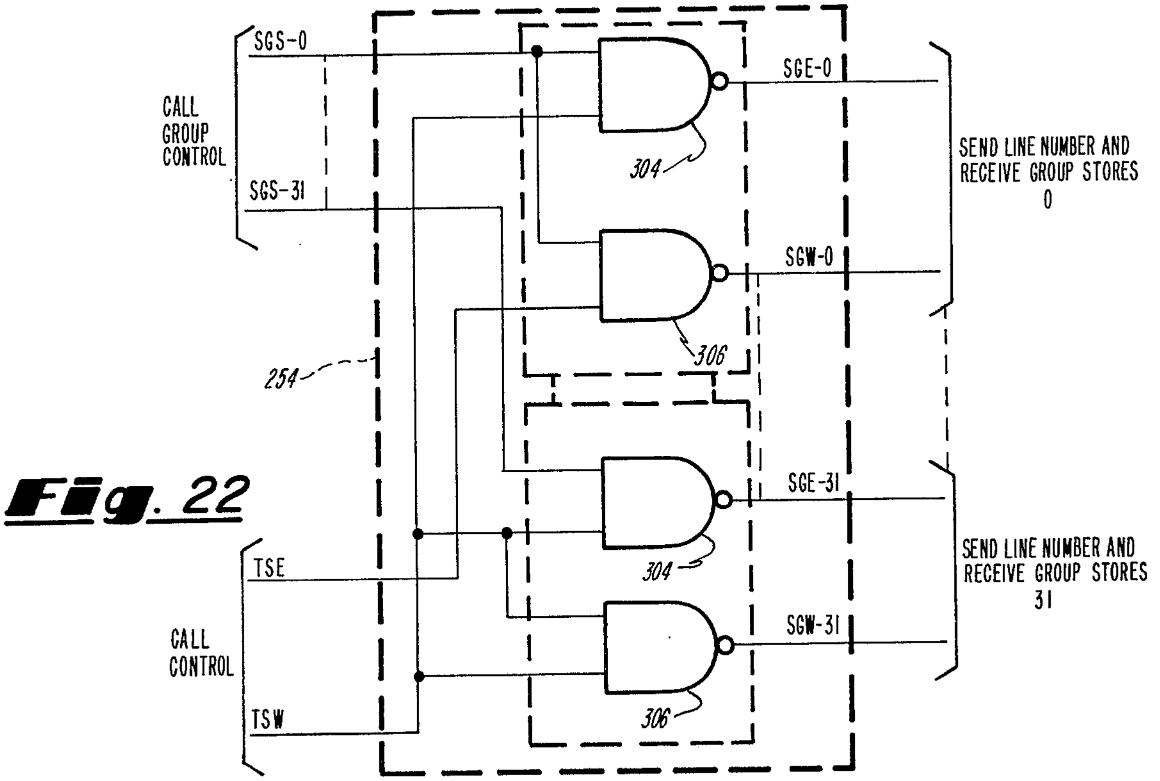
FIG. 22 is a schematic diagram of the send group distribution circuits.
Figure 23:
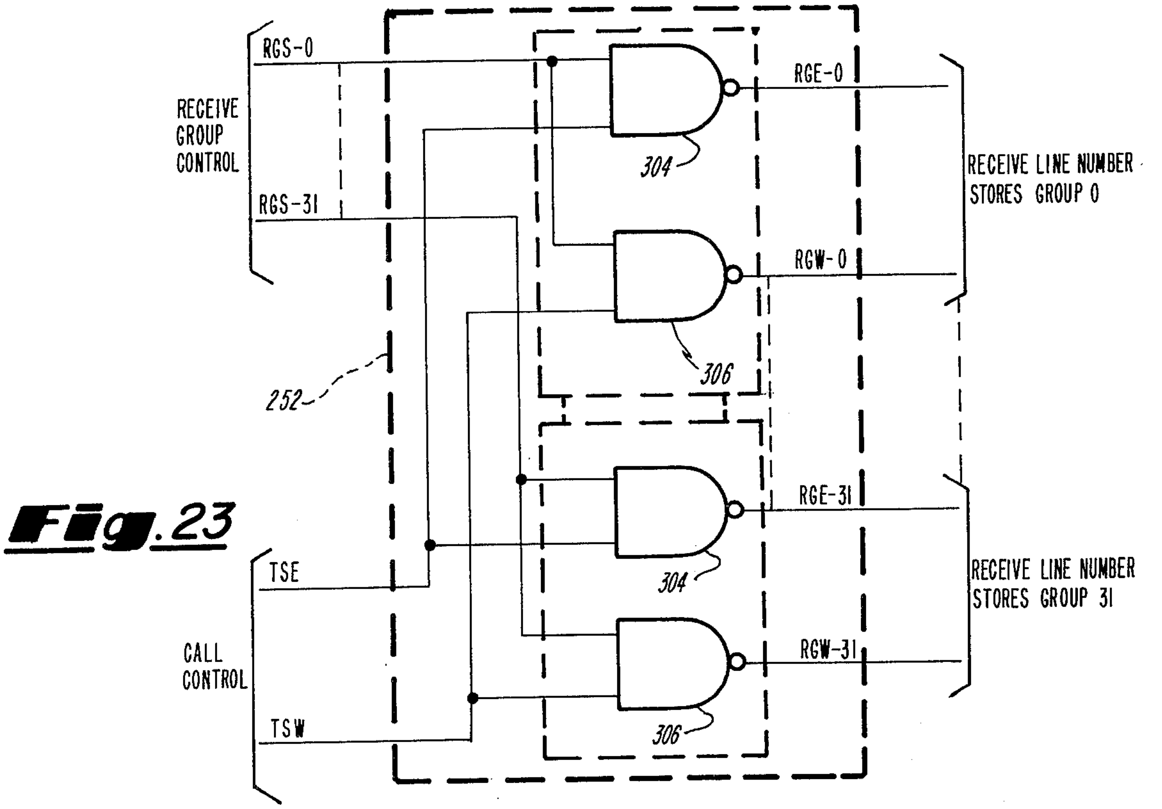
FIG. 23 is a receive group pulse distribution circuit.

FIGS. 22 and 23 include schematic diagrams of the send group pulse distribution circuit 254 and the receive group pulse distribution circuit 252, respectively. Each of the circuits include 32, two-input erase AND gates 304 and 32, two-input write AND gates 306, a separate write and erase gate for each group. When binary numbers are to be erased from the send line stores 54, receive group stores 60 and receive line number stores 70, the call control 244 applies an enabling pulse during the selected switching time slot via the lead TSE to the erase gates 304, and the send and receive group controls via leads SGS and RGS, respectively, enable the erase gate 304. In a similar manner, when binary numbers are to be written into selected ones of the send and receive line number stores and the receive group stores, the call control applies a write pulse during the selected switching time slot via the lead TSW to enable one of the write gates 306 of the selected group.

SEND AND RECEIVE, TIME SLOT, AND HIGHWAY CONTROL CIRCUITS

FIGS. 24–29 include block diagrams of the send group control circuit 242, receive group control circuit 238, the send line number control circuit 240, the receive line number control circuit 234, the time slot control circuit 232 and the highway control circuit 264, respectively. Each of the control circuits includes a register circuit for receiving command digital binary data in serial form, and also for receiving trace and crossconnect data (except for the time slot control circuit and highway control circuit) in parallel form under the control of signals on the leads CMO and CMI from the call control 244. The presence of a CMO signal allows the transfer of data in serial form and the presence of both CMO and CMI signals allows the transfer of data in parallel form.

Figure 24:
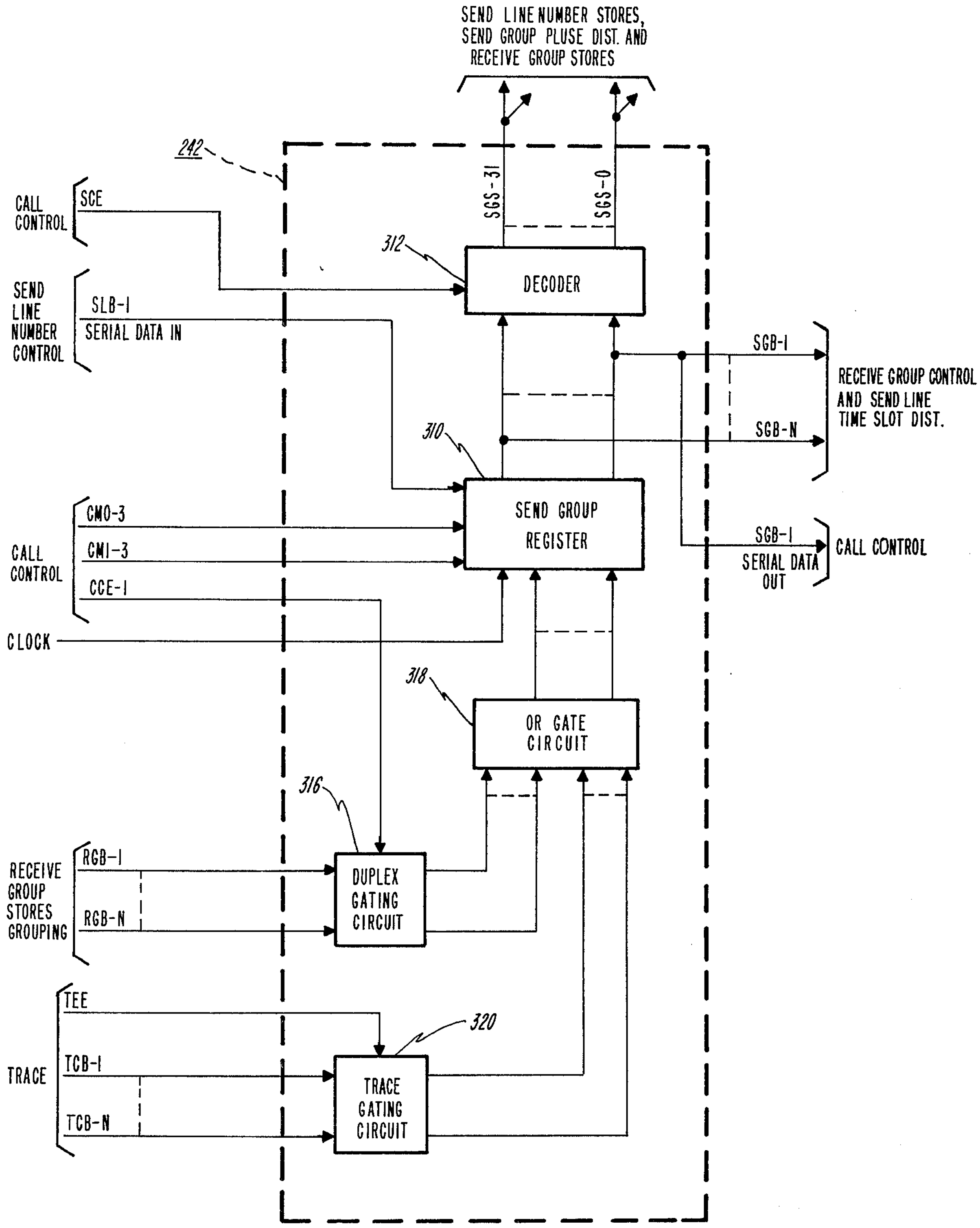
FIG. 24 is a block diagram of the send group control circuit.
Figure 25:
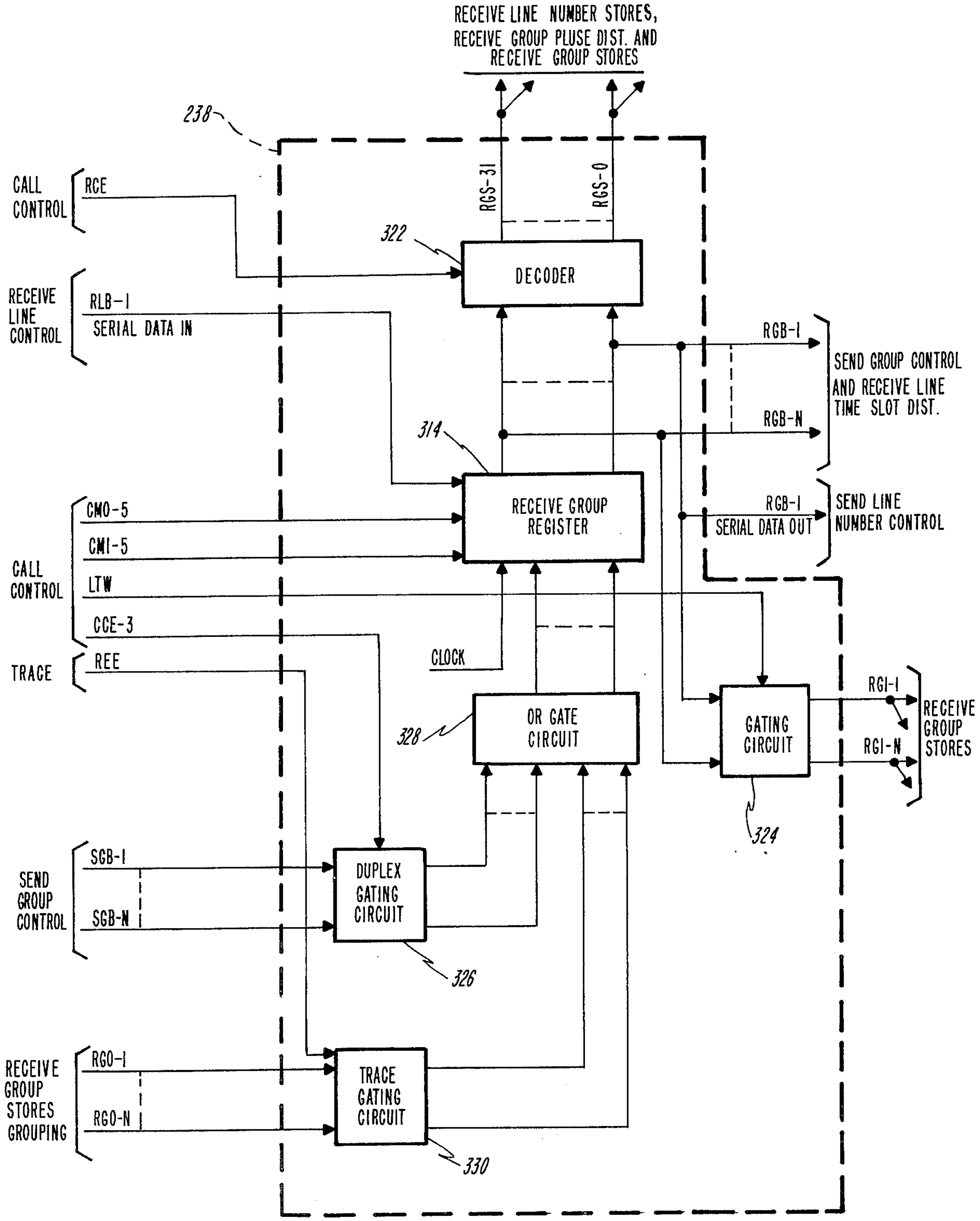
FIG. 25 is a block diagram of the receive group control circuit.
Figure 26:
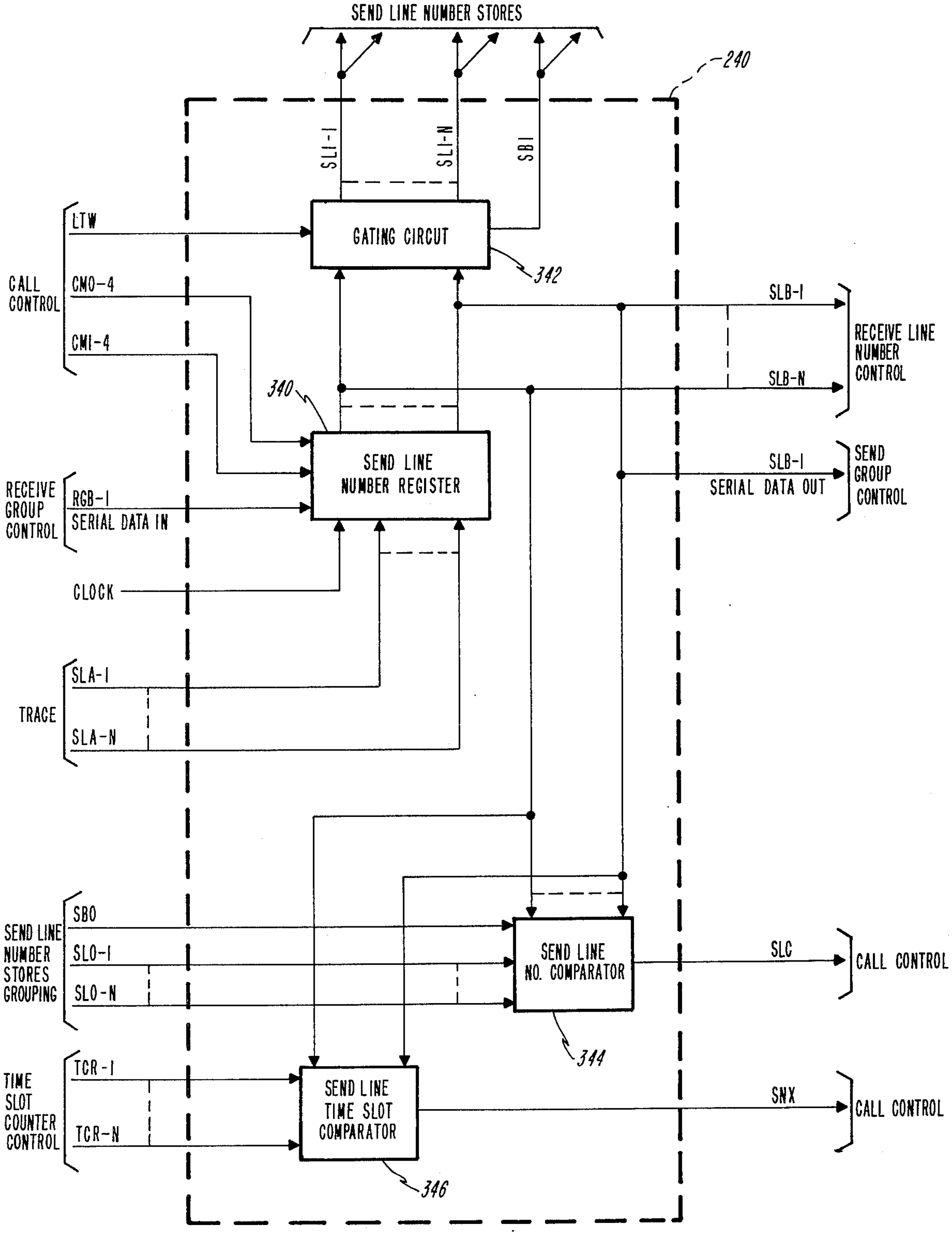
FIG. 26 is a block diagram of the send line number control circuit.
Figure 27:
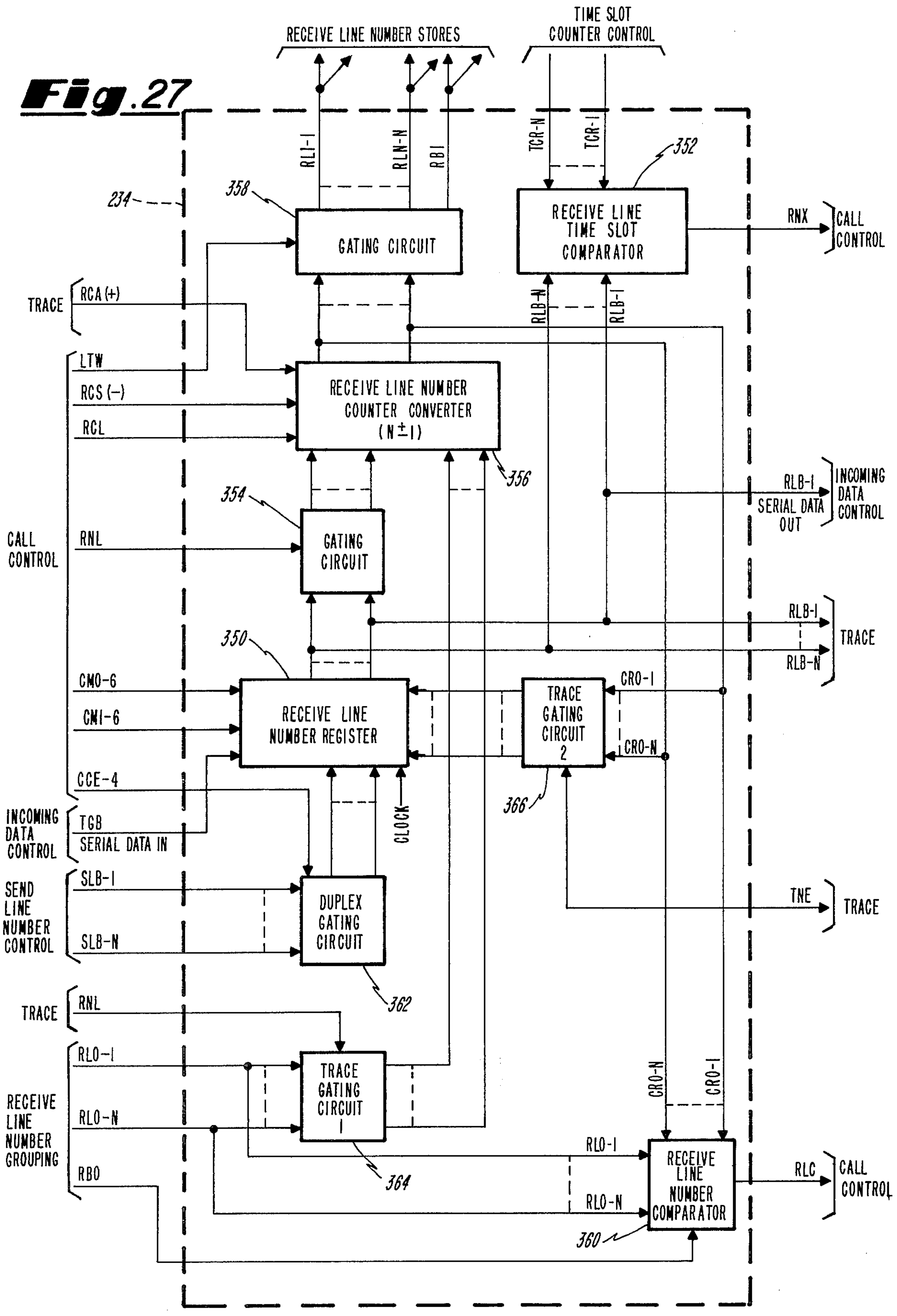
FIG. 27 is a block diagram of the receive line number control circuit.
Figure 28:
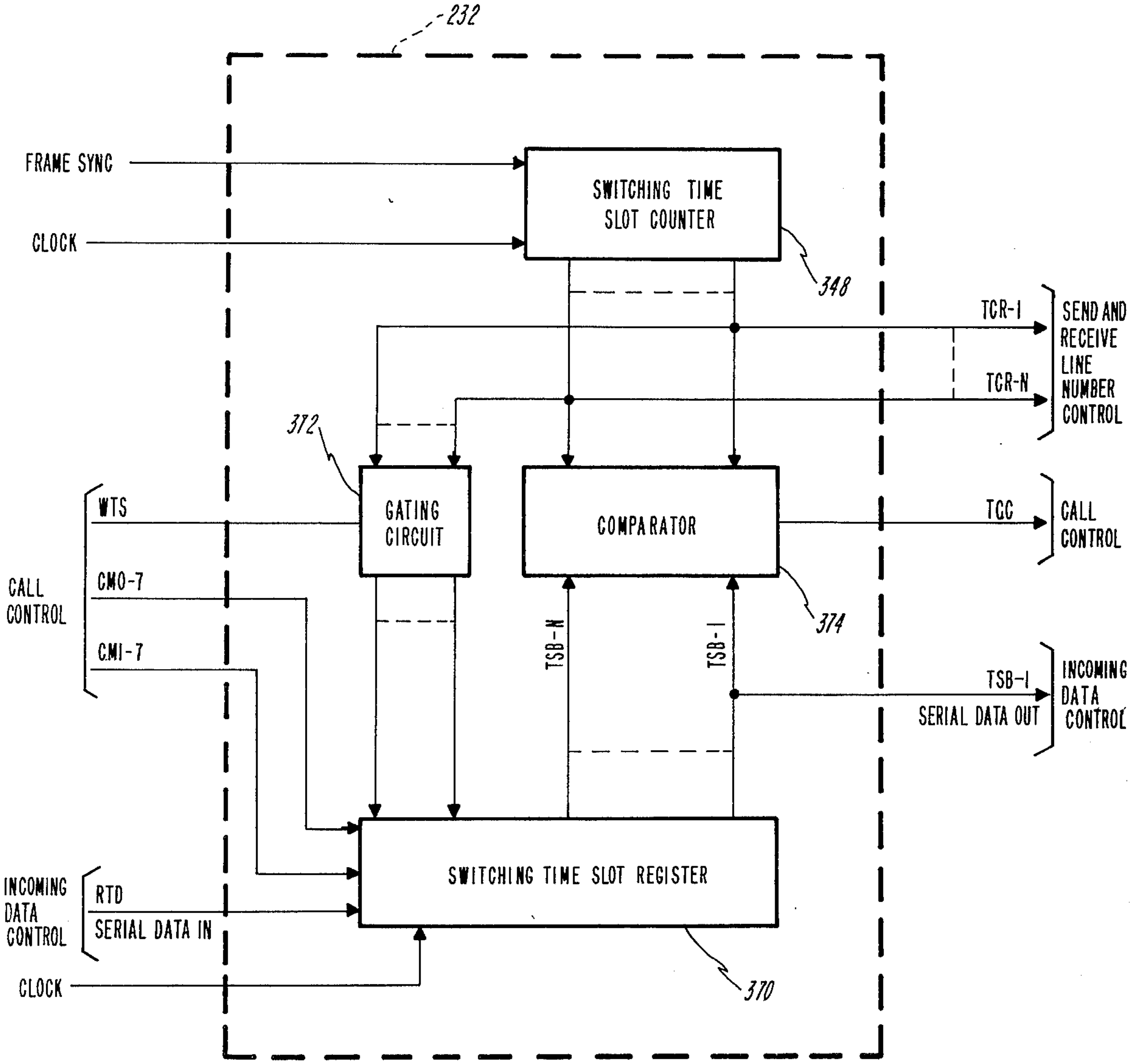
FIG. 28 is a block diagram of the switching time slot control circuit.
Figure 29:
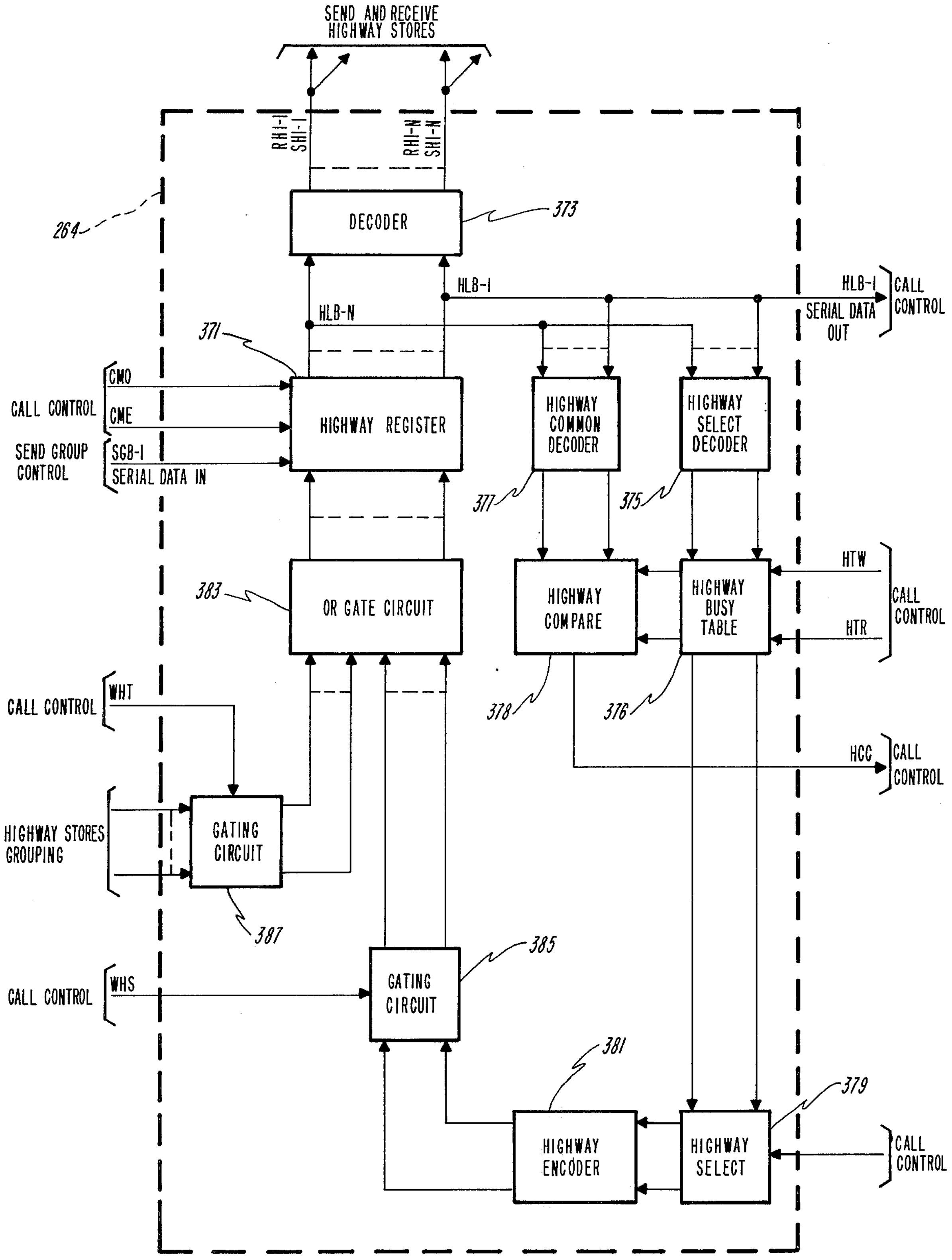
FIG. 29 is a block diagram of the highway control circuit.

In the send group control circuit 242 of FIG. 24, the binary number in the register 310 designating a send group is transmitted via a decoder 312 to one of the lines SGS-0 through SGS-31 to apply an enabling signal to one of the send line number stores 54, one of the receive group stores 60, and also to the send group pulse distribution circuit 254. The binary number in the register 310 is also transmitted via lines SGB-1 through SGB-N to the receive group control 238 for crossconnect purposes in duplex connections, and also to the send busy line time slot distribution circuit 260 for a busy check with the overlay network and its own or lay network. A binary number is also received from the receive group control circuit 238 (register 314) via lines RGB-1 through RGB-N. The binary number is applied to the send group register 310 for crossconnect purposes via a duplex gating circuit 316 and an OR gate circuit 318. The duplex gating circuit 316 is enabled by a signal on lead CCE1 from the call control circuit. A binary number can also be transmitted to the send group register 310 from the trace control circuit 250 on leads TCB-1 through TCB-N via a trace gating circuit 320 (enabled by a signal on a lead TEE) and the OR gate circuit 318.

In the receive group control circuit 238 (FIG. 25) the binary number in the receive group register 314 (designating the receive group to be connected) is transmitted via a decoder 322 to apply an enabling signal on one of the leads RGS-0 through RGS-31, which in turn applies a sample enable signal to one of the receive line number stores 70 in the selected group, and also to the receive group pulse distribution circuit 252. The binary number in the register 314 is also transmitted via lines RGB-1 through RGB-N to the send group control 242 for crossconnect purposes in duplex connections and also to the receive busy line time slot distribution circuit 262 for receive line busy check with the lay and overlay circuit. The binary number in the receive group register 314 is also applied via a gating circuit 324 on the lines RGI-1 through RGI-N to the selected receive group store 60 for storing the binary number therein the selected switching time slot position under the control of an enable pulse on lead LTW from the call control 244. The binary number corresponding to the selected send group and stored in the send group register 310 is received on lines SGB-1 through SGB-N and transmitted via a gating circuit 326 and an OR gate circuit 328 into the receive group register 314 under the control of a signal on lead CCE from the call control for crossconnect purposes in duplex calls. In the event of a trace mode of operation, the binary number on the leads RGO-1 through RGO-N from the selected receive group store 60 is received by the receive group register 314 via a trace gating circuit 330 and the OR gate 328, under the control of an enable signal on lead REE from the trace control 250.

In the send line number control 240 (FIG. 26) the binary number in the register 340 (corresponding to the selected send line number) is applied via lines SLB-1 through SLB-N to the receive line number control 234 for crossconnect purposes in duplex connections. The binary number in the register 340 is also transmitted via a gating circuit 342 (in response to an enable pulse at the appropriate switching time slot on lead LTW from the call control) and lines SLI-1 through SLI-N to all the send line number stores 54 for transmitting the binary number into the send line number store in the selected send group. The lead SBI also simultaneously receives a pulse for entering a busy bit at the switching time slot store 202 (FIG. 11). When in the trade mode of operation, the send line number store 340 receives a send line number in binary form from the trace circuit 250 via lines SLA-1 through SLA-N. The send line number control 240 includes a comparator circuit 344 for comparing the binary number in the send line number register 340 with the binary number on the lines SLO-1 through SLO-N (which appear at all switching time slots from the send line number store 54 in the selected send group). When a comparison is made a comparison signal is transmitted to the call control 244 via line SLC, to designate that a binary number in the selected send line number store 54 compares with the binary number in the register 340. The comparison signal occurs at switching time slot in which the binary number is stored. The binary number in the send line number register 340 is also compared with the binary number count in a counter circuit 348 in the switching time slot counter 248 (FIG. 28) by a comparator circuit 346. When a comparison is made a signal is applied to the call control via lead SNX indicating the line time slot of the send line.

In the receive line number control circuit 234 (FIG. 27) the binary number in the register 350 (corresponding to the receive line number) is applied via leads RLB-1 through RLB-N to the trace circuit 250 where gates are activated to transfer the send line number for crossconnect purposes in duplex calls, and to a receive line time slot comparator circuit 352 which compares the receive line number with the binary number from the switching time slot counter 348 on leads TCR-1 through TCR-N. When a comparison is made a signal is applied to the call control on the line RNX designating the receive line time slot. The binary number in the register 350 is also transmitted via a gating circuit 354 under the control of load signals from the call control 244 on leads RLN and RCL to transfer the binary number into a counter converter circuit 356. The call control subsequentially applies a signal to the lead RCS so that the counter converter circuit 356 subtracts the number 1 from the binary number received from the register 350. The number 1 is subtracted to compensate for delay that is experienced in the transfer of signals from the send RAM 50 to the receive RAM 68 (FIG. 3). The binary number in the counter converter circuit 356 is transmitted to the receive line number stores 70 via lines RLI-1 through RLI-N and a gating circuit 358 that is enabled at the selected switching time slot by a signal on the lead LTW. A signal is simultaneously generated on the lead RBI to apply a busy bit indication in the switching time slot busy store 210 (FIG. 13). The binary number in the counter converter circuit 356 is also applied to a receive line comparator 360, for comparison with the binary numbers stored in the selected receive line number store 70, via lines RLO-1 through RLO-N and RBO. When a comparison is made, a signal is transmitted to the call control on line RLC to designate that the binary number in the selected receive line number store 70 compares with the binary number in the counter converter 356. The comparison occurs at the switching time slot in which the binary number is stored. In the case of a duplex connection, the binary number in the send line number register 340 (FIG. 26) is applied to the receive line number register 350 via lines SLB-1 through SLB-N and a gating circuit 362 under the control of a signal from the call control on line CCE-4. In the event of the trace mode of operation, a binary number in the selected line number store is applied to the counter converter circuit 356 via leads RLO-1 through RLO-N and a gating circuit 364 under the control of a signal from the trace circuit 250 on lead RLN at the appropriate switching time slot. Subsequent thereto, the trace circuit applies a signal to the lead RCA to add a count of 1 to the binary number thereby correcting the receive line number in the counter converter circuit 356 for trace purposes. The binary number from the counter converter circuit 356 is applied through a gating circuit 366 to the receive line register 350 under the control of the trace circuit via lead TNE. Therefore it can be seen under a connect or disconnect mode of operation, a count of 1 is subtracted from the receive line number to correct for the delay through the switching network by applying the reduced binary number to the selected receive line number store 70. On the other hand, when in the trace mode of operation, the number received by the counter converter circuit from the selected receive line number store 70 (reduced by a count of 1) is changed by adding the count of 1 so that the correct binary number, corresponding to the receive line, is inserted into the receive line number register 350 for subsequent transmission to the computer.

In the switching time slot counter control circuit 232 (FIG. 28), the switching time slot counter 348 receives clock pulses and frame sync pulses to provide a binary number corresponding to a continuously repeating sequence of 512 switching time slots. The binary numbers in the counter 348 are applied to the switching time slot register 370 via a gating circuit 372 under the control of the call control 244 by an enable signal on the lead WTS so that the switching time slot corresponding to a connection, or disconnection, is stored in the register 370. In the event of a test mode of operation, the switching time slot register 370 receives a binary number of the switching time slot number in serial form from the incoming data control 230 on lead RTD. The binary number stored in the switching time slot register 370 and the binary numbers corresponding to the counts in the counter 348 are applied to a comparator circuit 374. When a comparison is made a signal is applied to the call control via the leads TCC. The binary number in the switching time slot counter 348 is also sent to the send line number control 240 and the receive line number control 234 to generate the send and receive line time slot signals.

In the highway control circuit 264 (FIG. 29) the binary number in the highway register 371 is transmitted via a decoder circuit 373 and via the lines RHI-1 through RHI-N and lines SHI-1 through SHI-N to all the send and receive highway stores. As previously mentioned, only the enabled send and receive highway stores in the selected group will respond to store the highway binary at the appropriate switching time slot under the control of the call control circuit 244. The binary number in the highway register 371 is also applied to a highway select decoder 375, which, applies an enable signal to one of 32 output lines connected to a highway busy table 376. The highway busy table 376 includes 32 time slot circuits (TSS) 180 of the type illustrated in FIG. 10 connected in a parallel arrangement as in the store circuits of FIGS. 11–13, providing a separate time slot store 180 for each of the 32 interconnect highways 58. A bit is written in, or erased from, the time slot store corresponding to the interconnect highway number in the register 371 in response to a write, or erase, signal from the call control circuit 244 on lines HTW or HTR, respectively, at the switching time slot designated to the connection. Hence, the highway busy table 376 stores, and provides, an indication of the busy-free condition of each of the 32 interconnect highways for each of the 512 switching time slots. The number stored in the highway register 371 is also applied through a highway compare decoder circuit 377 to a highway compare circuit 378. The highway compare circuit 378 compares the signal from the decoder 377 with the highway status in the highway busy table 376 to provide a busy-free signal on line HCC for each of the 512 time slots stored in the time slot store corresponding to the selected highway (as stored in the highway register 371 and as designated by the highway compare decoder 377). Hence, the busy-free condition of any interconnect highway 58 at any switching time slot can be determined. In the event that the processor does not provide the switching time slot and interconnect highway information for a connect, disconnect, and trace command, a highway select circuit 379 is enabled at an arbitrary switching time slot by a signal HAV from the call control circuit 244. The highway select circuit 379 is essentially a priority chain circuit that receives information from the highway busy table 376 concerning the status of all interconnect highways at all switching time slots. The highway select circuit 379, in response to a signal on the lead HAV (at the arbitrary switching time slot at which the signal on lead HAV is received), looks at the availability of the interconnect highways in the order of their numerical sequence (0–31) so that the lowest numbered highway available in the designated switching time slot is selected. The highway select circuit 379 applies a signal on one of the 32 lines (corresponding to the selected interconnect highway) to a highway encoder circuit 381. The highway encoder circuit 381 applies a binary number of the selected interconnect highway to the highway register 371 via an OR gate circuit 383 and a gating circuit 385 which is enabled by a signal from the call control 244 on the lead WHS. The call control applies signals on the line CMO for receiving and transmitting serial data into and out of the highway register 371 and signals on both the leads CMO and CME for receiving parallel data. The highway register 371 is also connected to the send highway stores grouping circuits 272 and the receive highway stores grouping circuit 268 via the OR gate circuit 383 and a gating circuit 387 for receiving a binary number from the highway selected highway stores when an enable signal is applied by the call control to the line WHT in the event of a trace mode of operation.

SEND AND RECEIVE LINE TIME SLOT DISTRIBUTION CIRCUITS

Figure 30:
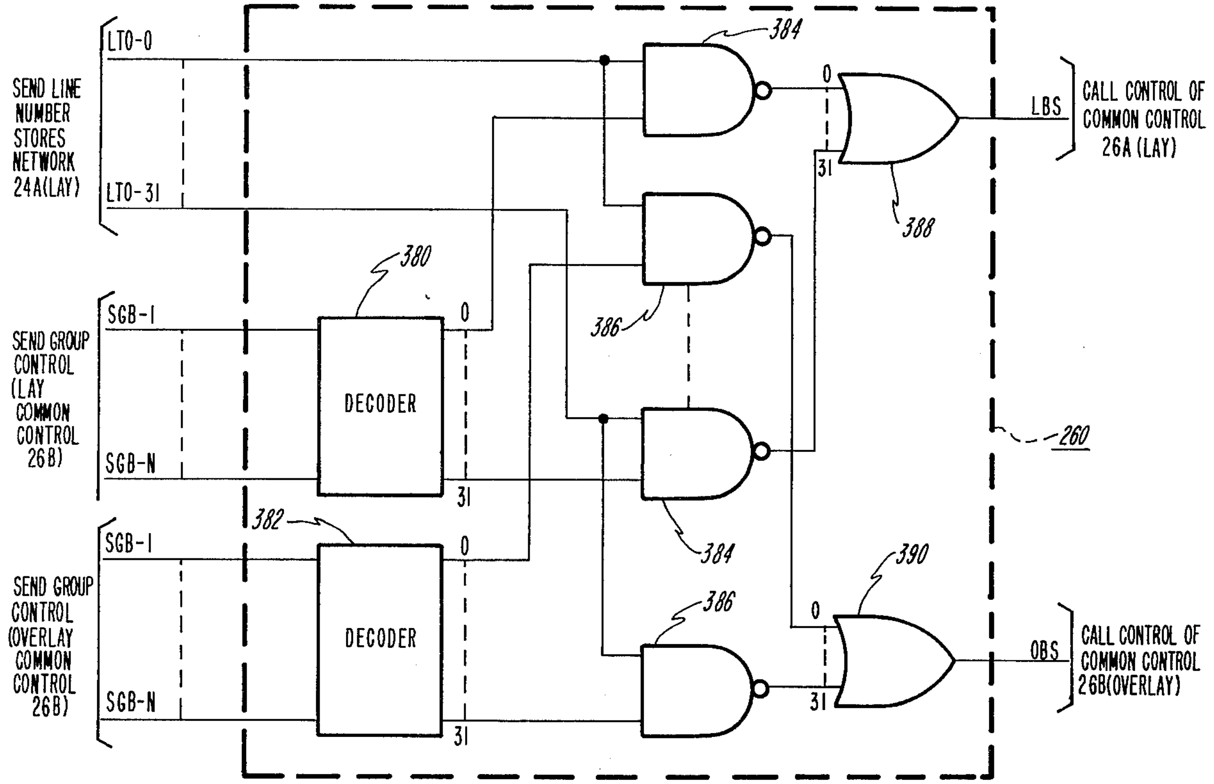
FIG. 30 is a schematic diagram of the send busy line time slot distribution circuit.
Figure 31:
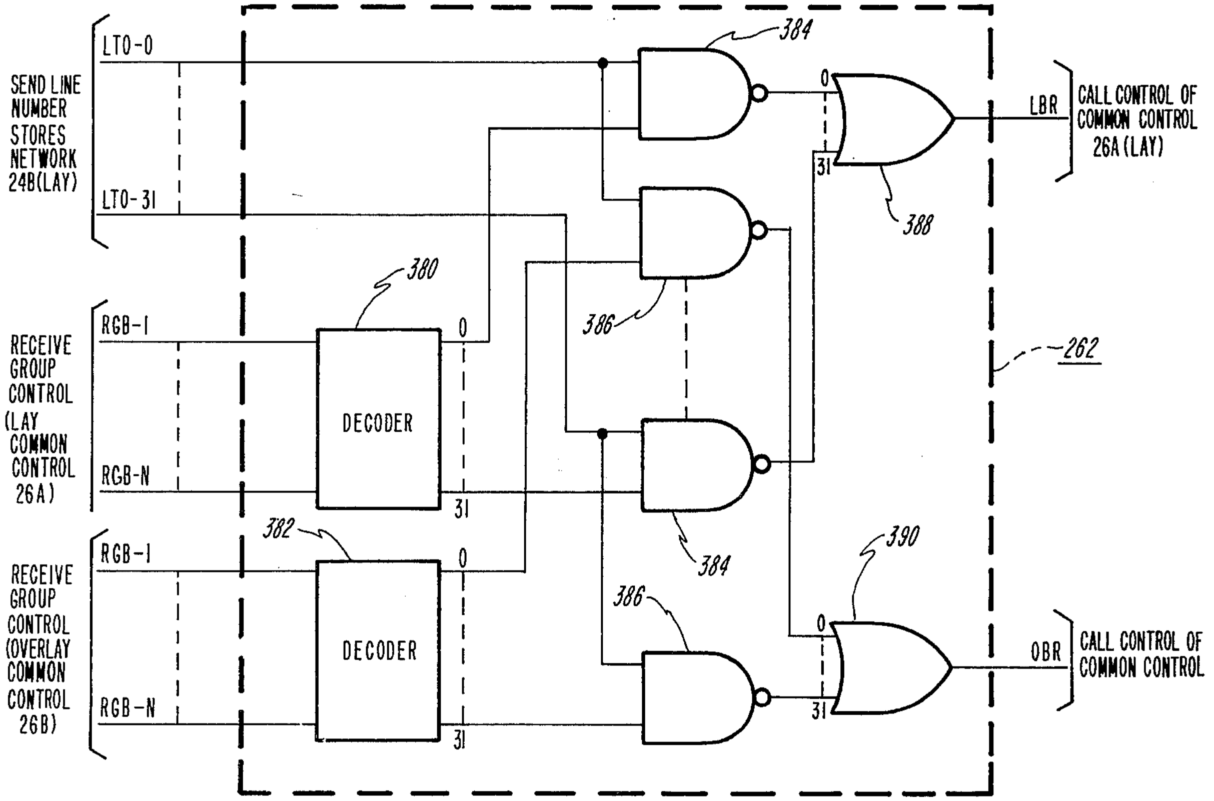
FIG. 31 is a block diagram of the receive busy line time slot distribution circuit.

FIGS. 30 and 31 include diagrams of the send busy line time slot distribution circuit 260 and the receive busy line time slot distribution circuit 262, respectively. These two distribution circuits provide communications between the lay switching network 24A and its common control 26A, and the overlay switching network 24B and its common control 26B to eliminate the possibility of double connections. Each distribution circuit includes a pair of decoders 380 and 382. The decoder 380 receives data from the lay common control 26A (from either the send group control 242 or the receive group control 238 as designated). The decoder 382 receives information from the overlay common control 26B (from the send group control 242 or the receive group control 238 as designated). The distribution circuits also include a pair of NAND gates 384 and 386, one pair for each of the send line number stores (a total of 32 pairs). One AND gate 384 of each pair is connected to receive enabling signals from the decoder 380, while the other AND gate circuit 386 is connected to receive enabling signals from the decoder 382. The other input of each pair of gates 384 and 386 is connected to separate LTO leads, so that each pair of AND gates receives line switching time slot signals from the send line number stores 54 of the group selected. The outputs of the AND gates 384 are connected to a 32 input OR gate circuit 388 while the outputs of the AND gates 386 are connected to a 32 input OR gate circuit 390. The output of the OR gate circuits 388 (LBS and LBR) are connected to the call control 244 of the lay common control 26A, while the output circuits of the OR gate circuits 390 (OBS and OBR) are connected to the call control of the overlay common control 26B. Hence, it can be seen that the distribution circuits 260 and 262 will provide an indication to the respective common control circuits of the busy-free status of the send lines and receive lines in the lay, but also in the overlay networks in accordance with their line time slots.

CALL CONTROL

Figure 32:
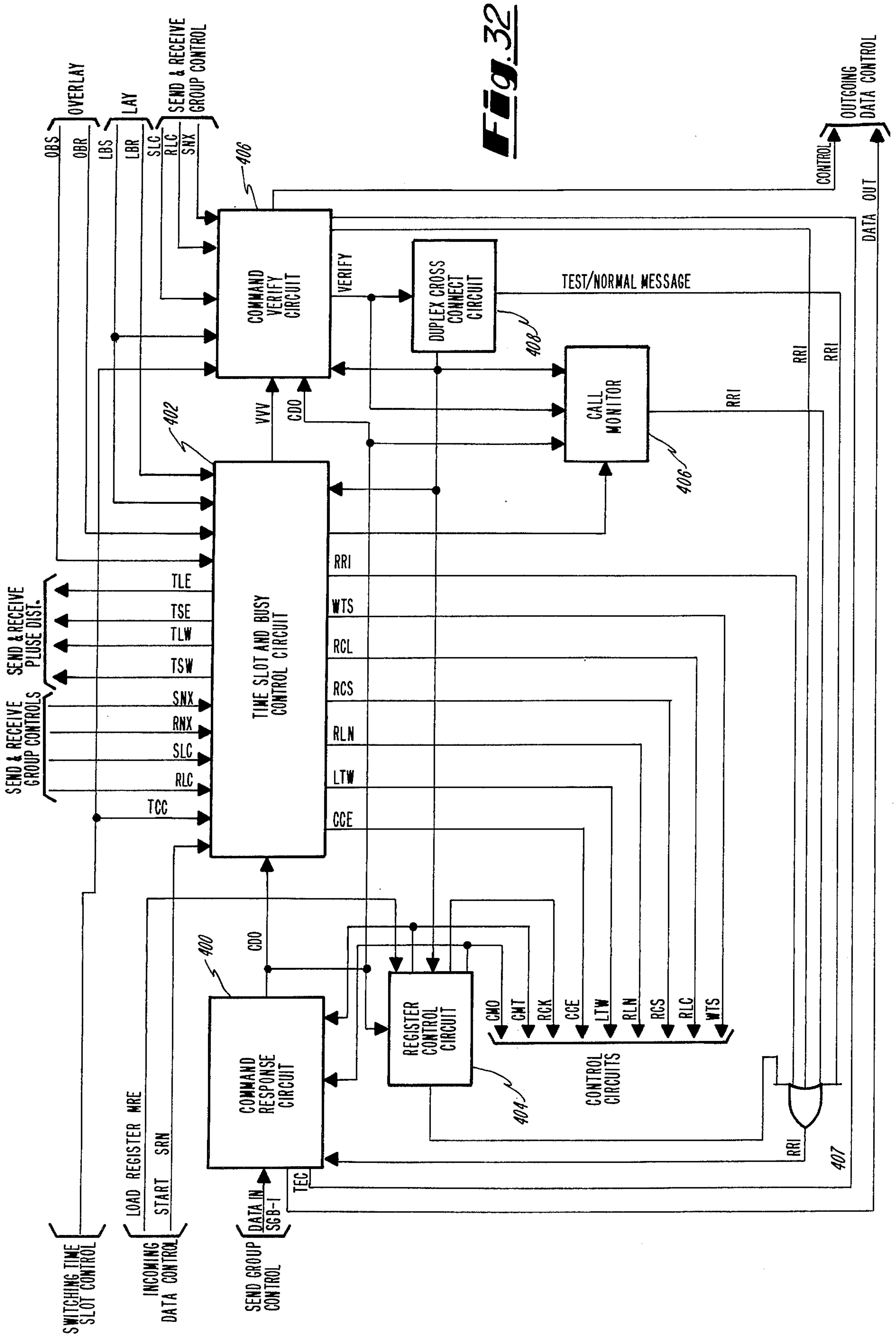
FIG. 32 is a block diagram of the call control circuit.

FIG. 32 includes a block diagram of the call control circuit 244. The input data to the call control 244 is received in serial form by a command response circuit 400 from the send group control 242 via line SGB1. A load signal is initially received from the incoming data control 230 on line MRE to enable the register control circuit 404 to transmit register load enabling signals to the switching time slot control circuit 232, receive number line control 234, receive group control 238, send line number control 240 and a send group control 242 via lines CMI, CMO and RCK -(clock) for parallel and serial transfer of data through the above controls. Thereafter, a register loaded signal SRN is received from the incoming data control 230 to initiate the operation of a time slot and busy test control circuit 402. This signal signifies that all of the incoming data has been received and in turn will cause the register load signals CMO-etc., to be in hold. The command response circuit 400 decodes the commands (connect, disconnect, test, trace, etc.) and applies the decoded commands (CDO) to the time slot and busy control circuit 402, a register control circuit 404, and a call monitor circuit 406*a*.

As previously mentioned above, the connect or disconnect sequence is completed in three or four frames. During the first frame, the time slot and busy test control circuit 402 acknowledges the selection of a free switching time slot in the case of a connect command, or the busy switching time slot to be erased in the case of the disconnect command. During the second frame the time slot and busy test control circuit 402 acknowledges that both the send and receive lines are free in the case of a connect command, and loads the switching time slot control accordingly for either command. The busy or free indications are received from the various send and receive controls and also the lay and overlay networks. If a proper determination is made, the time slot and busy test control circuit transmits the appropriate control signals to the control circuits 230, 232, 234, 238, 240 and 242 (FIG. 14) and the pulse distribution circuits 252 and 254, to allow the writing of data (switching and line time slots) into, or erasing data from, the various network circuits. During the third frame, a command verify circuit 406 receives information to determine that the data has been properly written or erased. In the case of a duplex connection or disconnection, after the first command is completed, a duplex cross connection circuit 408 is enabled by the command verify circuit 406 to prepare the time slot and busy control circuit 402 for the second half of the duplex connection or disconnection, and also allows the transfer of data between the send and receive line number and group control circuits 234, 238, 240 and 242. The call monitor circuit 406*a* monitors the decoded command signals CDO (0 through 6) from the command response circuit 400 along with the various signals corresponding to completed sequence functions of the time slot and busy test control circuit 402, from the command verify circuit 406, and from the duplex cross connection circuit 408, to determine if the command is properly being processed. The command sequence includes a series of timed switching functions. Should the sequence be interrupted and the disconnect or connect command fail, the call monitor circuit 406 determines at which portion of the sequence the failure occurred and transmits such data via lines RRI to the command respond circuit 400. If a call is completed or disconnected properly, corresponding data is also transmitted on lines RRI. The command response circuit 400 encodes this response data into binary form and transmits the same to the outgoing data control 246. The operation of the various blocks illustrated in FIG. 30 will be described in greater detail below in FIGS. 31, 32 and 33.

Figure 33:
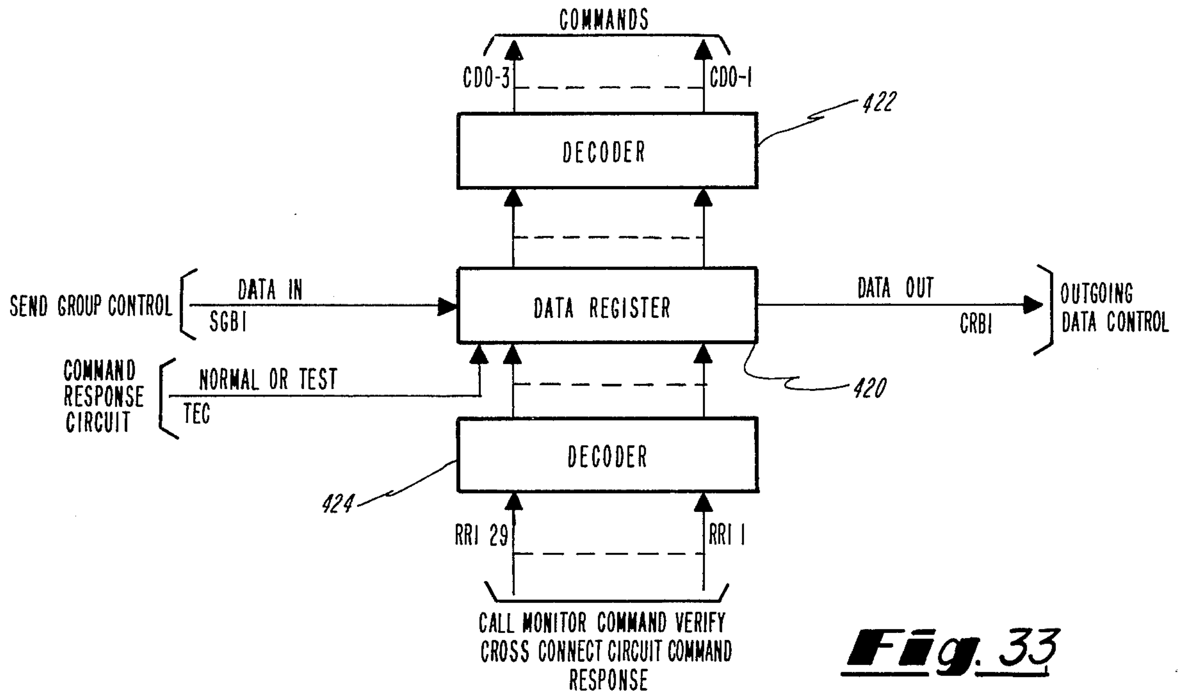
FIG. 33 is a block diagram of the command response circuit.
Figure 37:
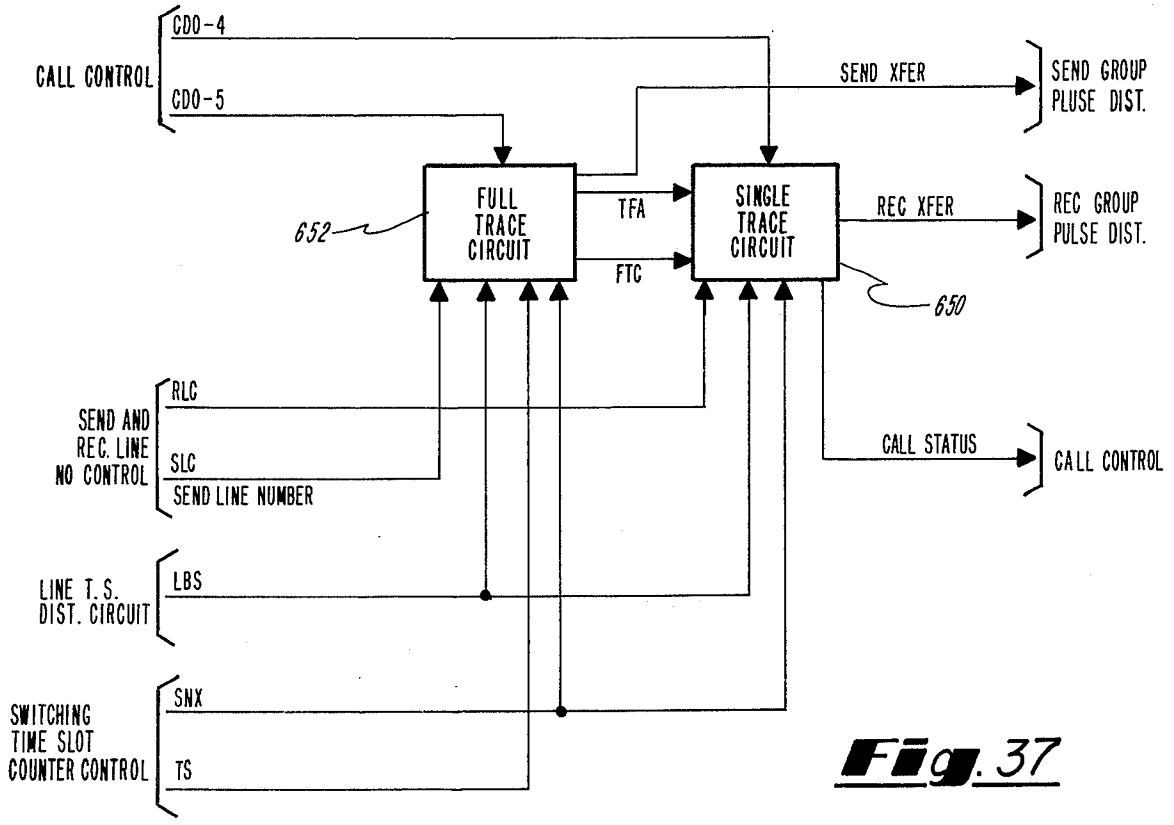
FIG. 37 is a block diagram of the overall trace circuit.

FIG. 33 is an expanded block diagram of the command response circuit 400. The command response circuit 400 includes a data register 420 connected to receive signal data input from the send group control 242 in serial form via line SGB1 and to transmit serial data out to the outgoing data control 246 via lead CRB2. A normal or test command signal is received on the line TEC from the command and verify circuit 406. The data register 420 is connected to a decoder circuit 422 which decodes the commands received in parallel binary form into command signals. Corresponding signals received on the lines RRI from the call monitor 406 and corresponding call control circuits 402 and 404 indicate the response to a command.

Figure 34:
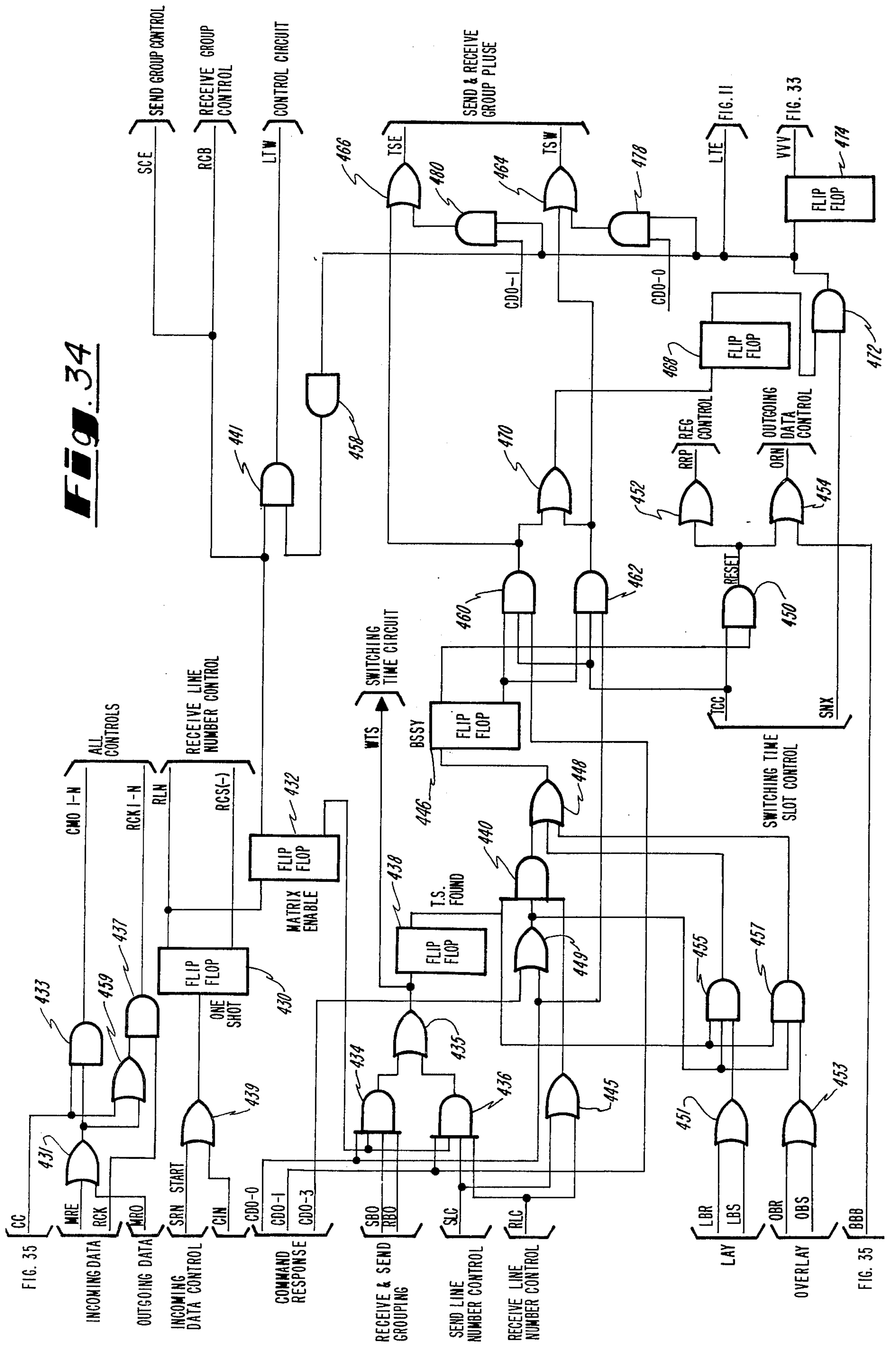
FIG. 34 is a schematic diagram of the time slot and busy control circuit.

The time slot and busy test control circuit 402 is illustrated in greater detail in FIG. 34. A load signal is received from the incoming data control 230 on the line MRE and is transmitted via an OR gate 431 to a driver circuit 433 to apply a CMO (High) signal to all the control circuits 232, 234, 238, 240 and 242 to allow the transfer of data from the incoming data control 230 to the registers in the control circuits. Simultaneously therewith, clock pulses are applied via lead RCK to all the registers in the controls. After all the data is loaded, the MRE line is disabled and a signal appears on line SRN. This signal is applied to a dual pulse generator circuit 430 which produces first a pulse on the line RNL to allow the transfer of data from the receive line number register 350 (FIG. 27) to the receive line number counter converter 356. Shortly thereafter a second pulse is generated on the line RCS to allow the converter to subtract a number from the receive line number to compensate for the delay in the network. At the trailing edge of the pulse on the lead RCS a network enable flip-flop 432 is set to transmit enable signals on the lines SCE to the send group control, RCE to the receive group control, and LTW to enable the send and receive line number control circuits. At this time the selected send and receive groups in the network are enabled.

The flip-flop 432, when set, also applies an enable signal to connect AND gate 434 and a disconnect AND gate 436. The AND gate 436 is enabled by the disconnect command CDO-1. In the case of a connect command, the leads SBO and RBO from the receive and send line grouping circuits 256 and 258 (FIG. 14) are monitored to locate a free switching time slot. When a free switching time slot is located, the AND gate 434 is enabled to set a switching time slot found flip-flop 438 via an OR gate 435, and to apply a pulse signal on lead WTS to enable the switching time slot control circuit 232 to store the selected switching time slot. In the case of a disconnect command, the leads SLC and RLC from the send and receive line number control 240 and 234 are monitored to detect a busy signal on both leads to enable the AND gate 436, which in turn, sets the flip-flop 438 and generates the switching time slot found signal on line WTS.

In the connect mode of operation, after a free switching time slot is found, a busy test is initiated. The flip-flop 438, when set, applies an enable signal to the gates 440, 455 and 457. The gates 440, 455 and 457 also received enable signals from an OR gate 449 which is connected to receive a connect command signal CDO-0 or a busy override command signal CDO-3. The third input of the AND gate 440 is connected via an OR gate 445 to the leads SLC and RLC. The gate 440 monitors the busy-free condition of the leads RLC and SLC via the OR gate 449, the AND gate 455 monitors the busy-free condition of the send and receive line time slot in the lay network via OR gate 451, while the gate 442 monitors busy-free conditions of the line time slot in the overlay network via OR gate 447. If any of the send or receive lines are busy in the lay or overlay network, the corresponding gate 440, 455 or 457 is enabled to set a busy flip-flop 446 via an OR gate 448. If a busy condition is found, the flip-flop 446 applies an enable signal to an AND gate 450, which is subsequently enabled by the presence of a TCC signal (from the switching time slot control 252 indicating the occurrence of the selected switching time slot) to apply a reset signal to the circuits in the call control, transmit a busy signal via an OR gate 452 to the response section of data register 42 (FIG. 33) via the encoder 424, and a busy signal is transmitted via an OR gate 454 to the outgoing register control 246 to indicate the attempted execution of a command. The outgoing data control 246 not transmits an acknowledgment of the busy signal by the MRO lead via the OR gate 418 to allow the clock pulses to be transmitted via gate 421 and outpulse the data serially from all the control circuits via the interface circuit 228 to the processor.

In the event that the flip-flop 446 was not set indicating that the send and receive lines were free, an enable signal is applied to the AND gates 460 and 462. An input circuit of the gate 460 is connected to the disconnect command lead CDO-1 while an input circuit of gate 462 is connected to a connect command CDO-0. In the connect mode of operation, when a signal is present on the lead TCC, the AND gate 462 is enabled to transmit a switching time slot write pulse via OR gate 464 to the send and receive group pulse distribution circuits 252 and 254 (FIG. 14), so that the switching time slot is written into the send and receive line number stores in the network. In the case of a disconnect command, the gate 460 is enabled to transmit an erase pulse TSE via an OR gate 466 to erase the switching time slot from send and receive line stores. When either the gates 460 and 462 are enabled, a switching time slot write or erase flip-flop 468 is set via an OR gate 470. The flip-flop 468 applies an enable signal to an AND gate 472. The other input of the AND gate 472 is connected to the time slot counter control so that when the send line time slot is present on the lead SNX, a line time slot write or erase flip-flop 474 is set and a signal is generated on the lead LTE and is transmitted directly to the send and receive groups in the network. The output of the AND gate 472 is also applied to two AND gates 478 and 480. In the case of a connect command the lead CDO-0 applies an enable signal to the AND gate 478 while in the case of a disconnect command a lead CDO-1 applies an enable signal to AND gate 480, so that the appropriate write or erase (TSW or TSE) is transmitted to send and receive pulse distribution circuits 252 and 254 to allow the send line time slot to be written into, or erased from the appropriate send line number store. The output of the AND gate 472 is also applied via an inverter circuit 482 to an AND gate to inhibit the transmission of the signal LTW so that the send line time slot will not be written into the network send and receive switching time slot number stores.

Figure 35:
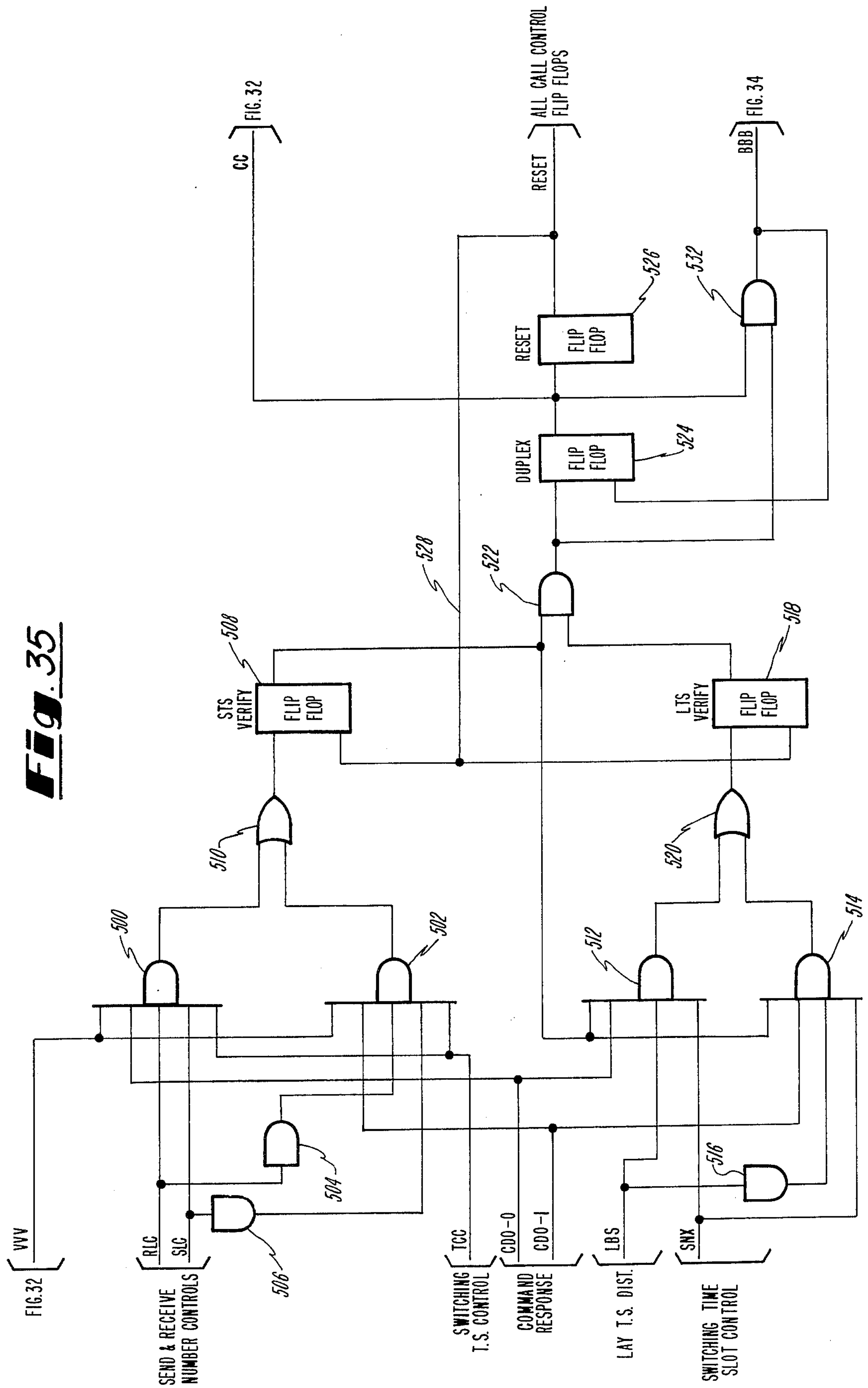
FIG. 35 is a schematic diagram of the command verify circuit.

The flip-flop 474 also applies a signal VVV to the command verify circuit 406 of FIG. 35. The signal on the lead VVV applies an enable signal to a connect AND gate 500 and disconnect AND gate 502. The AND gate 500 is directly connected to the leads SLC and RLC, while the AND gate 502 is connected to these leads via the inverters 504 and 506. The lead TCC is also connected to an input circuit to each of the AND gates 500 and 502. When in the connect mode of operation and both, the receive and send lines numbers are properly written in the send and receive number stores, the gate 500 is enabled to set a switching time slot verify flip-flop 508 via an OR gate 510. In the disconnect mode of operation, if the send and receive line numbers were properly erased, the AND gate 502 sets the flip-flop 508.

When the flip-flop 508 is set, it applies an enable signal to a connect AND gate 512 and a disconnect AND gate 514. One input circuit of each of the AND gates 512 and 514 is connected to the SNX lead, while the LBS lead is directly connected to an input of the AND gate 512 and also through an inverter 516 to the AND gate 514. In the connect mode of operation, if the line time slot has been properly stored in the network and the signal is present on the line SNX, AND gate 512 sets a line time slot verify flip-flop 518 via an OR gate 512 sets a line time slot verify flip-flop 518 via an OR gate 520. In a similar manner, in the disconnect mode of operation, if the line time slot has been properly erased the AND gate 514 will set the flip-flop 518.

When both the flip-flops 508 and 518 are set for a first time, an AND gate 522 is enabled to apply a signal to set a duplex flip-flop 524, indicating that the first half of a duplex connection or disconnection command is completed. At the same time the crossconnect signal CC, and the signals CMI, CMO and RCK are transmitted via the AND gates 540, 542 and 544 to allow the parallel transfer of data between the send and receive group controls 238 and 242 and send and receive line number controls 242 and 234. The duplex flip-flop 524 in turn sets a reset control flip-flop 526. The reset control flip-flop generates a reset signal on the line 528 which resets all the flip-flops in the call control other than the duplex flip-flop 524. The second half of the duplex command is verified the same as the first half wherein the flip-flop 518 resets for the second time which enables the gate 522, the output which is "anded" with the output of the flip-flop 524 (previously set) to enable an AND GATE 532 to apply a signal to the outgoing data control 246 indicating that a duplex connection or disconnection command has been completed. The reset flip-flop 526 is also set at this time and all the flip-flops in the call control including a duplex flip-flop 524 are reset. As previously discussed, depending upon the particular command, (connect, disconnect, duplex single trace, full trace), the various circuits in the time slot and busy test control circuit 402 and the command verify circuit 406 are enabled in a predetermined sequence (within a preset number of frames). In the event of a failure or error, the sequence is stopped. The call monitor circuit 406 of FIG. 34 monitors the various sequences performed by the time slot and busy test control circuit 402, the command verify circuit 406 and the trace control 250, and if the sequence is not performed within a predetermined time period or frame, the call monitor circuit 406 determines the cause of failure and transmits the reason for failure to the command response circuit 400, which in turn transmits the same to the control processor.

Various test points in the time slot and busy test control circuit 402, the command verify circuit 406 and the trace control 250, such as the outputs of the matrix enable flip-flop 432, the time slot found flip-flop 438, the switching time slot verify flip-flop 508, etc., are connected via the lines TP-1 through TP-X to three gating circuits, a normal command gating circuit 600 for monitoring normal connect and disconnect commands, a single trace gating circuit 602 for monitoring single trace commands and a full trace gating circuit 604 for monitoring full trace commands. The particular gating circuit to be enabled is controlled by signals on the leads CONN-DISC (connect, disconnect), ST (single trace) and FT (full time) from the command response circuit 400. A decoder 608 controlled by a counter 610 is also connected to the input circuits of the gating circuit 600, 602 and 604 to designate which of the test points TP is to be monitored in the timing sequence. The outputs of the gating circuits 600, 602 and 604 are connected via an OR gate 612 to drive the counter 610. Hence, each time a test point was monitored to provide a valid indication, the counter 610 is stepped by the count of one, and the output of the decoder modified to allow the gating circuits 600, 602 and 604 to monitor the next test point in the operating sequence.

A fault detection circuit 614 monitors the output of the OR gate 612. The fault detection circuit 614 includes two flip-flop circuits 618 and 620 connected in tandem so that both flip-flops are set after the receipt of two TO pulses from the system timing circuit. A TO pulse is received for each two framing pulses so that it takes four frames to set both flip-flops 618 and 620. When both the flip-flops 618 and 620 are set, an AND gate 622 is enabled to transmit the signal to enable a gating circuit 624. The gating circuit 624 is connected between the decoder 608 and encoder circuit 626. The encoder circuit 626 also receives the normal, single trace and full trace command signals from the command response circuit 400. If the sequence of operation fails, a corresponding number is stored in the counter 610 to provide a decoded signal to the gating circuit 624. When the gating circuit 624 is enabled by the AND gate 622, the decoded signal is transmitted to the encoder circuit 626, where it is compared with the mode of operation, to apply a signal to the command response circuit 400 on one of the output lines RRI-1 through RRI-X indication at which stage of the operating sequence the failure occurred.

TRACE CONTROL

Two types of trace arrangements are provided by the trace control 250, i.e., single trace and full trace. In the single trace mode of operation, a single trace command and the data concerning the single line number in a designated send group is received from the processor. The receive group line number and receive group is found, loaded into the respective registers, and sent back to the processor thereby completing the single trace mode of operation. In the case of full trace, the processor sends a full trace command, and either send group O is selected for the starting point for determining the connections to the send lines in the group and then sequentially tracing through all the send lines in the other send groups in numerical sequence, or a particular send group and send line number is selected from which the trace sequence is started. When in full trace, the trace control locates the first "starting" busy send line in the send group. Once the send line is identified, the single trace mode of operation is used to locate the information and transmit the same to the processor. However, the full trace retains, in a memory, the send line number of the last busy connection traced. This memory is continually updated as each connection is traced.

FIG. 35 is a block diagram of the trace control circuit 250. The trace control circuit 250 provides a means for identifying the receive line connected to any specified send line, or monitors the status of all send lines in sequence from a designated send line by identifying the receive line (if any) connected thereto. Since all connects are in duplex all traces are mde for simplex connections Send A to Receive B but will also include Send B to Receive A, etc., for a complete duplex trace. The trace circuit includes a single trace circuit 650 used for initiating all single trace sequences and a full trace circuit 652 for enabling the single trace circuit 650 to be used tracing all send line connections in sequence. Depending upon whether a single trace is to be performed, or a full trace, the call control applies a signal on the leads CMO-4 or CMO-5, respectively. If a single trace is initiated, (CMO-4) the single trace circuit 650 determines if the send line number is busy (valid) and if so, finds the switching time slot and transfers the receive group number and the receive line number into the receive group controls 238 and the receive line number control 234, respectively. The single trace circuit now makes a comparison to determine if the proper data has been loaded in the control circuits, and if valid transmits a trace complete signal (status) to the call control.

In the case of a full trace command (CMO-5), the full trace circuit determines if the send line number (in the send line number control 240) is a valid number. If valid, the full trace circuit monitors the specified send line and each of the successively higher numbered send lines in the selected send line group and thereafter in higher numbered groups until all the connectors are identified. If the initial send line number is not valid, the full trace control will proceed to locate the next higher numbered busy line in the selected group, or in a higher numbered group and then proceed to test all busy lines having higher numbers in the selected group and thereafter those located in higher numbered groups. When a busy send line is located, a signal on lead TFA will initiate a single trace sequence. A signal on lead FTC will enable the single trace circuit 650 to indicate to all the call control 244 that a full trace is in progress or completed.

SINGLE TRACE

Figure 38:
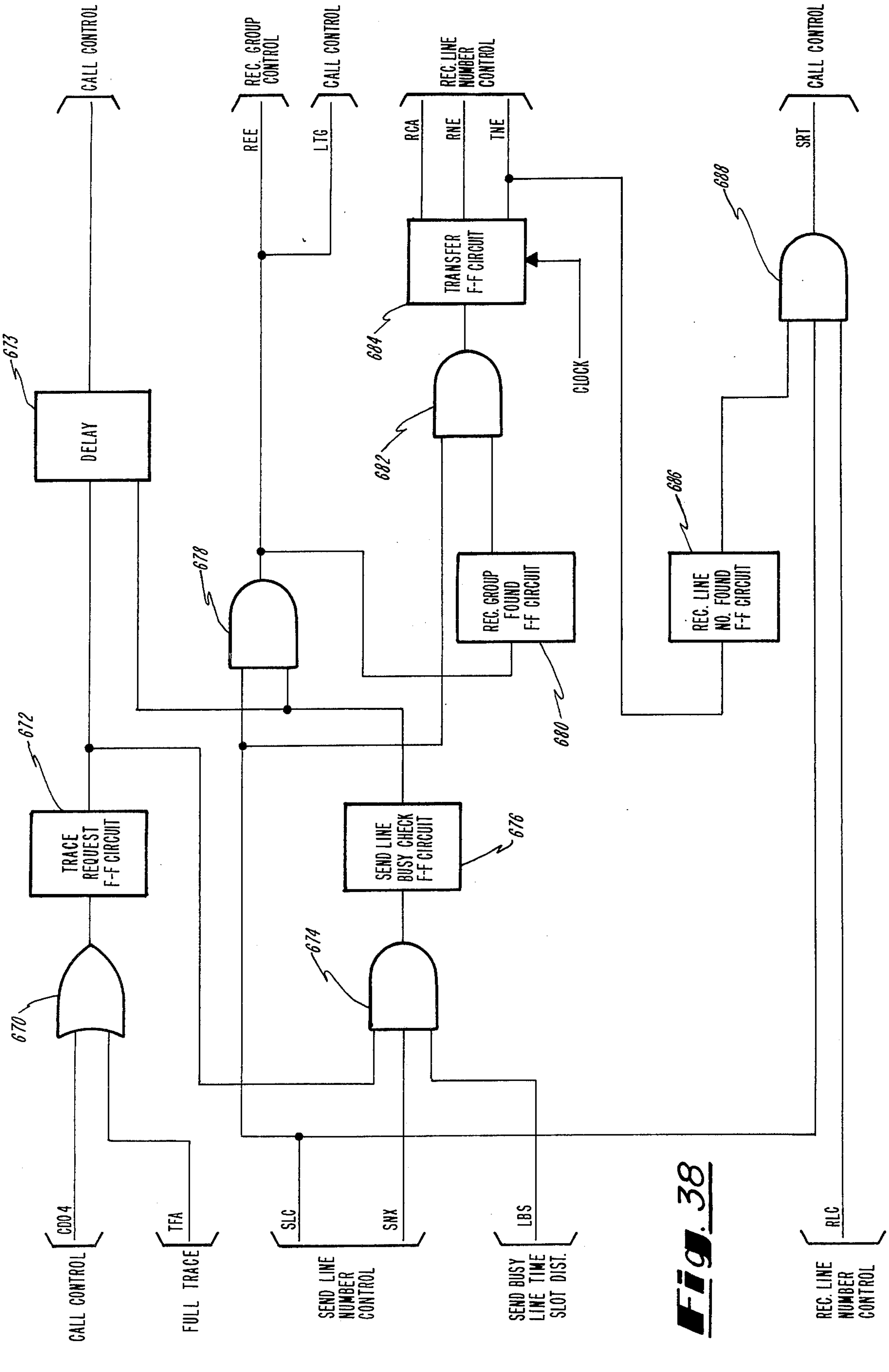
FIG. 38 is a schematic diagram of the single trace circuit.

FIG. 38 illustrates the control circuitry for the single trace mode of operation. The send line number and the send group number, supplied by the processor, are loaded in the registers in the send line number control 240 and the send group control 242, respectively. The send group control 242 enables the designated send line number store 54 and receive group store 60 in the same send group. The trace mode is initiated by a signal from the call control on the lead CDO4 (in the event of a single trace) or on the lead TFA (in the event of a full trace). Either of these signals are transmitted by an OR gate 670 to set a trace request flip-flop circuit 672. The flip-flop 672 applies an enabling signal to the AND gate 674. A signal appears on the line SNX when a comparison has been made between the binary number in the send line number control 240 and the binary number in the counter in the switching time slot control 232. If the send line is busy, a signal also simultaneously appears on the line LBS from the send line time slot busy store in the selected send line number store 54. This check is made to be sure that a valid connection exists to the selected send line. If no valid connection exists, the trace circuit will signify to the call control of the free condition via a time delay circuit 673. When all signals to the AND gate 674 are present, a send line busy check flip-flop circuit 676 is set to apply an enable signal to an AND gate 678, and to inhibit the delay circuit 673.

The trace circuit now proceeds to identify the receive group number. When the binary number in the enabled send line number store 54 compares with the number in the register in the send line number control 240, the send line number control applies a signal on the lead SLC (at the switching time slot allotted to the connection) which enables AND gate 678 to apply a signal on leads REE and LTG. The signal on LTG signifies to the call control that the receive group has been found. The signal on lead REE enables the receive group control 238 (at the switching time slot allotted to the connection) to transfer the number in the enabled receive group store 60 to the register in the receive group control 238.

The trace circuit now proceeds to identify the receive line number. When the AND gate 678 was enabled, it also set a receive group found flip-flop circuit 680, which in turn, applies an enable signal to an AND gate 682. In the following frame, when a comparison is made between the number stored in the register in the send line number control 240 and that in the enabled send line number store 54, a signal pulse appears on leads SLC and the AND gate 682 is enabled to set the transfer flip-flop circuit 684. The transfer flip-flop circuit 684 includes a plurality of flip-flop circuits arranged so that when set, the circuit provides three consecutive pulses, each on separate ones of three lines (RNE, RCA, and TNE), synchronized with three consecutive clock pulses. When the transfer flip-flop circuit is first set, a first signal pulse is sent to the receive line number control 234 via lead REE so that the binary number of the selected receive line number store 70 (at the particular switching time slot of the connection) is applied to the counter converter circuit 356 in the receive line number control 234. As previously mentioned, the binary numbers stored in the receive line number store 70 are reduced by a count of 1 to compensate for the delay through the switching network. Therefore, in order to identify the correct receive line number a count of 1 is added. A clock pulse later, is a signal generated by the transfer circuit 684 on the lead RCA, which adds 1 to the binary number in the counter converter. Still another clock pulse later, a signal is applied by the transfer circuit to the lead TNE, which allows the binary number in the counter converter 356 to be transferred into the register in the receive line number control (including the added count of 1).

The signal on the lead TNE also sets a receive line number found flip-flop 686, which in turn applies an enabling signal to an AND gate 688. The other two inputs to the AND gate 688 are connected to the leads SLC and RLC from the send and receive line number control circuits, respectively. At the next occurrance at the switching time slot of the connection, the binary number in the register in the send line number control 240 compares with the number in the enabled send line store 54 and the binary number in the register in the receive line number control 234 compares with the number in the enabled receive line number store 70. If the simultaneous comparison is made, signal pulses appear on the lines SLC and RLC, the connection is verified, and the gate 688 is enabled to apply a signal on the lead SRT indicating to the call control circuit 244 that the trace is complete and that the data is loaded in the various registers for transmission to the processor.

FULL TRACE

When a full trace command is generated by the control processor 36 (FIG. 1), the control processor designates the point at which the trace sequence is to begin, i.e., the send group number and the send line number in the send group. This information is loaded into the send line number control 240 and the send group number 242 (FIG. 14). When the trace is completed, the information pertaining to the particular send line being traced is loaded into the receive line number control 234, the receive group control 238 and the switching time slot counter control 232. This information is then outpulsed to the processor via the outgoing data control 246. The trace command is completed in the case of single trace. However, in a case of a full trace command, the full trace circuit: (1) maintains information concerning connection most recently traced, (2) locates and identifies the next busy line to be traced, and (3) loads the next send line number and corresponding group number into the send line number control 240 and send group control 242. This process continues until: (1) all the busy send lines in the group designated by the processor having a higher order time slots, and (2) all busy send line in higher order groups, are traced.

Figure 39:
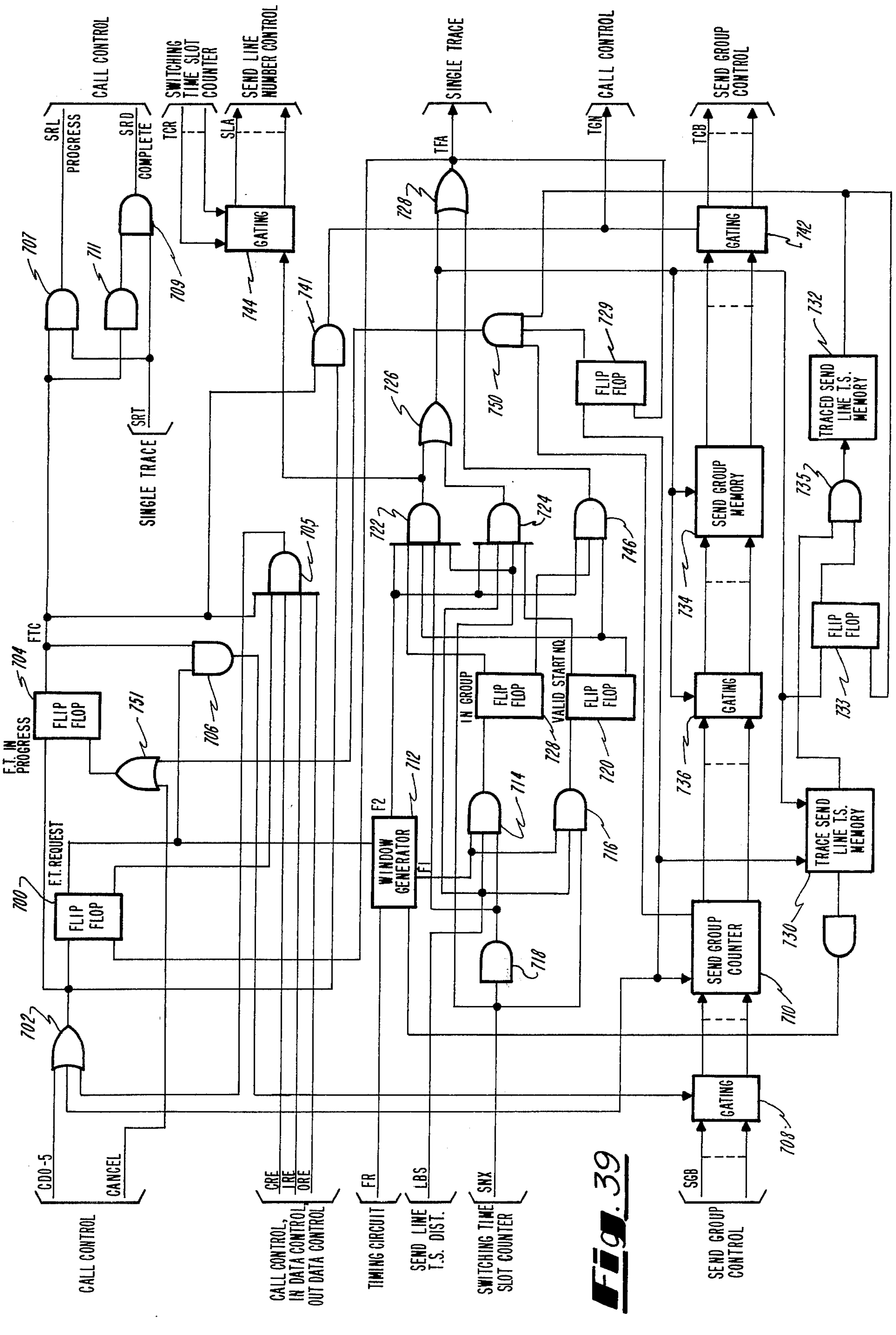
FIG. 39 is a schematic diagram of the full trace circuit.

The full trace circuit will now be explained with regard to FIG. 39. When a full trace is requested by the processor, the call control 244 applies a signal on lead CDO-5 which, via an OR gate 702, sets a full trace request flip-flop 700 and a full trace in progress flip-flop 704. With the flip-flops 700 and 704 set, an AND gate 706 enables a gating circuit 708 to transfer the send group number from the send group control 242 to a send group counter circuit 710, thereby providing a means for storing the send group being traced. A test is now made to determine if the "start of trace" send line number loaded in the send line number control 240 is a valid (busy) number. When the flip-flop 700 is set, it enables a window generator circuit 712 to apply an enabling signal on lead F1 (synchronized to framing pulses received on the line FR from the system timing) to a pair of AND gates 714 and 716. If the designated send line is busy, signals on leads LBS and SNX enable the AND gate 716 to set a valid start number flip-flop 720. If there are any send lines in the same group having a higher order line time slots, the AND gate 714 will be enabled during the same frame to set a busy line in group flip-flop 718. The output circuits of the flip-flops 718 and 720 are connected to a pair of AND gates 722 and 724 in a manner so that when the flip-flop 720 is set, the AND gate 724 is enabled. If only the flip-flop 718 is set, the AND gate 722 is enabled. If the number designated by the processor is not valid (busy), and no other send lines in the designated group are busy, then both the flip-flop 718 and 720 will remain reset and enable an AND gate 746. The window generator 712, when initially enabled by the full trace request flip-flop 700, provides an enabling pulse to the AND gates 714 and 716 (via lead F1) that for the entire duration of the framing signal on lead FR. The same duration of enabling pulse is also provided at the start of each trace sequence of each new successive send group. However, after a send line in the send group designated by the processor is traced, or subsequent group is traced, the beginning portion of the enabling pulse is inhibited by a signal from a trace send line time slot memory 730, which prevents the generation of the enabling signal during the period of the pulse corresponding to the line time slots having a lower order than the send line time slot most recently traced.

After the first frame pulse is generated on line F1, a subsequent enabling pulse during the next frame (of the same duration as that applied to line F1) is applied via the lead line F2 to the AND gates 722, 724 and 746. Hence, as can be seen, during a first frame a check is made to see whether the send line designated by the processor is valid (busy), or if it is not valid whether a busy send line is present in the same group. During the second frame the enabling pulse on lead F2, in response to the busy-free determination, enables an appropriate one of the AND gates 722, 724 and 746.

Figure 36:
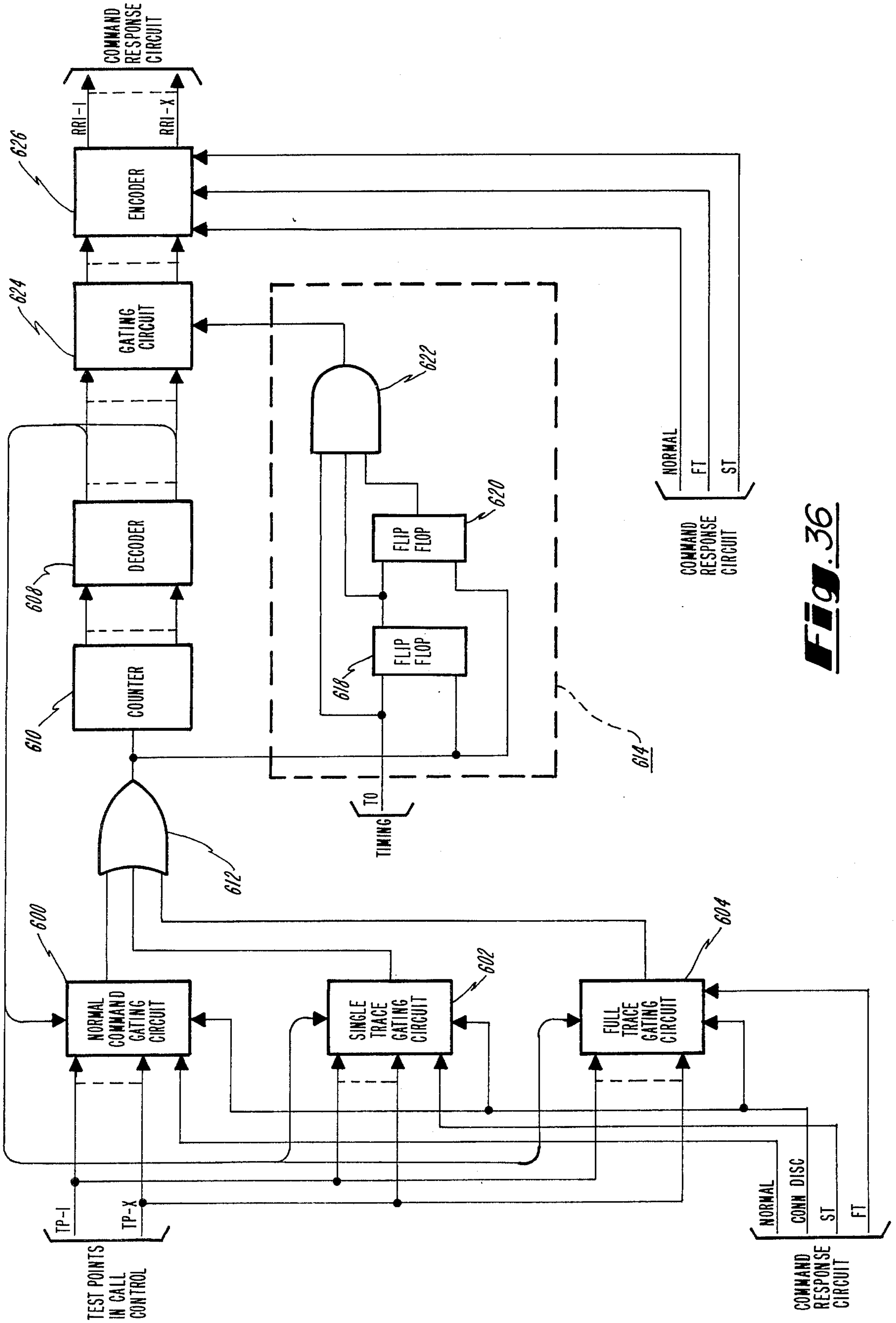
FIG. 36 is a schematic diagram of the call monitor circuit.

Assuming that the send line number designated by the processor is a valid number, the AND gate 742 is enabled during the second frame by the enabling signal on lead F2, which, during the presence of signals on both the leads LBX and SNX will transmit a signal via an OR gate 726. The output from the OR gate 726 is connected to: (1) a gating circuit 736 which allows the send group number in the counter 710 to be loaded into a send group memory circuit 734, and (2) the trace send line time slot memory 730, and via an AND gate 735 to a traced send line time slot memory 732. Wherein, the send line time slot is stored in the memories 730 and 732. The trace send line time slot memory 730 provided for the storage of all line time slots in a send group that were traced including the line time slot being traced. The traced send line time slot memory 732 stores only the time slot of the last line time slot traced. However, except when a full trace is initially started, both of the memories 730 and 732 store the send line time slot being traced. In subsequent traces the flip-flop 733 and the AND gate 735 function to allow the memory 732 to only store line time slot of the send line previously traced. The OR gate 726, when enabled: (1) resets the flip-flop 700, via an OR gate 722, (2) applies a signal on lead TFA to a single trace circuit to initiate a single trace sequence (previously discussed with regard to FIGS. 36), and (3) resets an advance flip-flop 729.

When the single trace sequence is complete and all the data concerning the trace is outpulsed to the processor, a free signal on the leads CRE, IRE and ORE from the call control 244, incoming data control 230, and outgoing data control 246 and with the flip-flop 704 set, an AND gate 705 sets the flip-flop 700 via OR gate 702 to initiate another trace sequence. When all the information concerning a traced call is outpulsed to the processor no send group and line information remains in the send line number control 240 and the send group control 242. Hence, the full trace circuit must supply the information for identifying: (1) the send group being traced, and (2) the next busy send line in the send group having a higher order line time slot than that previously traced. At the same time the flip-flop 700 is set for the next trace sequence, an AND gate 741 enables a gating circuit 742 to transfer the send group number in the memory 734 to the send group control 742. As previously mentioned, when flip-flop 700 is set it applies an enabling signal to the window generator 712, however, the window generator 712 is inhibited by the memory 730 from generating an enabling pulse until after the occurrance of the line time slot of the send line previously traced, thereby eliminating the send line previously traced and any send line in that group having a lower order line time slot. At the occurrance of a signal on line LBS indicating a busy send line (having a higher order time slot than that previously traced), the AND gate 714 sets the flip-flop 718. During the next frame (window generator 712 being inhibited from producing an enabling pulse for the same period of time as in the previous frame) the AND gate 722 is enabled by the busy signal on lead LBS. The send group number is again loaded into the send group memory 734 and the send line time slot is loaded into the memory 730 and 732 but subsequently erased from the memory 732 by the flip-flop 733. Simultaneously therewith, the AND gate 722 enables a gating circuit 744 to load the busy send line number from the switching time slot control 732 into the send line number control 240. Now the send line number control 240 and the send group control 732 includes the identity of the next busy send line to be traced. The OR gate 726 also transmits a signal via OR gate 728 to initiate a single trace sequence and to reset the flip-flop 700. The single trace circuit will now proceed to identify and load into the receive group control 238 and the receive line number control 234 and the switching time slot control 232, the information corresponding to the connection. Thereafter, the data is outpulsed to the processor.

This procedure continues until there are no more busy send lines in the designated send group. In such case, when flip-flop 700 is reset after the completion of a single trace and a busy send line test is made. Neither flip-flops 718 or 720 will be set, so that during the presence of an enable signal F2 the AND gate 746 is enabled to: (1) set an advance flip-flop 729, (2) increase the count in send group control by one, and (3) clear all the send line time slots in the memory 730. At this time the full trace is in condition to proceed with tracing the connections of busy send lines in the next higher numbered send group. The AND gate 746 also transmits a signal via OR gate 728 to initiate a single trace sequence. The full trace circuit will continue to trace all busy send lines in the next send group, and subsequently thereafter in higher numbered said groups until all send lines in all send groups (having a number higher than the send group originally designated by the processor) are traced. When the last busy send line is traced in the highest numbered send group, the busy-free trace test indicates that there are no more busy send lines. The flip-flop 718 and 720 are not set and the AND gate 746 is enabled to advance the counter 710 and set the flip-flop 729. With the counter 710 advanced an AND gate 750 is enabled by the memory 732 during the send line time slot of the last send line traced, to reset the flip-flop 704 and thereby ending the full trace sequence. While the full trace sequence is in progress, and the flip-flop 704 is set, an AND gate 707 is enabled during the presence of a signal from the single trace circuit on a lead SRT to indicate to the call control that the full trace is in progress. When flip-flop 704 is reset, an AND gate 709 will indicate to the call control that the full trace is subsequently completed.

What is claimed is:

1. A switching network for transmitting send time divided multiplex digital signals from any of a plurality of send circuits, sampled in accordance with recurring send line time slots assigned thereto, to any of a plurality of receive circuits on a time divided multiplex basis in accordance with recurring receive line time slots assigned thereto, said switching network comprising:

a plurality of interconnect highways;

send memory circuit means for receiving and storing the send time divided multiplex digital signals from the send circuits at assigned send line time slots and for transmitting the stored send time divided multiplex digital signals on any of said plurality of interconnect highways on a time divided multiplex basis at any of a plurality of recurring switching time slots, said send memory circuit means including send random access memory circuit means, circuit means for writing the received send time divided multiplex signals into the send random access memory circuit means and circuit means for transmitting the stored send time divided multiplex signals from the random access memory circuit means to said interconnect highways;

receive memory circuit means for receiving and storing the send time divided multiplex digital signals transmitted on any of said plurality of interconnect highways at any of said plurality of switching time slots and for transmitting the stored send time divided multiplex digital signals to receive circuits at assigned receive line time slots, said receive memory circuit means including, a receive random access memory circuit means, circuit means for writing the send time divided multiplex signals received from said interconnect highways into said receive random access memory circuit means, and circuit means for transmitting the stored send time divided multiplex signals from said random access memory circuit means to the receive circuits, and control circuit means for controlling the send and receive memory circuit means to direct the transfer of the send time divided multiplex digital signals between designated send and receive circuits by selecting the recurring switching time slots and interconnecting highways by which said digital signals are transferred, said control circuit means operating in response to commands from a processor connected thereto designating the send and receive circuits between which transmission is to take place.

2. A switching system as defined in claim 1 wherein said control circuit means includes a control circuit for controlling the translation of time divided multiplex signals by a memory circuit, wherein the control circuit receives and stores parallel binary input control data and transmits parallel binary output data in a changeable sequence comprising:

a plurality of recirculating memories, a separate one for each parallel bit of digital data to be received, said recirculating memories having a plurality of storage spaces therein that are continually circulating in synchronism between the input and output thereof;

circuit means responsive to an enabling signal for simultaneously storing parallel binary numbers in corresponding storage spaces in each of the recirculating memories;

circuit means responsive to an enabling signal for simultaneously erasing any digital information stored in a corresponding storage space in said recirculating memories, and circuit means responsive to an enabling signal for simultaneously transmitting output data in parallel binary form from corresponding storage spaces in said recirculating memories to the memory circuit.

3. A switching network as defined in claim 1 wherein:

said send memory circuit means includes a send recirculating memory means connected to the send random access memory circuit means to control the translation of the send time divided multiplex digital signals from assigned send line time slots to selected switching time slots by the send random access memory circuit means, and said receive memory circuit means includes a receive recirculating memory means connected to the receive random access memory circuit means to control the translation of the send time divided multiplex digital signals from said selected switching time slots to assigned receive line time slots by the receive random access memory circuit means.

4. A switching network as defined in claim 3 wherein:

said send memory circuit means includes a gating circuit for applying the send time divided multiplex signals translated by said send random access memory circuit means to any of said plurality of interconnect highways and highway recirculating memory means connected to control the selection of said gating means of the interconnect highways on each of said send time divided multiplex signals is to transmitted.

5. A switching network as defined in claim 4 wherein:

said receive memory circuit means includes a concentrator circuit connecting each of said interconnect highways to said receive random access memory circuit means.

6. A switching network as defined in claim 4 wherein:

said receive memory circuit means includes a gating circuit for connecting each of said interconnect highways to said receive random access memory circuit means, a receive highway recirculating memory means connected to said gating circuit for controlling the application of the send time divided multiplex signals from said interconnect highways to said receive random access memory circuit means.

7. A switching network as defined in claim 6 wherein:

said send random access memory circuit means includes two memory circuits, and circuit means for controlling said two memory circuits so that during alternate frames of said recurring send time divided multiplex signals, one of said two memory circuits stores said send time divided multiplex signals received from said send lines while the other one of said two memory circuits transmits said send time divided multiplex signals, and during frames between said alternate frames the operation of said two memory circuits reverses, and said receive random access memory circuit means includes two memory circuits, and circuit means for controlling said two memory circuits so that during alternate frames of said recurring send time divided multiplex signals, one of said two memory circuits stores said send time divided multiplex signals received from said interconnect highways while the other one of said two memory circuits transmits said send time divided multiplex signals, and during frames between said alternate frames the operation of said two memory circuits reverses.

8. A switching network as defined in claim 3 wherein:

said send random access memory circuit means stores the time divided multiplexed signals in send memory addresses sequentially with the send line time slots assigned thereto;

said send recirculating memory means controls said send random access memory circuit means to transmit said stored signals from send addresses in accordance with the switching time slots assigned thereto;

said receive recirculating memory means controls said receive random access memory circuit to store the time divided multiplexed signals in receive memory addresses in accordance with the switching time slots assigned thereto; and said receive random access memory circuit means transmits the time divided multiplexed signals from receive memory addresses sequentially with the receive line time slots assigned thereto.

9. A switching system as defined in claim 1 wherein said control circuit means includes a control circuit for receiving and storing from an input highway time divided multiplex signals having a recurring assigned time slot in a timing frame and for transmitting time divided multiplex signals on an output highway with the same or different time slots, said control circuit comprising:

random access memory circuit means including a separate storage location for each of the time slots in the timing frame, connected to the input and output highways for translating said time divided multiplex signals therebetween;

a plurality of recirculating memories, each having a separate storage location therein for each of said storage locations in said random access storage circuit means, said storage locations in said plurality of recirculating memories are continuously recirculating in synchronism between the input and output thereof;

circuit means responsive to an enabling signal for simultaneously storing digital bits in corresponding storage locations in each of the plurality of circulating memories of a binary number simultaneously the separate bits of which are applied in parallel to the inputs of said plurality of recirculating memories;

circuit means responsive to an enabling signal for simultaneously erasing digital bits stored in corresponding storage spaces in said plurality of recirculating memories;

circuit means for connecting said output circuits of said plurality of recirculating memories to said random access memory circuit means for controlling the time slots at which the time divided multiplex signals are transmitted from said random access memory circuit means to the highway output, and circuit means connecting said random access memories to said input highway for storing in said random access memory circuit means the time divided multiplex switching signals in accordance with their assigned time slots.

10. A switching system as defined in claim 9 wherein said control circuit means includes:

an additional recirculating memory having the same number of storage locations therein as in each of said plurality of recirculating memories and continuously circulating in synchronism therewith;

circuit means responsive to an enabling signal for storing a digital bit into a storage location in said additional recirculating memory when a binary number is stored in the corresponding storage location in said plurality of recirculating memories;

circuit means responsive to an enabling signal for erasing a signal bit from a storage space in said additional recirculating memory when binary data is erased from the corresponding storage spaces in said plurality of recirculating storage memories, and circuit means responsive to an enabling signal for transmitting a digital signal from said storage location in said additional recirculating memory indicating the busy-free condition of the corresponding storage spaces in said plurality of recirculating memories.

11. A switching system as defined in claim 10 wherein said control circuit means includes:

a second additional recirculating memory having the same number of storage locations therein as in each of said plurality of recirculating memories and continuously circulating in synchronism therewith;

circuit means responsive to an enabling signal for storing a digital bit into a storage location in said second additional recirculating memory corresponding to the assigned time slot of the time divided multiplex signal being transmitted when binary data is stored in a storage location in said plurality of recirculating memories;

circuit means responsive to an enabling signal for erasing a signal bit from a storage location in said second additional recirculating memory corresponding to the assigned time slot of the time divided multiplex signal inhibited from being transmitted when binary data is erased from the storage locations in said plurality of recirculating storage memories, and circuit means responsive to an enabling signal for transmitting a digital signal from any one of said storage locations in said second additional recirculating memory for indicating which of the time divided multiplex signals are being transmitted.

12. A switching network for receiving send time divided multiplex digital signals via a plurality of send highways from a plurality of groups of send circuits, wherein each send group is connected to a separate send highway and the highway and the signals from the send circuits in each send group are sampled in accordance with recurring send line time slots assigned thereto, for transmitting the send time divided multiplex digital signals on a time divided multiplex basis to any of a plurality of groups of receive circuits via a plurality of receive highways, wherein each receive group is connected to a separate receive highway and the receive circuits in each receive group sample signals from the receive highways in accordance with assigned recurring receive line time slots, said switching network comprising:

a plurality of interconnect highways;

a plurality of send memory circuit means, a separate one connected to each of the send highways, each of said send memory circuit means receiving send time divided multiplex digital signals from said send highways and transmitting on an output line said send time divided multiplex digital signals on a time divided multiplex basis, at any one of a plurality of recurring switching time slots;

a plurality of send recirculating memory means, a separate one for each of said send memory circuit means for controlling the transmission of the send time divided multiplex digital signals by said send memory circuit means;

a plurality of gating circuits, a separate one for each of said send memory circuit means, for connecting the output lines of said send memory circuit means to any of said plurality of interconnect highways;

a plurality of highway recirculating memory circuit means connected to said gating circuits for controlling the application of the send time divided multiplex signals transmitted by the send memory circuit means to selected ones of said plurality of interconnect highways;

a plurality of receive memory circuit means, a separate one connected to each of the receive highways, each of said receive memory circuit means receiving and storing the send time divided multiplex signals from an input line in accordance with the plurality of switching time slots and transmitting the send time divided multiplex signals to a separate receive highway at receive line time slots;

a plurality of receive recirculating memory circuits, a separate one for each of said receive memory circuit means for controlling the receiving and storage of a said send time divided multiplex digital signal over said input lines by the receive memory circuit means;

a plurality of concentrator circuits, a separate one for each of said receive memory circuit means, each of said concentrator circuits connecting said plurality of interconnect highways to an input line of separate ones of said receive memory circuit means, and control circuit means for writing and erasing address control signals into and out of said send recirculating memories, said highway recirculating memories, and said receive recirculating memories for controlling the transfer of said send time divided multiplex signals from send highway to receive highways, said control circuit means operating in response to address control codes from a central processor indicating that a signal contained within a designated send line time slot of a send group is to be transferred to a designated receive line time slot of a receive group.

13. A switching network as defined in claim 12 wherein:

said concentrator circuits include a separate gating circuit for each of said receive memory circuit means for connecting said interconnect highways to the input line of said receive memory circuit means, and a plurality of receive highway recirculating memories, a separate one for each of said gating circuits for controlling the application of the send time divided multiplex signals from said interconnect highways to said receive memory circuit means.

14. A switching network as defined in claim 13 wherein:

said send memory circuit means includes two memory circuits, and circuit means for controlling said two memory circuits so that during alternate frames of said recurring send time divided multiplex signals, one of said two memory circuits stores said send time divided multiplex signals received from said send lines while the other one of said two memory circuits transmits said send time divided multiplex signals, and during frames between said alternate frames the operation of said two memory circuits reverses, and said receive memory circuit means includes two memory circuits, and circuit means for controlling said two memory circuits so that during alternate frames of said recurring send time divided multiplex signals, one of said two memory circuits stores said send time divided multiplex signals received from said interconnect highways while the other one of said two memory circuits transmits said time divided multiplex signals, and during frames between said alternate frames the operation of said two memory circuits reverses.

15. A switching network as defined in claim 14 wherein:

said send memory circuit means stores the send time divided multiplex signals in accordance with the send line time slots assigned thereto;

said send recirculating memory means controls the time slots at which the send time divided multiplex signals are transmitted from said send memory circuit means;

said receive memory stores the send time divided multiplex signals in accordance with the time slots assigned thereto by said send recirculating memory means, and said receive recirculating memory means controls the time slots at which the send time divided multiplex signals are transmitted from said receive memory circuit means.

16. A switching system for transmitting send time divided multiplex digital signals from any of a plurality of send circuits, sampled in accordance with recurring send line time slots assigned thereto, to any of a plurality of receive circuits on a time divided multiplex basis in accordance with recurring receive line time slots assigned thereto, said switching system comprising:

a plurality of switching networks, each connected between said send circuits and said receive circuits, each of said networks comprising:

a. a plurality of interconnect highways, b. send memory circuit means for receiving and storing the send time divided multiplex digital signals from the send circuits at assigned send line time slots and for transmitting the stored send time divided multiplex digital signals on any of said plurality of interconnect highways on a time divided multiplex basis at any of a plurality of recurring switching time slots, said send memory circuit means including send random access memory circuit means, circuit means for writing the received send time divided multiplex signals into the send random access memory circuit means and circuit means for transmitting the stored send time divided multiplex signals from the random access memory circuit means to said interconnect highways, c. receive memory circuit means for receiving and storing the send time divided multiplex digital signals transmitted on any of said plurality of interconnect highways at any of said plurality of switching time slots and for transmitting the stored send time divided multiplex digital signals to receive circuits at assigned receive line time slots, said receive memory circuit means including a receive access memory circuit means, circuit means for writing the send time divided multiplex signals received from said interconnect highways into said receive random access memory circuit means, and circuit means for transmitting the stored send time divided multiplex signals from said random access memory circuit means to the receive circuits, and d. control circuit means for controlling the send and receive memory circuit means to direct the transfer of the send time divided multiplex digital signals between designated send and receive circuits by selecting the recurring switching time slots and interconnecting highways by which said digital signals are transferred, said control circuit means operating in response to commands from a processor connected thereto designating the send and receive circuits between which transmission is to take place; and supervisory control circuit means for transmitting data between the control circuit means of each switching network identifying which of said switching networks will make a desired connection to designated send and receive circuits.

17. A switching network for receiving send time divided multiplex signals via a plurality of send highways from a plurality of groups of send circuits, wherein each send group is connected to a separate send highway and the signals from the send circuits are sampled in accordance with recurring send line time slots assigned thereto, for transmitting the send time divided multiplex signals on a time divided multiplex basis to any of a plurality of groups of receive circuits, wherein each receive group is connected to a separate one of a plurality of receive highways, and the receive circuits in each group are assigned recurring receive line time slots, said switching network comprising:

a plurality of interconnecting highways;

a plurality of send memory circuit means, a separate one for each of the send highways for storing the send time divided multiplex signals received from the associated send highway and transmitting the stored send time divided multiplex signals on any of a plurality of said interconnecting highways on a time divided multiplex basis at any of a plurality of recurring time slots including the assigned send time slots;

a plurality of receive memory circuit means, a separate one for each of said receive highways, for receiving and storing the send time divided multiplex signals transmitted on said plurality of interconnecting highways and transmitting the send time divided multiplex signals to the receive circuits of the associated receive highways at appropriate receive time slots;

control circuit means including register means for receiving and storing in binary form the identity of the send circuit and the send memory circuit means and the receive circuit and the receive memory circuit means to be interconnected;

switching time slot circuit means for selecting a free time slot for transmitting the send time divided multiplex signals over the interconnect highways by the comparison of busy time slot signals stored within said send memory circuit means and said receive memory circuit means;

circuit means connecting said register means and said switching time slot circuit means to said send and receive memory circuit means for establishing a connection between the identified send and receive circuits, said control circuit means being arranged to operate in response to commands from a processor connected thereto designating the send and receive circuits between which transmission is to take place, and duplex circuit means for reversing the identity of the send and receive circuits and the send and receive memory circuit means after an initial connection has been established to complete a duplex connection.

18. A switching network as defined in claim 17 wherein said control circuits means includes:

circuit means for modifying the binary information in the register means to compensate for the time delay in the transmission of the send time divided multiplex signals over said interconnect highways, and wherein said modifying means decrements said stored binary identity of the receive circuit by a binary unit.

19. A switching network as defined in claim 17 wherein said control circuit means includes:

trace circuit means, responsive to the receipt by said register means of the identity of at least one of a send and receive circuit and the corresponding one of a send and receive memory circuit means, for identifying the other one of a send and receive circuit and corresponding one of a send and receive memory circuit means connected thereto.

20. A switching network as defined in claim 19 further comprising:

circuit means for sequentially detecting busy ones of at least one of the send and receive circuits, for supplying to said register means the identity of said busy one of said send and receive circuits and the corresponding one of said send and receive memory circuit means and for enabling said trace circuit means upon supplying said register means with the identities of said busy one of said send and receive circuits and of the corresponding memory circuit means.

21. A switching network as defined in claim 17 wherein:

each of said send memory circuit means includes a send random access memory, and a send recirculating memory means to control the translation of the send time divided multiplex signals by said send random access memory;

each of said receive memory circuit means includes a receive random access memory, and a receive recirculating memory means to control the translation of the send time divided multiplex signals by said receive random access memory, and said control circuit means connects said register means and said switching time slot circuit means to said send and receive recirculating memory means to establish connections between identified send and receive circuits.

22. A switching network for receiving send time divided multiplex signals via a plurality of send highways from a plurality of groups of send circuits, wherein each send circuit group is connected to a separate send highway and the signals from the send circuits are sampled in accordance with recurring send line time slots assigned thereto, for transmitting the send time divided multiplex signals on a time divided multiplex basis to any of a plurality of groups of receive circuits, wherein each receive group is connected to a separate one of a plurality of receive highways, and the receive circuits in each group are assigned recurring receive line time slots, said switching network comprising:

a plurality of interconnecting highways;

a plurality of send memory circuit means, a separate one for each of the send highways for storing the send time divided multiplex signals received from the associated send highway and transmitting the stored send time divided multiplex signals on any of a plurality of said interconnecting highways on a time divided multiplex basis at any of a plurality of recurring time slots including the assigned send time slots, each of said send memory circuit means including, send random access memory circuit means, circuit means for writing the received send time divided multiplex signals into the send random access memory circuit means, and circuit means for transmitting the stored send time divided multiplex signals from the random access circuit memory means to said interconnect highways;

a plurality of receive memory circuit means, a separate one for each of said receive highways, for receiving and storing the send time divided multiplex signals transmitted on said plurality of interconnecting highways and transmitting the send time divided multiplex signals to the receive circuits of the associated receive highways at appropriate receive time slots, each of said receive memory circuit means including, a receive random access memory circuit means, circuit means for writing the send time divided multiplex signals received from said interconnect highways into said receive random access memory circuit means, and circuit means for transmitting the stored send time divided multiplex signals from said random access memory circuit means to the receive circuits, and control circuit means connected to said plurality of send memory circuit means and said plurality of receive memory circuit means for designating the send and receive circuits to be interconnected on the time divided multiplex basis, said control circuit means operating in response to control codes from a central processor indicating that a signal contained within a designated send line time slot of a send group is to be transmitted to a designated receive time slot of a receive group.

23. A switching network as defined in claim 22 wherein:

each of said send memory circuit means includes a send recirculating memory means connected to the send random access memory circuit means to control the translation of the send time divided multiplex signals from assigned send line time slots to selected switching time slots by the send random access memory circuit means, and each of said receive memory circuit means includes a receive recirculating memory means connected to the receive random access memory circuit means to control the translation of the send time divided multiplex signals from said selected switching time slots to assigned receive line time slots by the receive random access memory circuit means.

24. A switching network as defined in claim 23 wherein:

each of said send memory circuit means includes a gating circuit for applying the send time divided multiplex signals translated by said send random access memory circuit means to any of said plurality of interconnect highways and highway recirculating memory means connected to control the selection by said gating means of the interconnect highways on each of said send time divided multiplex signals is to be transmitted.

25. A switching network as defined in claim 24 wherein:

each of said receive memory circuit means includes a concentrator circuit connecting each of said interconnect highways to said receive random access memory circuit means.

26. A switching network as defined in claim 25 wherein:

each of said receive memory circuit means includes a gating circuit for connecting each of said interconnect highways to said receive random access memory circuit means, a receive highway recirculating memory means connected to said gating circuit for controlling the application of the send time divided multiplex signals from said interconnect highways to said receive random access memory circuit means.

27. A switching network as defined in claim 26 wherein:

said send random access memory circuit means, includes two memory circuits, and circuit means for controlling said two memory circuits so that during alternate frames of said recurring send time divided multiplex signals, one of said two memory circuits stores said send time divided multiplex signals received from said send lines while the other one of said two memory circuits transmits said send time divided multiplex signals, and during frames between said alternate frames the operation of said two memory circuits reverses, and said receive random access memory circuit means includes two memory circuits, and circuit means for controlling said two memory circuits so that during alternate frames of said recurring send time divided multiplex signals, one of said two memory circuits stores said send time divided multiplex signals received from said interconnect highways while the other one of said two memory circuits transmits said send time divided multiplex signals, and during frames between said alternate frames the operation of said two memory circuits reverses.

28. A switching network as defined in claim 27 wherein:

said send random access memory circuit means stores the send time divided multiplex signals in accordance with the send line time slots assigned thereto;

said send recirculating memory means controls the time slots at which the send time divided multiplex signals are transmitted from said send random access memory circuit means;

said receive random access memory stores the send time divided multiplex signals in accordance with the time slots assigned thereto by said send recirculating memory means, and said receive recirculating memory means controls the time slots at which the send time divided multiplex signals are transmitted from said receive random access memory circuit means.

* * * * *